US006825891B2

(12) United States Patent
Kurashina

(10) Patent No.: US 6,825,891 B2
(45) Date of Patent: Nov. 30, 2004

(54) ELECTRO-OPTICAL DEVICE HAVING STORAGE CAPACITOR LAMINATED BETWEEN DATA LINE AND PIXEL ELECTRODE

(75) Inventor: Hisaki Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/680,296

(22) Filed: Oct. 8, 2003

(65) Prior Publication Data

US 2004/0070708 A1 Apr. 15, 2004

Related U.S. Application Data

(62) Division of application No. 10/397,220, filed on Mar. 27, 2003, now Pat. No. 6,665,024, which is a division of application No. 10/005,147, filed on Dec. 7, 2001, now Pat. No. 6,597,413, which is a continuation of application No. PCT/JP01/03360, filed on Apr. 19, 2001.

(30) Foreign Application Priority Data

Apr. 21, 2000 (JP) ........................................ 2000-121452

(51) Int. Cl.[7] ............................................ G02F 1/1343
(52) U.S. Cl. .............................. 349/38; 349/39; 349/44; 349/111
(58) Field of Search .............................. 349/38, 39, 44, 349/111

(56) References Cited

U.S. PATENT DOCUMENTS 5,182,620 A    1/1993  Shimada et al.
5,917,563 A    6/1999  Matsushima
5,956,103 A    9/1999  Ishiguro
5,966,193 A   10/1999  Zhang et al.
5,986,723 A *  11/1999  Nakamura et al. ............ 349/39
6,271,543 B1 *  8/2001  Ohtani et al. .................. 257/72
6,313,481 B1 * 11/2001  Ohtani et al. .................. 257/59
6,327,006 B1 * 12/2001  Sato et al. ..................... 349/44
6,400,427 B1    6/2002  Hanazawa et al.

FOREIGN PATENT DOCUMENTS

| JP | A 9-43631   | 2/1997 |
| JP | 09-160074   | 6/1997 |
| JP | A 9-171196  | 6/1997 |
| JP | A 9-236825  | 9/1997 |
| JP | A 10-10548  | 1/1998 |
| JP | A 10-31235  | 2/1998 |
| JP | A 10-39336  | 2/1998 |
| JP | A 10-253976 | 9/1998 |
| JP | A 10-274789 | 10/1998 |

* cited by examiner

Primary Examiner—Tarifur R. Chowdhury
Assistant Examiner—Andrew Schechter
(74) Attorney, Agent, or Firm—Oliff & Berridge, PLC

(57) ABSTRACT

The present invention provides electro-optical device that can include, on a TFT array substrate, pixel electrodes, TFTs for switching the respective pixel electrodes, and scanning lines and data lines respectively connected to the TFTs. By laminating a capacitive electrode and a capacitive line with an interlayer insulator interposed therebetween, a storage capacitor can be formed in a region overlapping the scanning line in a plan view. This arrangement increases a pixel aperture ratio and the capacitance of the storage capacitor, thereby reducing cross-talk and ghost and presenting a high-quality image display.

7 Claims, 40 Drawing Sheets

ELECTRO-OPTICAL DEVICE HAVING STORAGE CAPACITOR LAMINATED BETWEEN DATA LINE AND PIXEL ELECTRODE

This is a Division of application Ser. No. 10/397,220 filed Mar. 27, 2003 now U.S. Pat. No. 6,665,024, which in turn is a Division of application Ser. No. 10/005,147 filed Dec. 7, 2001, now U.S. Pat. No. 6,597,413 Continuation of International Application No. PCT/JP01/03360 filed Apr. 19, 2001. The entire disclosure of the prior applications is hereby incorporated by reference herein in its entirety.

BACKGROUND OF THE INVENTION

1. Field of Invention

The present invention relates to the technical field of active-matrix driving electro-optical devices, and more particularly to the technical field of electro-optical devices including, in a laminate structure of a substrate, a capacitive electrode and a capacitive line for adding a capacitor to a pixel electrode, and a thin-film transistor (TFT) for switching a pixel.

2. Description of Related Art

Currently, in a TFT-driven active-matrix electro-optical device, when a TFT is supplied at the gate thereof with a scanning signal through a scanning line, the TFT is turned on, thereby supplying a pixel electrode through a source and a drain of the TFT with an image signal that is provided through a data line to a source region of a semiconductor layer. Since the image signal is supplied to each pixel electrode through each TFT for an extremely short period of time, a storage capacitor is typically added to each pixel electrode (in parallel with a capacitor of a liquid crystal) to hold the voltage of the image signal supplied through the TFT for a period of time substantially longer than the time of the on state of the TFT.

The storage capacitor is typically formed of a capacitive electrode that is at a pixel-electrode potential and is extended from a conductive polysilicon layer forming the drain region of the TFT connected to the pixel electrode, a dielectric layer, and a capacitive line being at a predetermined potential and including an electrode portion that is opposed to the capacitive electrode with the dielectric layer interposed therebetween. The capacitive line is fabricated of the same conductive layer as that forming the scanning line (a conductive polysilicon layer, for example), and is typically arranged laterally to run in parallel with the scanning line.

SUMMARY OF THE INVENTION

There is generally a strong market demand for a higher-definition display image in electro-optical devices. To achieve higher definition, the pixel pitch can be made finer while the aperture ratio of the pixel is increased (i.e., an aperture area of the pixel through which image light is transmitted is expanded with respect to a non-aperture area of each pixel through which no image light is transmitted).

In accordance with the above-mentioned conventional art in which the scanning lines and the data lines are respectively juxtaposed in an image display area, the non-aperture area of each pixel where the scanning line and the capacitive line are arranged becomes narrower as the aperture ratio of the fine-pitched pixel increases. As the pixel pitch becomes finer, it becomes more difficult to embed a capacitor having a sufficiently larger capacitance and to impart sufficiently higher conductivity to the scanning line and the capacitive line. When a capacitor having a sufficiently large capacitance is not available or a scanning line and a capacitive line having a sufficient conductivity is not produced, the electro-optical device suffers from cross-talk or ghosting in an image display thereof, thereby degrading the image quality. As the aperture ratio of the fine-pitched pixels increases, the degradation of image quality becomes more pronounced. In other words, an attempt to improve image quality creates another problem that is difficult to resolve.

In comparison with the problem, the present invention has been developed, and it is an object of the present invention to provide an electro-optical device which increases the pixel aperture ratio while increasing the capacitance of a storage capacitor (or controlling a reduction in the capacitance of the storage capacitor), and providing a high-quality image display free from cross-talk and ghosting.

To achieve the above object, the electro-optical device of the present invention can include, on a substrate, scanning lines and data lines that intersect each other, thin-film transistors, each connected to one of the scanning lines and one of the data lines, and pixel electrodes respectively connected to the thin-film transistors. The present invention can also include a storage capacitor laminated above each of the scanning lines and including a pixel-potential capacitive electrode connected to the pixel electrode and being at a pixel-electrode potential, a fixed-potential capacitive electrode at a predetermined potential, and a dielectric layer interposed between the pixel-potential capacitive electrode and the fixed-potential capacitive electrode.

In accordance with the electro-optical device of the present invention, the storage capacitor can be laminated on the scanning line (with an interlayer insulator interposed therebetween, for example), and can includes the pixel-potential capacitive electrode connected to the pixel electrode and being at the pixel-electrode potential, the fixed-potential capacitive electrode at the predetermined potential, and the dielectric layer interposed between the pixel-potential capacitive electrode and the fixed-potential capacitive electrode. The storage capacitor is thus produced in a region overlapping the scanning line on the substrate in a plan view by making use of the pixel-potential capacitive electrode formed in the region overlapping the scanning line and the fixed-potential capacitive electrode opposed to the pixel-potential capacitive electrode. Unlike in the conventional art, the fixed-potential capacitive electrode (or the capacitive line) is not arranged laterally in parallel with the scanning line, and the use of the scanning line and the fixed-potential capacitive electrode (or the capacitive line) does not expand the non-aperture area of each pixel, because the scanning line and the fixed-potential capacitive electrode do not run alongside and in parallel with each other. In other words, by forming the fixed-potential capacitive electrode (or the capacitive line) overlapping the scanning line on the substrate, the aperture area of each pixel is expanded while a formation area of the fixed-potential capacitive electrode (or the capacitive line) is expanded at the same time. The capacitance of the storage capacitor is thus relatively increased. A sufficiently wide line width is achieved, thereby imparting sufficient conductivity to the scanning line and the fixed-potential capacitive electrode (or the capacitive line). As a result, the electro-optical device has a high aperture ratio of the fine-pitched pixel while providing an improved image quality for a presented image free from cross-talk and ghost.

In one embodiment of the electro-optical device of the present invention, the thin-film transistor can include a gate electrode formed of part of the scanning line and located over the channel region thereof. This embodiment provides a so-called top gate thin-film transistor which includes the scanning line having a storage capacitor laminated thereon on the substrate.

In another embodiment of the electro-optical device of the present invention, the thin-film transistor includes a gate electrode formed of part of the scanning line and located below the channel region thereof. This embodiment provides a so-called bottom gate thin-film transistor which includes the scanning line having a storage capacitor laminated thereon on the substrate.

In yet another embodiment of the electro-optical device of the present invention, the gate electrode of the thin-film transistor can be formed of the same conductive layer as the conductive layer forming the scanning line. In accordance with this embodiment, a portion of the scanning line running in a linear or comb-like configuration and fabricated of a conductive polysilicon layer, a metal layer or an alloy layer is over the gate insulator of each thin-film transistor and functions as a gate electrode.

In yet another embodiment of the electro-optical device of the present invention, the gate electrode of the thin-film transistor can be formed of a conductive layer different from the conductive layer forming the scanning line. In accordance with this embodiment, an island gate electrode connected directly or via a contact hole to a linear scanning line fabricated of a conductive polysilicon layer, a metal layer or an alloy layer is arranged on the gate insulator of each thin-film transistor. The material of the gate electrode is a conductive polysilicon layer, a metal layer, or an alloy layer.

In still another embodiment of the electro-optical device of the present invention, the storage capacitor is located over the scanning line on the substrate. In accordance with this embodiment, a formation area of the storage capacitor is expanded making use of a non-aperture area overlapping the scanning line.

In still another embodiment of the electro-optical device of the present invention, the storage capacitor is located below the scanning line on the substrate. In accordance with this embodiment, a formation area of the storage capacitor is expanded making use of a non-aperture area underlapping the scanning line.

In still another embodiment of the electro-optical device of the present invention, the storage capacitor is located in an interlayer position over the data line on the substrate. In accordance with this embodiment, the storage capacitor is located in the interlayer position over the data line on the substrate, and a formation area of the storage capacitor is expanded by making use of a non-aperture area overlapping the scanning line.

In still another embodiment of the electro-optical device of the present invention, the storage capacitor is located in an interlayer position between the data line and the scanning line on the substrate. In accordance with this embodiment, the storage capacitor is located in the interlayer position between the data line and the scanning line on the substrate, and a formation area of the storage capacitor is expanded by making use of a non-aperture area overlapping the scanning line.

In still another embodiment of the electro-optical device of the present invention, one of the fixed-potential capacitive electrode and the pixel-potential capacitive electrode is formed of the same conductive layer as the conductive layer forming the data line. In accordance with this embodiment, the storage capacitor having the capacitive electrode fabricated of the same conductive layer as the conductive layer forming the data line, for example, fabricated of Al (aluminum), is produced in a non-aperture area overlapping the scanning line.

In still another embodiment of the electro-optical device of the present invention, the pixel-potential capacitive electrode is located over the fixed-potential capacitive electrode. Since the pixel-potential capacitive electrode is located over the fixed-potential capacitive electrode in accordance with this embodiment, one of the pixel electrode and the thin-film transistor is electrically connected to the pixel-potential capacitive electrode via a contact hole in a relatively easy manner.

In still another embodiment of the electro-optical device of the present invention, the pixel-potential capacitive electrode can be located below the fixed-potential capacitive electrode. Since the pixel-potential capacitive electrode is located below the fixed-potential capacitive electrode in accordance with this embodiment, the other of the pixel electrode and the thin-film transistor is electrically connected to the pixel-potential capacitive electrode via a contact hole in a relatively easy manner.

In still another embodiment of the electro-optical device of the present invention, the interlayer position of the pixel electrode is located over the scanning line on the substrate. In accordance with this embodiment, the pixel electrode arranged in the vicinity of a top layer in the laminate structure on the substrate is controlled by a thin-film transistor embedded in a layer therebeneath in a switching operation.

In still another embodiment of the electro-optical device of the present invention, the interlayer position of the pixel electrode can be located below the scanning line on the substrate. In accordance with this embodiment, the pixel electrode arranged in the vicinity of a bottom layer in the laminate structure on the substrate is controlled by a thin-film transistor embedded in a layer thereabove in a switching operation.

In still another embodiment of the electro-optical device of the present invention, the storage capacitor can be laminated with respect to not only the scanning line but also the data line. In accordance with this embodiment, the fixed-potential capacitive electrode (and the capacitive line) is laminated with respect to not only the scanning line but also the data line on the substrate, and the aperture area of each pixel is expanded while the formation area of the fixed-potential capacitive electrode (and the capacitive line) is enlarged. The capacitance of the storage capacitor is thus increased.

In still another embodiment, the electro-optical device of the present invention further includes a capacitive line which is connected to the fixed-potential capacitive electrode, is formed in a stripe configuration or a grid configuration and fixed to a predetermined potential outside an image display area.

In accordance with this embodiment, the fixed-potential capacitive electrode forming the storage capacitor in the image display area is fixed to the predetermined potential outside the image display area via the capacitive line running in a stripe configuration or a grid configuration on the substrate. The fixed-potential capacitive electrode arranged in the image display area is reliably and relatively easily connected to the predetermined potential by making use of a peripheral circuit surrounding the image display area or a constant-potential line or a constant-potential power source for a driving circuit.

In another embodiment, the capacitive line is formed of the same conductive layer as the conductive layer forming the fixed-potential capacitive electrode. In accordance with this embodiment, a portion of the capacitive line fabricated of a refractory metal or a polysilicon layer, for example, running and overlapping the scanning line, is located over the dielectric material forming each storage capacitor and functions as the fixed-potential capacitive electrode. In this embodiment, the capacitive line maybe formed of a conductive layer different from the conductive layer forming the fixed-potential capacitive electrode.

In accordance with this embodiment, an island fixed-potential capacitive electrode connected directly or via a contact hole to the capacitive line, fabricated of a refractory metal layer or polysilicon layer and running on and over-lapping the scanning line, is arranged on the dielectric layer of the storage capacitor. The fixed-potential capacitive electrode is formed of a refractory metal layer or a polysilicon layer, for example.

In still another embodiment of the electro-optical device of the present invention, the pixel-potential capacitive electrode can be formed of an island conductive layer interposed between the thin-film transistor and the pixel electrode. In accordance with this embodiment, the pixel-potential capacitive electrode of an island conductive layer also functions as a conductive interlayer (or a barrier layer) that connects the thin-film transistor to the pixel electrode. In this embodiment, a junction of the island conductive layer with the thin-film transistor may be formed in a region corresponding to the data line, a junction of the island conductive layer with the pixel electrode may be formed in a region corresponding to the data line, and a junction of the island conductive layer with the pixel electrode may be formed in a region corresponding to the scanning line.

With this arrangement, the junction of the island conductive layer is located in the non-aperture area of each pixel overlapping the scanning line or the data line, and the junction does not narrow the aperture area of the pixel.

In another embodiment, the fixed-potential capacitive electrode is laminated between the scanning line and the pixel-potential capacitive electrode. In accordance with this embodiment, the fixed-potential capacitive electrode at the predetermined potential is laminated between the pixel-potential capacitive electrode at the pixel-electrode potential and the scanning line. Variations in the potential of the pixel-potential capacitive electrode do not adversely affect the scanning line through capacitive coupling (and conversely, variations in the potential of the scanning line do not adversely affect the pixel-potential capacitive electrode through capacitive coupling), and the adoption of the structure in which the storage capacitor is laminated on the scanning line reduces the degradation of image quality.

In still another embodiment of the electro-optical device of the present invention, the pixel-potential capacitive electrode can be laminated closer to the scanning line than the fixed-potential capacitive electrode is laminated to the scanning line. The pixel-potential capacitive electrode with the potential thereof varying with an image signal can be laminated closer to the scanning line in this arrangement. However, if the interlayer insulator interposed between the pixel-potential capacitive electrode and the scanning line is set to be thicker than a predetermined value, adverse interaction through capacitive coupling between the pixel-potential capacitive electrode and the scanning line is reduced in practice. The thickness of the interlayer insulator can be determined experimentally, based on experience, or by simulation so that the capacitive coupling is negligibly small in the specifications of the device.

The fixed-potential capacitive electrode may be separately formed of a conductive, transparent layer (polysilicon layer, for example) or may be formed of an embedded light shielding film (a refractory metal layer) for defining the aperture area of each pixel.

In still another embodiment of the electro-optical device of the present invention, the fixed-potential capacitive electrode can be laminated between the data line and the pixel-potential capacitive electrode. Since the fixed-potential capacitive electrode at the predetermined potential is laminated between the data line and the pixel-potential capacitive electrode at the pixel-electrode potential in accordance with this embodiment, variations in the potential of the pixel-potential capacitive electrode do not adversely affect the data line through capacitive coupling (and conversely, variations in the potential of the data line do not adversely affect the pixel-potential capacitive electrode through capacitive coupling), and the adoption of the structure in which the storage capacitor is laminated on the data line reduces the degradation of image quality. In this embodiment, the storage capacitor is formed not only in a region overlapping the scanning line but also a region overlapping the data line, and the capacitance of the storage capacitor is even further increased.

In still another embodiment of the electro-optical device of the present invention, the pixel-potential capacitive electrode can be laminated closer to the data line than the fixed-potential capacitive electrode is laminated to the data line. The pixel-potential capacitive electrode with the potential thereof varying with an image signal is laminated closer to the data line in this arrangement. However, if the interlayer insulator interposed between the pixel-potential capacitive electrode and the data line is set to be thicker than a predetermined value, adverse interaction through capacitive coupling between the pixel-potential capacitive electrode and the data line is reduced in practice. The thickness of the interlayer insulator is determined experimentally, based on experience, or by simulation so that the capacitive coupling is negligibly small in the specifications of the device.

In still another embodiment of the electro-optical device of the present invention, the fixed-potential capacitive electrode can include a portion, laminated between the scanning line and the pixel-potential capacitive electrode, in a region running along the scanning line on the substrate, and a portion, laminated between the data line and the pixel-potential capacitive electrode, in a region running along the data line on the substrate.

In accordance with this embodiment, the fixed-potential capacitive electrode at the predetermined potential can be laminated between the scanning line and the pixel-potential capacitive electrode in the region running along the scanning line on the substrate. In this region, therefore, an adverse effect through capacitive coupling between the scanning line and the pixel-potential capacitive electrode is reduced. Also, since the fixed-potential capacitive electrode at the predetermined potential is laminated between the data line and the pixel-potential capacitive electrode in the region running along the data line on the substrate, an adverse effect through capacitive coupling between the data line and the pixel-potential capacitive electrode is reduced in this region.

In yet another embodiment, in the region running along the scanning line, the pixel-potential capacitive electrode is formed of one of a first conductive layer and a second conductive layer that are laminated with the dielectric layer interposed therebetween while the fixed-potential capacitive electrode is formed of the other of the first and second conductive layers. In the region running along the data line, the pixel-potential capacitive electrode is formed of the other of the first and second conductive layers while the fixed-potential capacitive electrode is formed of the one of the first and second conductive layers.

In this arrangement, an adverse effect through capacitive coupling between the scanning line and the pixel-potential capacitive electrode is reduced in the region running along the scanning line while an adverse effect through capacitive coupling between the data line and the pixel-potential capacitive electrode is reduced in the region running along the data line.

In still another embodiment of the electro-optical device of the present invention, one of the pixel-potential capacitive electrode and the fixed-potential capacitive electrode is formed of a pair of electrodes that sandwiches the other of the pixel-potential capacitive electrode and the fixed-potential capacitive electrode from above and from below.

Since the one of the pixel-potential capacitive electrode and the fixed-potential capacitive electrode is formed of the pair of electrodes that sandwiches the other of the pixel-potential capacitive electrode and the fixed-potential capacitive electrode from above and from below in accordance with this embodiment, a storage capacitor having a larger capacitance is created with the area occupied on the substrate unchanged.

In this embodiment, the fixed-potential capacitive electrode can be formed of a pair of electrodes that sandwiches the pixel-potential capacitive electrode from above and from below.

Since the pixel-potential capacitive electrode at the pixel-electrode potential is sandwiched between the pair of electrodes forming the fixed-potential capacitive electrode from above and from below, variations in the potential of the pixel-potential capacitive electrode do not adversely affect the scanning line and the data line through capacitive coupling (and conversely, variations in the potential of the scanning line and the data line do not adversely affect the pixel-potential capacitive electrode through capacitive coupling), and the adoption of the structure in which the storage capacitor is laminated on the scanning line advantageously reduces the degradation of image quality.

In still another embodiment of the electro-optical device of the present invention, at least one of the pixel-potential capacitive electrode and the fixed-potential capacitive electrode can have a light shielding property. In accordance with this embodiment, the pixel-potential capacitive electrode and the fixed-potential capacitive electrode having the light shielding property are used to prevent light from entering the thin-film transistor or from traveling through the edge area of the aperture of each pixel.

In still another embodiment of the electro-optical device of the present invention, the one of the capacitive electrodes having the light shielding property contains a refractory metal. Specifically, the one of the capacitive electrodes is formed of a single metal layer, an alloy layer, a metal silicide layer, a polysilicide layer, or a multilayer of these layer, each layer fabricated of at least a refractory metal selected from the group consisting of Ti (titanium), Cr (chromium), W (tungsten), Ta (tantalum), Mo (molybdenum), and Pb (lead).

In yet another embodiment, the one of the capacitive electrodes having the light shielding property may be located over the thin-film transistor on the substrate, and may be formed of an upper light shielding film having conductivity and at least partly defining the aperture area of each pixel.

In this arrangement, the one of the fixed-potential capacitive electrode and the pixel-potential capacitive electrode is formed of the upper light shielding film having conductivity and defining the aperture area of each pixel (in other words, the embedded light shielding film arranged over the thin-film transistor has the function of the fixed-potential capacitive electrode or the pixel-potential capacitive electrode in addition to the originally intended light shielding property). This arrangement advantageously simplifies the laminate structure and the manufacturing process of the device in comparison with the case in which a dedicated conductive layer is added in a laminate structure to form a fixed-potential capacitive electrode or a pixel-potential capacitive electrode.

The upper light shielding film may be laminated between the conductive layer forming the scanning line and the conductive layer forming the data line, or may be laminated between the conductive layer forming the data line and the conductive layer forming the pixel electrode.

In this case, preferably, the scanning line, the data line, and the thin-film transistor do not extend beyond the formation area of the upper light shielding film on the substrate in a plan view.

In this arrangement, no light incident on the substrate is reflected from the scanning line, the data line and the thin-film transistor, because no portion of the scanning line, the data line and the thin-film transistor projects out of the formation area of the upper light shielding film. This arrangement efficiently precludes the generation of internal reflections and multiple reflections of light in the electro-optical device.

Preferably, the one of the capacitive electrodes having the light shielding property covers at least the channel region of the thin-film transistor.

Since the one of the fixed-potential capacitive electrode and the pixel-potential capacitive electrode having the light shielding property covers at least the channel region of the thin-film transistor in this arrangement, neither incident light nor returning light enters the channel region. This arrangement effectively controls the generation of photo-leakage currents arising from photoelectric effect, thereby preventing a change in transistor characteristics.

In this embodiment, the one of the capacitive electrodes having the light shielding property is located below the thin-film transistor on the substrate, and is formed of a conductive lower light shielding film covering at least the channel region on the substrate if viewed from the substrate.

In this arrangement, the one of the fixed-potential capacitive electrode and the pixel-potential capacitive electrode is formed of the lower light shielding film having conductivity at least covering the channel region of the thin-film transistor if viewed from the substrate (i.e., if viewed from the underside of the thin-film transistor) (in other words, the embedded light shielding film arranged under the thin-film transistor has the function of the fixed-potential capacitive electrode or the pixel-potential capacitive electrode in addition to the originally intended light shielding property). This arrangement advantageously simplifies the laminate structure and the manufacturing process of the device in comparison with the case in which a dedicated conductive layer is added in a laminate structure to form a fixed-potential capacitive electrode or a pixel-potential capacitive electrode.

The lower light shielding film may be deposited directly on the substrate or on an underlayer insulator formed on the substrate. In this case, preferably, the scanning line, the data line, and the thin-film transistor do not extend beyond the formation area of the lower light shielding film on the substrate in a plan view.

In this arrangement, light reflected from the rear surface of the electro-optical device or returning light passing through a light synthesizing system of a multi-panel projector composed of a plurality of electro-optical devices is not reflected from the scanning line, the data line and the thin-film transistor, because no portion of the scanning line, the data line and the thin-film transistor projects out of the formation area of the lower light shielding film. This arrangement efficiently precludes the generation of internal reflections and multiple reflections of light in the electro-optical device.

In still another embodiment of the present invention, the electro-optical device includes an upper light shielding film which is located over the thin-film transistor on the substrate and defines at least partly the aperture area of each pixel, and a lower light shielding film which is located below the thin-film layer on the substrate and covers at least the channel region of the thin-film transistor if viewed from the substrate, wherein the one of the capacitive electrodes having the light shielding property is formed of one of the upper light shielding film and the lower light shielding film, and wherein the lower light shielding film does not extend beyond the formation area of the upper light shielding film on the substrate in a plan view.

In this arrangement, the conductive upper light shielding film defining the aperture area of each pixel and the lower light shielding film covering at least the channel region of the thin-film transistor are further arranged. The one of the capacitive electrodes having the light shielding property is formed of one of the upper light shielding film and the lower light shielding film. This arrangement advantageously simplifies the laminate structure and the manufacturing process of the device in comparison with the case in which a dedicated conductive layer is added in a laminate structure to form a fixed-potential capacitive electrode or a pixel-potential capacitive electrode. Since a light beam incident on the substrate is reflected from the lower light shielding film projecting out of the formation region of the upper light shielding film, the generation of internal reflections and multiple reflections of light in the electro-optical device is effectively precluded.

In still another embodiment of the electro-optical device of the present invention, the pixel-potential capacitive electrode is formed of an extension of the conductive layer forming the drain region of the thin-film transistor. In accordance with this embodiment, the pixel-potential capacitive electrode is formed of the extension of the conductive layer (for example, a conductive polysilicon film) forming the drain region of the thin-film transistor. The pixel-potential capacitive electrode being at the pixel electrode potential connected to the drain region is relatively easily created.

In still another embodiment of the electro-optical device of the present invention, the pixel-potential capacitive electrode is formed of an extension of the conductive layer forming the pixel electrode. In accordance with this embodiment, the pixel-potential capacitive electrode can be formed of the extension of the conductive layer (for example, an ITO (Indium Tin Oxide) film) forming the pixel electrode. The pixel-potential capacitive electrode being at the pixel electrode potential is relatively easily created.

These and other operations and advantages of the present invention will become obvious from the following discussion of the embodiments.

BRIEF DESCRIPTION OF THE DRAWINGS

The present invention will be described in greater detail with reference to the following FIGUREs, wherein like numerals reference like elements, and wherein.

DETAILED DESCRIPTION OF PREFERRED EMBODIMENTS

In each of the following embodiments for the purposes of discussion, the electro-optical device of the present invention is applied to a liquid crystal device.

Figure 1:
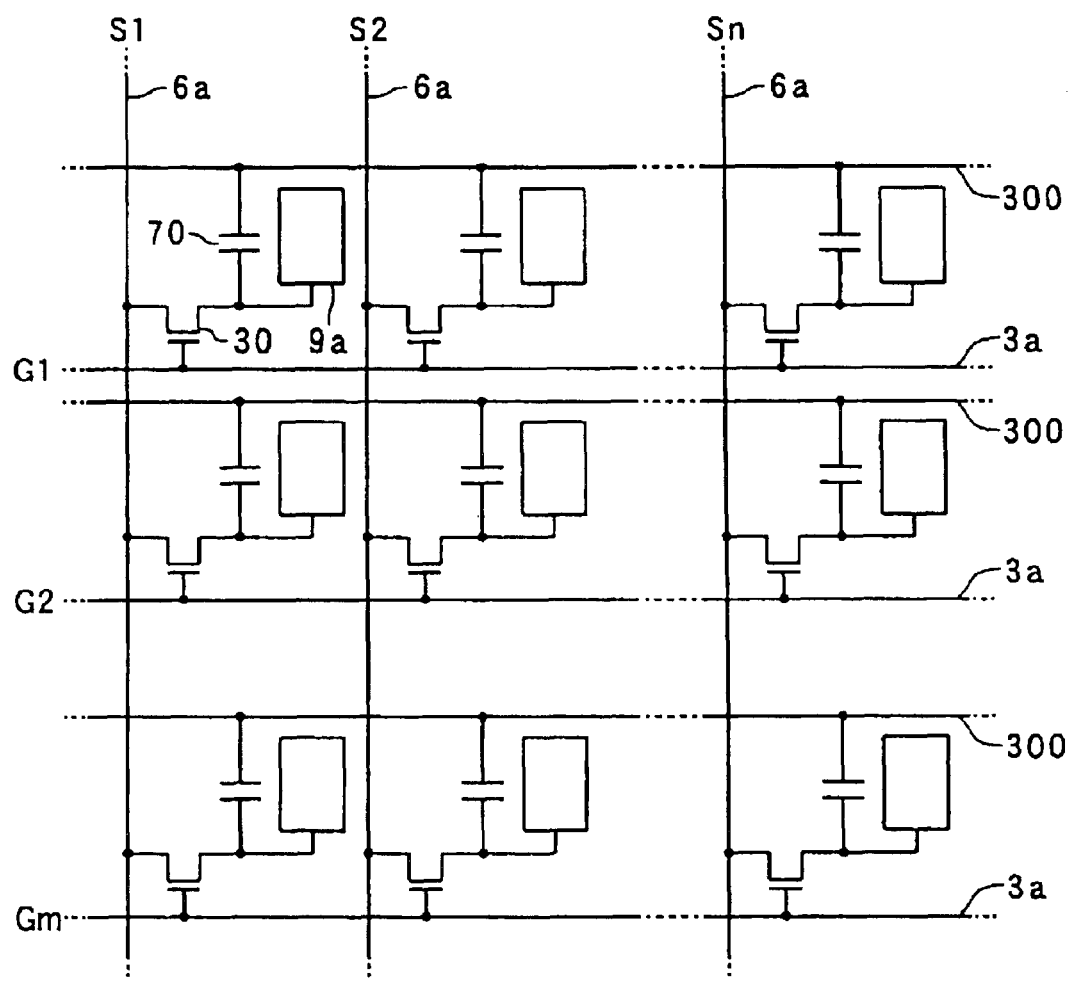
FIG. 1 shows an exemplary circuit of a variety of elements, and wirings arranged in a matrix of pixels forming an image display area in the electro-optical device of a first embodiment of the present invention.
Figure 2:
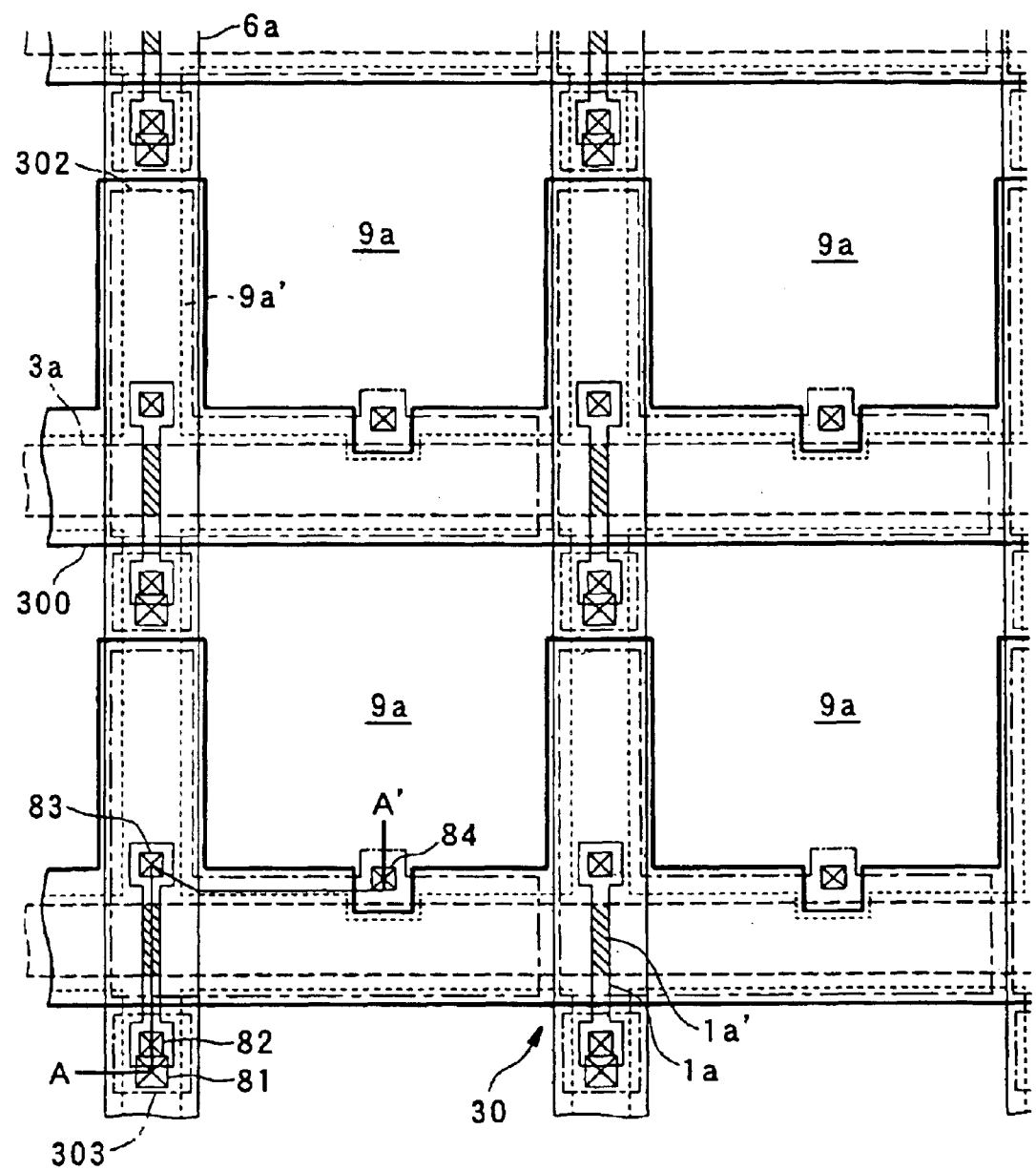
FIG. 2 is a plan view showing a plurality of pixels mutually adjacent to each other in a TFT array substrate having data lines, scanning lines, and pixel electrodes formed thereon in the electro-optical device of the first embodiment.
Figure 3:
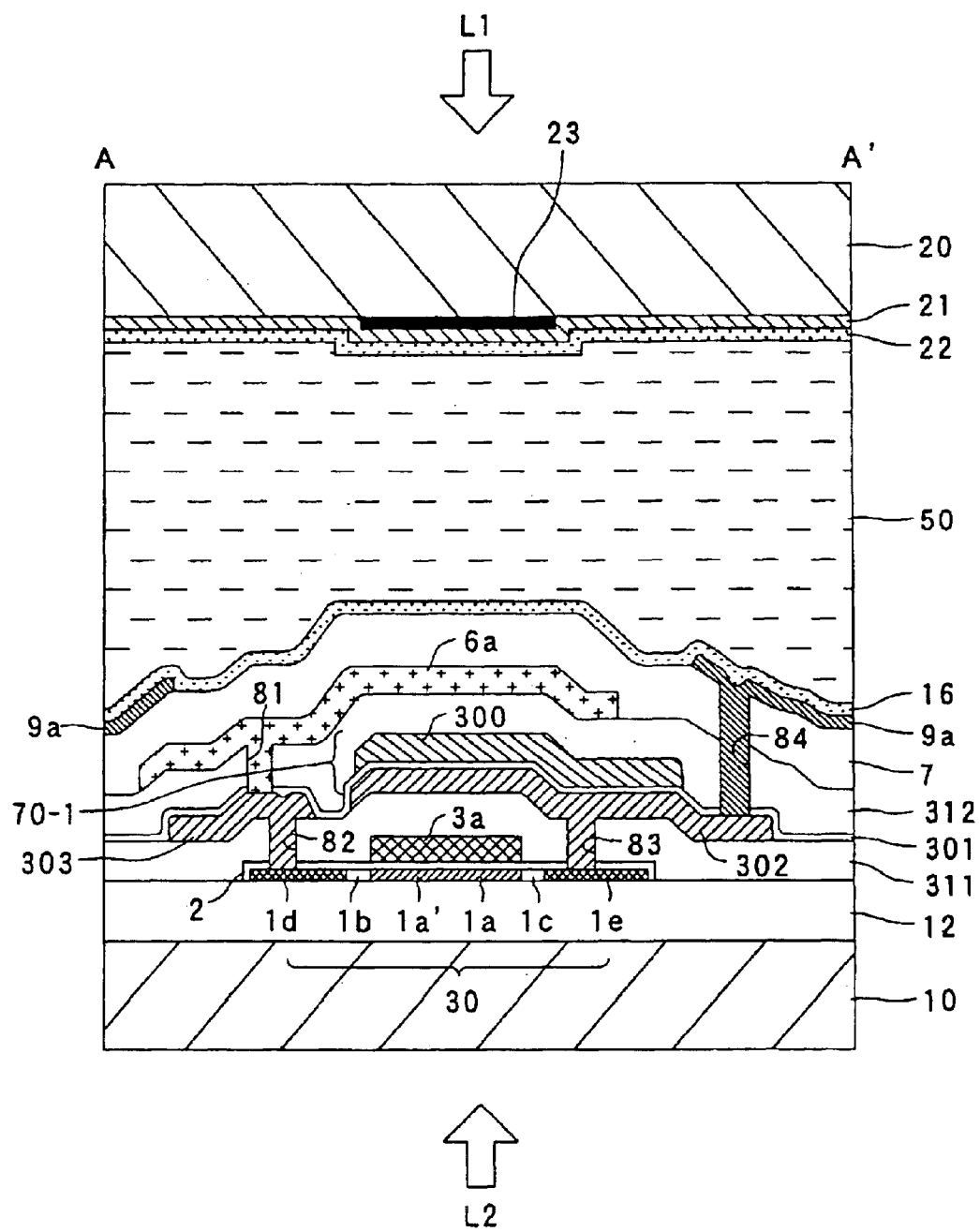
FIG. 3 is a cross-sectional view of the TFT array taken along line A–A' in FIG. 2.

The electro-optical device of a first embodiment of the present invention will now be discussed, referring to FIG. 1 through FIG. 3. FIG. 1 shows an exemplary circuit of a variety of elements, and wirings arranged in a matrix of pixels forming an image display area in the electro-optical device. FIG. 2 is a plan view showing a plurality of pixels adjacent to each other in a TFT array substrate having data lines, scanning lines, and pixel electrodes formed thereon in the electro-optical device. FIG. 3 is a cross-sectional view of the TFT array taken along line A–A' in FIG. 2. In FIG. 3, layers and members are not necessarily drawn to scale to show the layers and members in easy-to-identify sizes.

Referring to FIG. 1, each of a plurality of pixels arranged in a matrix forming an image display area of the electro-optical device of this embodiment can include a pixel electrode 9a and a TFT 30 for controlling the pixel electrode 9a, and a data line 6a to which an image signal is supplied is electrically connected to the source of the TFT 30. Image signals S1, S2, . . . , Sn may be supplied in that order to the data lines 6a on a one line at a time basis or may be supplied to the data lines 6a on a group by group basis, each group including a plurality of adjacent data lines 6a. Scanning lines 3a are respectively electrically connected to the gates of the TFTs 30, and are supplied at a predetermined timing with scanning signals G1, G2, . . . , Gm in a pulse form in that order on a line at a time basis. The pixel electrodes 9a are electrically connected to the drains of the TFTs 30, and close the TFTs 30 as switching elements for a constant duration of time, thereby writing the image signals S1, S2, . . . , Sn supplied from the data lines 6a at a predetermined timing. The image signals S1, S2, . . . , Sn at a predetermined level written on the liquid crystal as one example of electro-optical material through pixel electrodes 9a are held between a counter electrode (to be discussed later) formed on a counter substrate (to be discussed later) and the pixel electrodes 9a.

The liquid crystal modulates light to present a gradation display by changing the orientation or order of a set of molecules with an applied voltage level. In the normally white mode, transmittance ratio to incident light drops in response to the applied voltage while in the normally black mode, the transmittance ratio to the incident light rises in response to the applied voltage. The liquid-crystal display device outputs light having a contrast responsive to the image signal. In order to prevent the stored image signal from being leaked, a storage capacitor 70 is added in parallel with the capacitance of the liquid crystal formed between the pixel electrode 9a and the counter electrode. The storage capacitor 70 is formed by interposing a dielectric layer between the drain of the TFT 30 and a capacitive line 300 for feeding a constant voltage.

Referring to FIG. 2, the TFT array substrate of the liquid-crystal display device can include a matrix of transparent pixel electrodes 9a (with the outlines thereof represented by dotted lines 9a'). The data line 6a, and the scanning line 3a run respectively vertically and horizontally along each pixel electrode 9a.

The scanning line 3a is arranged to face a channel region 1a' of a semiconductor layer 1a hatched with downward inclined lines, and functions as a gate electrode. Arranged in each intersection of the scanning line 3a and the data line 6a is a pixel switching TFT 30 in which the scanning line 3a is opposed to the channel region 1a'.

In this embodiment, the capacitive line 300 overlaps the formation area of the scanning line 3a, as represented by solid lines in FIG. 2. Specifically, the capacitive line 300 includes a main line portion that generally runs along the scanning line 3a, a portion projecting upward along the data line 6a from the intersection thereof with the data line 6a, and a neck portion having a cutout in alignment with a contact hole 84. Specifically, the capacitive line 300 can be formed of a single metal layer, an alloy layer, a metal silicide layer, a polysilicide layer, or a multilayer of these layer, each layer fabricated of at least a refractory metal selected from the group including Ti, Cr, W, Ta, Mo, and Pb.

Referring to FIG. 2 and FIG. 3, the data line 6a is electrically connected to a heavily doped source region 1d of the semiconductor layer 1a, fabricated of a polysilicon layer, through a barrier layer 303 and contact holes 81 and 82. On the other hand, the pixel electrode 9a can be electrically connected to a heavily doped drain region 1e of the semiconductor layer 1a through contact holes 83 and 84 and through a capacitive electrode 302, as a barrier layer, formed of the same layer as that forming the barrier layer 303.

Even if an interlayer distance between the pixel electrode 9a and the semiconductor layer 1a forming the TFT 30 is as long as 1000 nm or so, two relatively small diameter contact holes 83 and 84 connected in series connect the pixel electrode 9a to the semiconductor layer 1a in an excellent condition using the capacitive electrode 302 as a barrier layer, in a manner free from any difficulty such as of connecting the pixel electrode 9a and the semiconductor layer 1a using a single contact hole. Accordingly, the aperture ratio of the pixel is thus increased.

With the barrier layer employed, etching through is prevented during the opening of the contact hole. Similarly, even if an interlayer distance between the data line 6a and the semiconductor layer 1a forming the TFT 30 is long, two relatively small diameter contact holes 81 and 82 connected in series connect the data line 6a to the semiconductor layer 1a in an excellent condition using the barrier layer 303, in a manner free from any difficulty such as of connecting the data line 6a and the semiconductor layer 1a using a single contact hole. The capacitive electrode 302 and the barrier layer 303 are formed of a single metal layer, an alloy layer or a metal silicide layer, each layer fabricated of at least a refractory metal selected from the group including Ti, Cr, W, Ta, Mo, and Pb. By fabricating the capacitive electrode 302 and the barrier layer 303 of these refractory metals, the capacitive electrode 302 and the barrier layer 303 function as a light shielding film defining at least part of the aperture area of each pixel. The capacitive electrode 302 and the barrier layer 303 are produced relatively easily by using a sputtering technique. Alternatively, the capacitive electrode 302 and the barrier layer 303 may be fabricated of a metal layer other than a refractory metal, may be fabricated of a light absorption layer, or may be fabricated of a conductive transparent polysilicon layer having no light shield function, or may be fabricated of a multi-layer composed of a plurality of these layers. At any rate, the thickness of each of the capacitive electrode 302 and the barrier layer 303 falls within a range from 50 to 500 nm.

Referring to FIG. 2 and FIG. 3, the capacitive electrode 302 and the capacitive line 300 are opposed to each other with a dielectric layer 301 interposed therebetween, and a storage capacitor 70-1 as one example of the storage capacitor 70 (see FIG. 1) is formed in an area overlapping the scanning line 3a and in an area overlapping the data line 6a in a plan view.

The capacitive line 300 extends and covers the scanning line 3a while covering the capacitive electrode 302, within the formation area of the data line 6a, with the projecting portion thereof in a comb-like configuration. The capacitive electrode 302 can be an L-shaped island capacitive electrode with one segment thereof extending from the intersection of the scanning line 3a and the data line 6a along the projecting portion of the capacitive line 300 within the formation area of the data line 6a and with the other segment thereof extending along the capacitive line 300 within the formation area of the scanning line 3a up to the area near the adjacent data line 6a. The storage capacitor 70-1 can thus be formed in the region where the L-shaped capacitive electrode 302 overlaps the capacitive line 300 with the dielectric layer 301 interposed therebetween.

The capacitive electrode 302, which is one electrode of the storage capacitor 70-1, is connected to the pixel electrode 9a via the contact hole 84 (while being connected to the heavily doped drain region 1e via the contact hole 83), and remains at the pixel-electrode potential.

The capacitive line 300, which includes the other electrode of the storage capacitor 70-1, partly surrounds the image display area containing the pixel electrode 9a, and is electrically connected to a constant voltage power source to be fixed to a constant potential. The constant voltage power source may be a positive voltage power source or a negative voltage power source for supplying power to a scanning line driving circuit (to be discussed in greater detail below)

which supplies the scanning line 3a with a scanning signal for driving the TFT 30, and a data line driving circuit (to be discussed later) for controlling a sampling circuit which supplies the data line 6a with an image signal. The constant voltage power source may be fixed to a constant voltage supplied to the counter substrate.

The dielectric layer 301 of the storage capacitor 70-1 may be a silicon oxide layer, such as an HTO (High Temperature Oxide) layer or an LTO (Low Temperature Oxide) layer, or a silicon nitride layer, each layer having a relatively small thickness falling within a range from 5 to 200 nm. To increase the capacitance of the storage capacitor 70-1, the thinner the dielectric layer 301 is, the better it is as long as layer reliability is assured.

Referring to FIG. 3, the electro-optical device can include a transparent TFT array substrate 10 and a transparent counter substrate 20 opposed to the TFT array substrate 10. The TFT array substrate 10 is fabricated of a quartz substrate, a glass substrate, or a silicon substrate, for instance, and the counter substrate 20 is fabricated of a glass substrate or a quartz substrate, for instance. The TFT array substrate 10 can be provided with the pixel electrodes 9a, and arranged on top of them is an alignment layer 16 which has been subjected to a predetermined alignment treatment such as a rubbing process. The pixel electrode 9a is fabricated of a transparent, conductive film, such as an ITO (Indium Tin Oxide) film. The alignment layer 16 is fabricated of an organic thin film, such as a polyimide thin film.

The counter substrate 20 has a counter electrode (common electrode) 21 extending on the entire surface thereof, and an alignment layer 22 therebeneath that has been subjected to a predetermined alignment treatment such as a rubbing process. The counter electrode 21 is fabricated of a transparent, conductive film, such as an ITO film. The alignment layer 22 is fabricated of an organic thin film such as a polyimide thin film.

Arranged on the TFT array substrate 10 is a pixel switching TFT 30, adjacent to each pixel electrode 9a, for controlling switching of the pixel electrode 9a.

Arranged on the counter substrate 20 is a second light shielding film 23, as shown in FIG. 3. For this reason, incident light L1 from the counter substrate 20 cannot enter the channel region 1a', a lightly doped source region 1b, and a lightly doped drain region 1c of the semiconductor layer 1a of the pixel switching TFT 30. The second light shielding film 23 may be provided with a highly reflective surface for reflecting the incident light L1, thereby preventing temperature from rising in the electro-optical device.

In this embodiment, the data line 6a having a light shielding property fabricated of aluminum may be used to prevent transmittance of light into a portion of each pixel, along the data line 6a. The capacitive line 300 may be fabricated of film having a light shielding property to prevent transmittance of light into the underside of the data line 6a other than the formation area of the contact holes 81 and 82.

In this arrangement, a liquid crystal can be encapsulated in a gap surrounded by a sealing material between the TFT array substrate 10 and the counter substrate 20 arranged with the pixel electrodes 9a facing the counter electrode 21. A liquid-crystal layer 50 is thus formed. The liquid-crystal layer 50 takes a predetermined orientation state by the alignment layer 16 and the alignment layer 22 with no electric field applied by the pixel electrode 9a. The liquid-crystal layer 50 is formed of a mixture of one or several types of nematic liquid crystals. The sealing material is an adhesive agent made of a thermal setting agent or a photo-setting agent for bonding the TFT array substrate 10 to the counter substrate 20 along the edges thereof, and is mixed with spacers such as glass fiber or glass beads to keep a predetermined distance between the two substrates.

An underlayer insulator 12 is arranged beneath the pixel switching TFT 30. The underlayer insulator 12 is formed on the entire surface of the TFT array substrate 10, and has the function of preventing the characteristics of the pixel switching TFT 30 from being degraded by surface irregularity of the TFT array substrate 10 caused during a polishing process or dirt left after a cleaning operation.

Referring to FIG. 3, the pixel switching TFT 30 has an LDD (Lightly Doped Drain) structure, and includes the scanning line 3a, the channel region 1a' of the semiconductor layer 1a in which a channel is formed by the electric field from the scanning line 3a, the thin insulating layer 2 for insulating the scanning line 3a from the semiconductor layer 1a, the data line 6a, the lightly doped source region 1b and the lightly doped drain region 1c of the semiconductor layer 1a, and the heavily doped source region 1d and the heavily doped drain region 1e of the semiconductor layer 1a. A corresponding one of the plurality of the pixel electrodes 9a is connected to the heavily doped drain region 1e through the contact holes 83 and 84 and the capacitive electrode 302 (which functions as a capacitive electrode). Arranged on the scanning line 3a is a first interlayer insulator 311 in which the contact hole 82 leading to the heavily doped source region 1d and the contact hole 83 leading to the heavily doped drain region 1e are formed.

Arranged on the capacitive line 300 is a second interlayer insulator 312 in which the contact hole 81 leading to the barrier layer 303 and the contact hole 84 leading to the capacitive electrode 302 are formed.

The data line 6a is arranged on the second interlayer insulator 312, and an interlayer insulator 7 is deposited on the data line 6a. The contact hole 84 leading to the capacitive electrode 302 is formed in the interlayer insulator 7. The above-referenced pixel electrode 9a is formed on the interlayer insulator 7 thus constructed.

In accordance with this embodiment, the capacitive line 300 and the capacitive electrode 302 are three-dimensionally stacked over the scanning line 3a and the data line 6a on the TFT array substrate. The capacitive line 300 extends over the scanning line 3a while partly projecting over the data line 6a. The capacitive electrode 302 extends in the L-shaped configuration along the capacitive line 300, thereby forming the storage capacitor 70-1. Unlike the conventional art in which the capacitive line 300 runs alongside the scanning line 3a, the non-aperture area of each pixel is not expanded, and a large capacitance of the capacitor can be obtained. With a sufficiently wide line width, the resistance of the scanning line 3a and the capacitive line 300 is lowered. Accordingly, the electro-optical device thus has a high aperture ratio of the fine-pitched pixel while providing an improved image quality for a presented image free from cross-talk and ghost.

In this embodiment, the capacitive electrode 302 at the pixel-electrode potential is laminated closer to the scanning line 3a than the capacitive line 300 at a predetermined potential is laminated to the scanning line. For this reason, the first interlayer insulator 311 interposed between the capacitive electrode 302 and the scanning line 3a is preferably as thick as 200 to 2000 nm. With the first interlayer insulator 311 being relatively thick, an adverse effect through capacitive coupling between the capacitive electrode 302 and the scanning line 3a is practically controlled. On the other hand, since the capacitive line 300 at the predetermined potential is laminated between the capacitive electrode 302 and the data line 6a, the data line 6a is advantageously free from an adverse effect through capacitive coupling in response to variations in the potential of the capacitive electrode 302, and the capacitive electrode 302 (and further the pixel electrode 9a) is advantageously free from an adverse effect through capacitive coupling in response to variations in the potential of the data line 6a.

The capacitive line 300 can be formed of a light shielding film, and further, the capacitive electrode 302 and the barrier layer 303 may be fabricated of a light shielding film. These layers may function as a light shielding film defining the aperture area of each pixel. As shown in the plan view in FIG. 2, preferably, the scanning line 3a, the data line 6a, and the TFT 30 are kept within the formation area of the light shielding film. In this arrangement, the incident light L1 entering into the TFT array substrate 10 from above as shown in FIG. 3 is not reflected from the scanning line 3a, the data line 6a, and the surface of the TFT 30, because no portion of any of the scanning line 3a, the data line 6a, and the surface of the TFT 30 projects out of the light shielding film. The arrangement prevents the generation of internal reflections and multiple reflections of light in the electro-optical device.

Although not discussed in detail in this embodiment, a lower light shielding film (a first light shielding film 11a shown in FIG. 7) covering the TFT 30 from the TFT array substrate 10 (from below in FIG. 3) may be arranged to run in a stripe configuration along the scanning line 3a or in a matrix along the scanning line 3a and the data line 6a. Such a lower light shielding film blocks a returning light L2 from the back surface of the TFT array substrate or a projection optical system, thereby preventing optical excitation due to the returning light L2. As a result, a leakage current arising from optical excitation is controlled during the turning off of the TFT 30, thereby effectively preventing characteristics of the TFT 30 from varying. The lower light shielding film can be formed of a single metal layer, an alloy layer, a metal silicide layer, or a polysilicide layer, each layer fabricated of at least a refractory metal selected from the group including Ti, Cr, W, Ta, Mo, and Pb. The returning light L2 that passes through a prism from another electro-optical device is particularly strong in an optical system such as a multi-panel color projector in which a plurality of electro-optical devices is combined through a prism. The use of the lower light shielding film beneath the TFT 30 is particularly useful. Like the capacitive line 300, the lower light shielding film may extend surrounding the image display area and may be connected to a constant voltage power source.

Although the lamination of several conductive layers forms steps on the area along the data line 6a and the scanning line 3a in the embodiment described above, a planarization process may be performed by grooving a trench in the TFT array substrate 10, the underlayer insulator 12, the first interlayer insulator 311, and the second interlayer insulator 312, and by embedding the wiring of the data line 6a and the TFT 30 in the trench. The steps on the interlayer insulator 7 and the second interlayer insulator 312 may be polished away through a CMP (Chemical Mechanical polishing) process. Alternatively, an organic SOG may be used to planarize the laminate structure.

In the embodiment described above, the pixel switching TFT 30 preferably has the LDD structure shown in FIG. 3. Alternatively, the pixel switching TFT 30 may have an offset structure in which no impurity ion implantation is performed on the lightly doped source region 1b and the lightly doped drain region 1c, or may have a self-aligned type TFT in which a high dose impurity ion is implanted with part of the gate electrode 3a being used as a mask, to form heavily doped source and drain in a self-alignment process. In this embodiment, the gate electrode of the pixel switching TFT 30 is of a single gate structure in which a single gate is interposed between the heavily doped source region 1d and the heavily doped drain region 1e, but alternatively, more than one gate electrode may be interposed therebetween. With dual gates or triple gates employed in a TFT, leakage currents in junctions between the channel region and the source region and between the channel region and the drain region are prevented, and thereby a current during off period is reduced.

In the electro-optical device in the first embodiment and each of the following embodiments to be discussed below, the various interlayer insulators, each interposed between conductive layers, can be fabricated of a silicate glass film such as NSG (non-doped silicate glass), or PSG (phosphosilicate glass), a silicon nitride film, or a silicon oxide film, using TEOS (trimethyl phosphosilicate) gas, or TEB (triethyl borate) gas or the like through an atmospheric CVD method, a reduced pressure CVD method, or a plasma CVD method.

Figure 4:
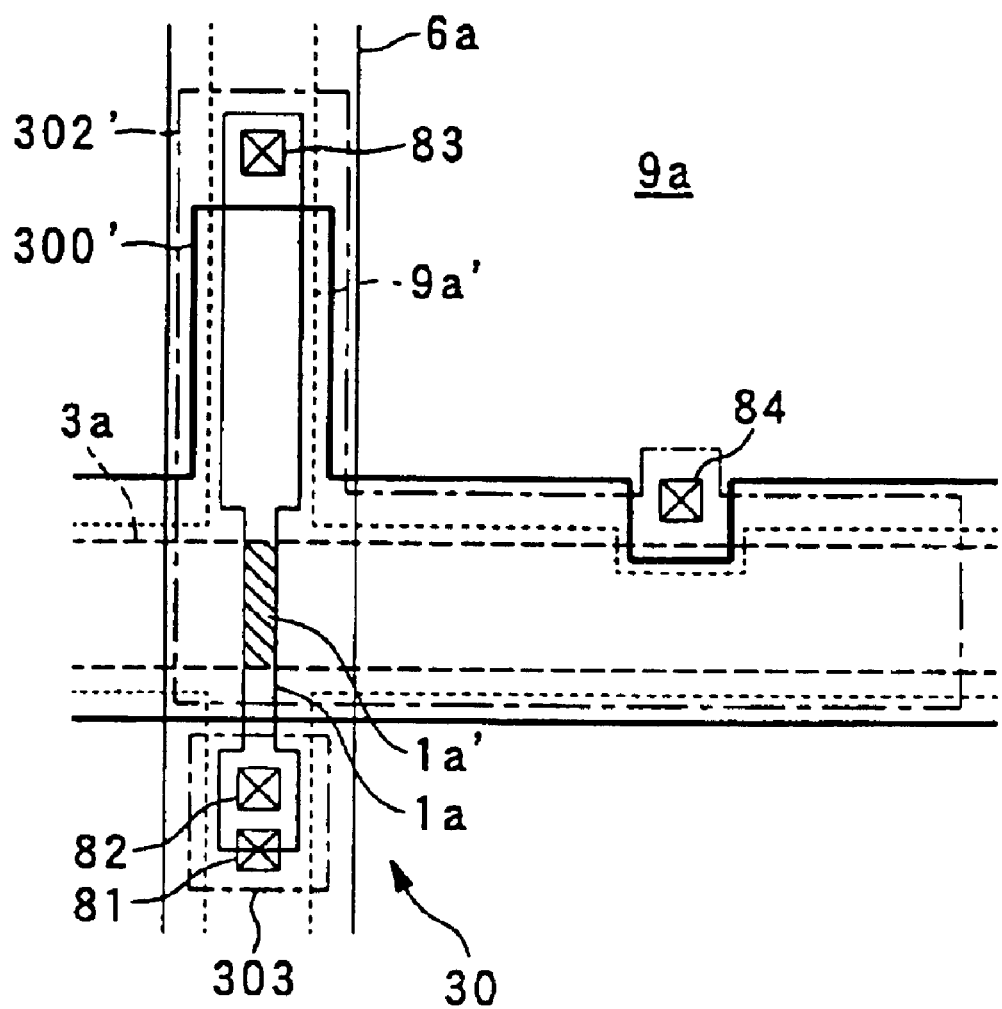
FIG. 4 is a plan view showing a pixel in a TFT array substrate having a data line, a scanning line, and a pixel electrode formed thereon in the electro-optical device of a second embodiment.
Figure 5:
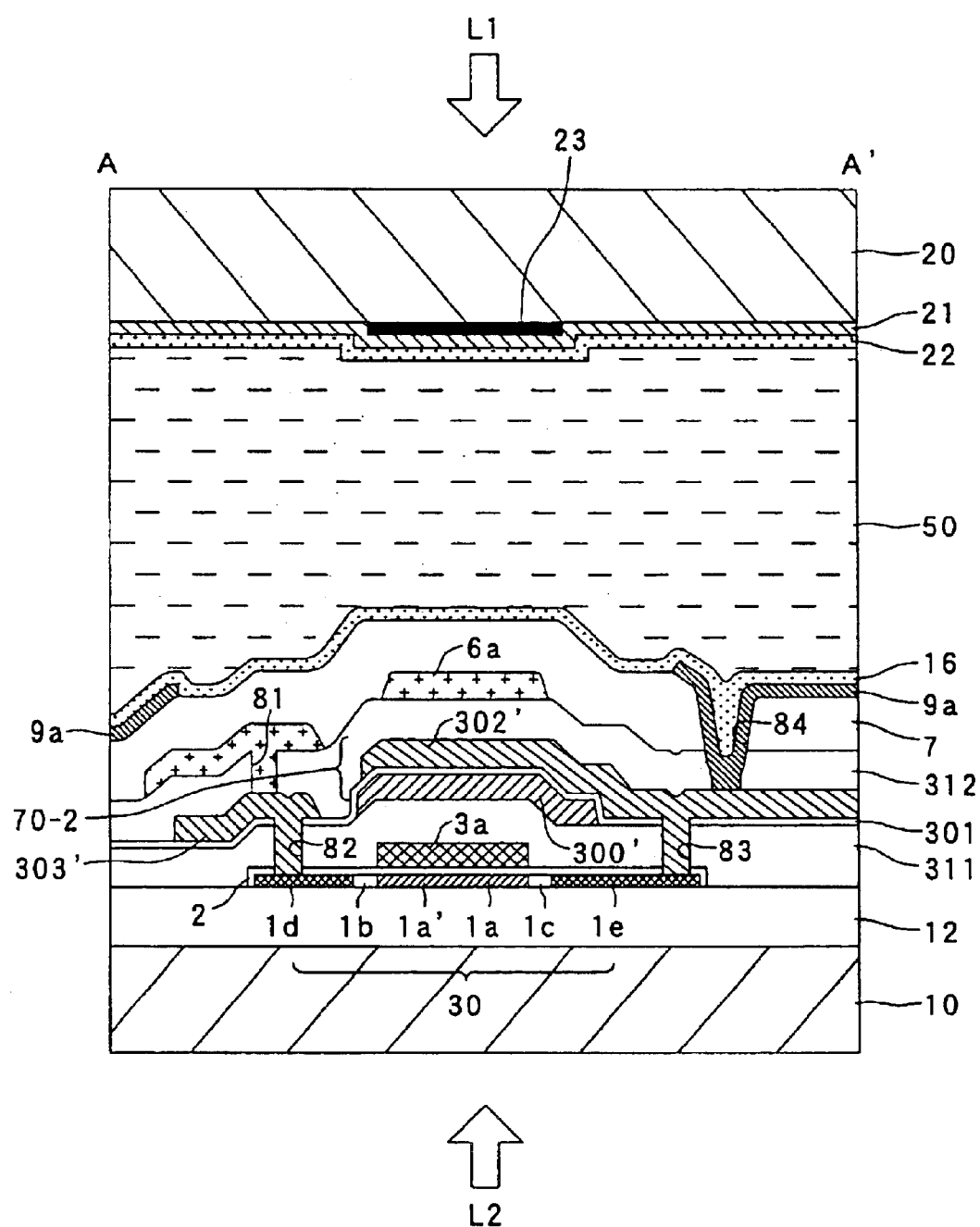
FIG. 5 is a cross-sectional view diagrammatically showing a connection of layers through contact holes and a laminate structure forming a storage capacitor in the electro-optical device of FIG. 4.

A second embodiment of the electro-optical device of this invention will now be discussed referring to FIG. 4 and FIG. 5. FIG. 4 is a plan view showing a pixel in a TFT array substrate having a data line, a scanning line, and a pixel electrode formed thereon in the electro-optical device of the second embodiment. FIG. 5 is a cross-sectional view diagrammatically showing a connection of layers through contact holes and a laminate structure forming a storage capacitor. In FIG. 5, the layers and elements are not necessarily drawn to scale to show the layers and members in easy-to-identify sizes and to help understand the connection of contact holes and the laminate structure forming a storage capacitor. In FIG. 4 and FIG. 5, elements identical to those described with reference to FIG. 2 and FIG. 3 (showing the first embodiment) are designated with the same reference numerals, and the discussion thereof is omitted.

Referring to FIG. 4 and FIG. 5, the second embodiment includes a capacitive line 300' formed of the lower conductive layer of a storage capacitor, instead of the capacitive electrode 302. A capacitive electrode 302', instead of the capacitive line 300, can be formed of the conductive layer that is laminated on the capacitive line 300' with dielectric layer 301 interposed therebetween. A barrier layer 303' connecting the data line 6a to the heavily doped source region 1d is formed of the same layer as that forming the capacitive electrode 302'. The capacitive line 300' remains at the predetermined potential in the same way as the capacitive line 300 in the first embodiment. The capacitive electrode 302' remains at the pixel-electrode potential in the same way as the capacitive electrode 302 in the first embodiment. A storage capacitor 70-2 as another example of the storage capacitor 70 (see FIG. 1) is thus created. The rest of the construction remains the same as that in the first embodiment.

Unlike the conventional art in which the capacitive line 300' runs alongside the scanning line 3a, the second embodiment does not need the expansion of the non-aperture area of each pixel. By laminating the capacitive line 300' and the capacitive electrode 302' on the scanning line 3a and the data line 6a on the TFT array substrate 10, a larger capacitance of the storage capacitor results. With a sufficient line width employed, the resistance of the scanning line 3a and the capacitive line 300' can be lowered. The electro-optical device thus has a high aperture ratio of the fine-pitched pixel while providing an improved image quality for a presented image free from cross-talk and ghosting.

In the second embodiment, the capacitive electrode 302' is laminated closer to the data line 6a than the capacitive line 300' at a predetermined potential is laminated to the data line 6a. For this reason, the second interlayer insulator 312 interposed between the capacitive electrode 302' and the data line 6a is preferably as thick as 200 to 2000 nm. With the second interlayer insulator 312 being relatively thick, an adverse effect through capacitive coupling between the capacitive electrode 302' and the data line 6a is practically controlled. On the other hand, since the capacitive line 300' at the predetermined potential is laminated between the capacitive electrode 302' and the scanning line 3a, the scanning line 3a is advantageously free from an adverse effect through capacitive coupling in response to variations in the potential of the capacitive electrode 302', and the capacitive electrode 302' (and further the pixel electrode 9a) is advantageously free from an adverse effect through capacitive coupling in response to variations in the potential of the scanning line 3a.

Figure 6:
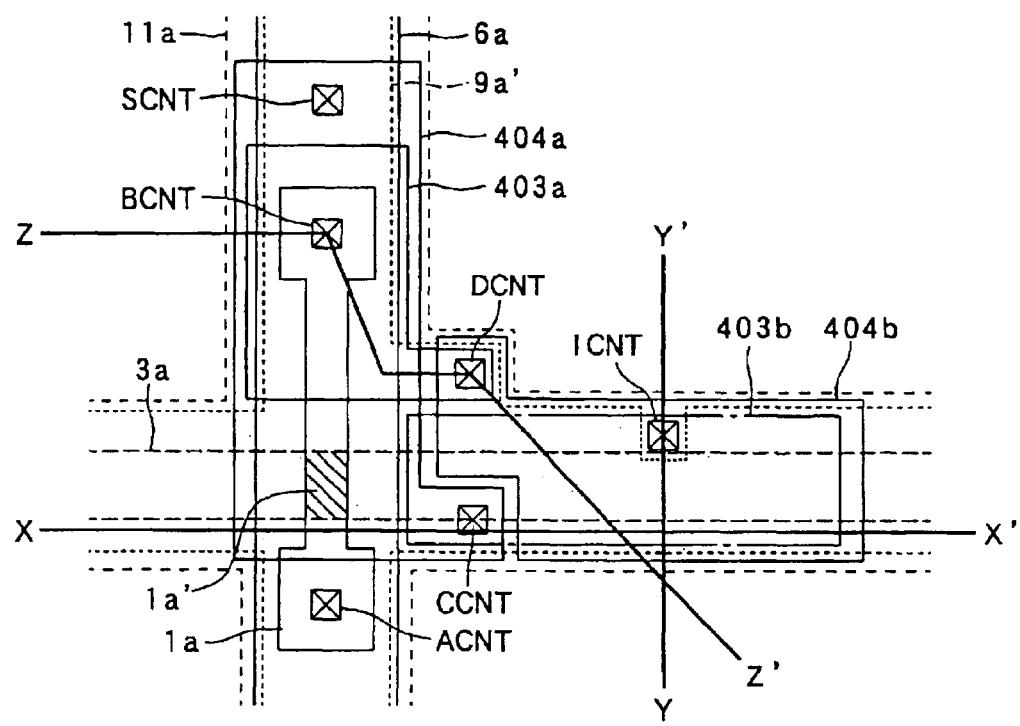
FIG. 6 is a plan view showing a pixel in a TFT array substrate having a data line, a scanning line, and a pixel electrode formed thereon in the electro-optical device of a third embodiment.
Figure 7:
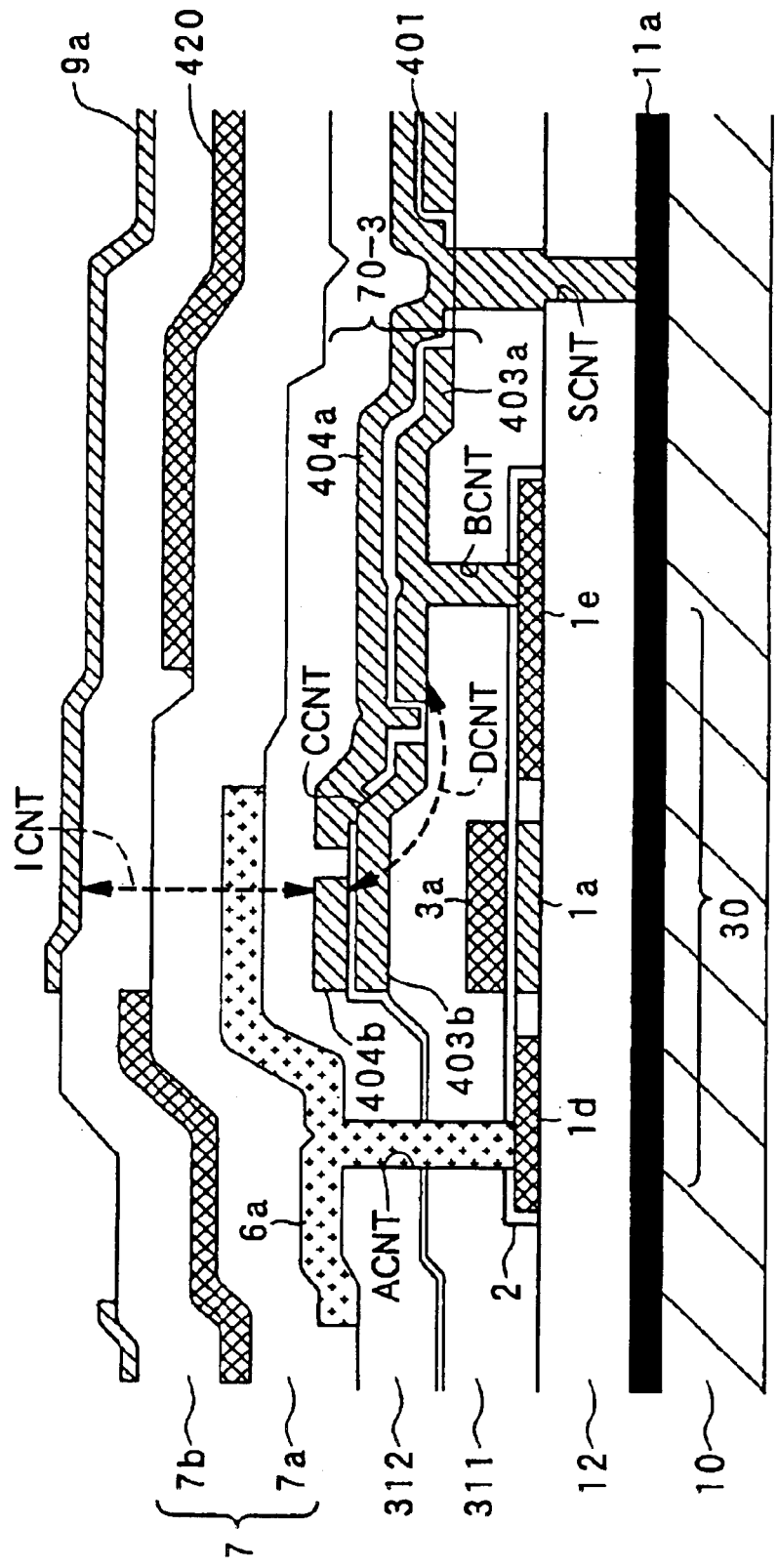
FIG. 7 is a cross-sectional view diagrammatically showing a connection of layers through contact holes and a laminate structure forming a storage capacitor in the electro-optical device of FIG. 6.
Figure 8:
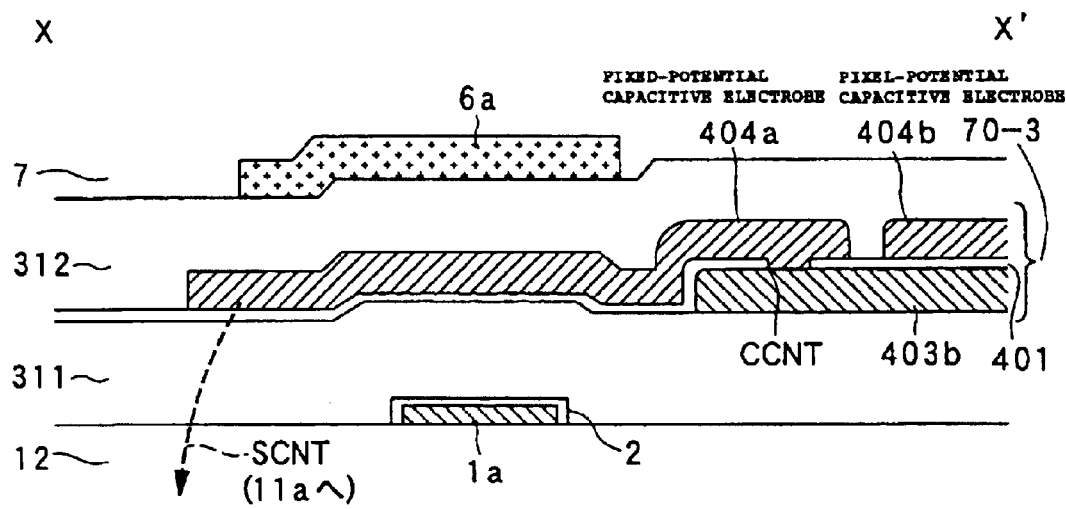
FIG. 8 is a cross-sectional view of the TFT array taken along line X–X' in FIG. 6.
Figure 9:
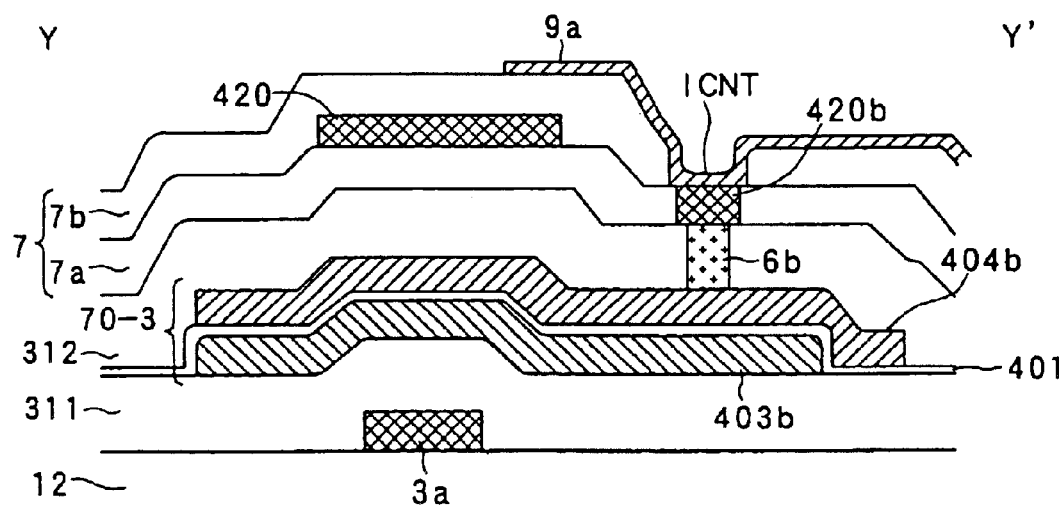
FIG. 9 is a cross-sectional view of the TFT array taken along line Y–Y' in FIG. 6.
Figure 10:
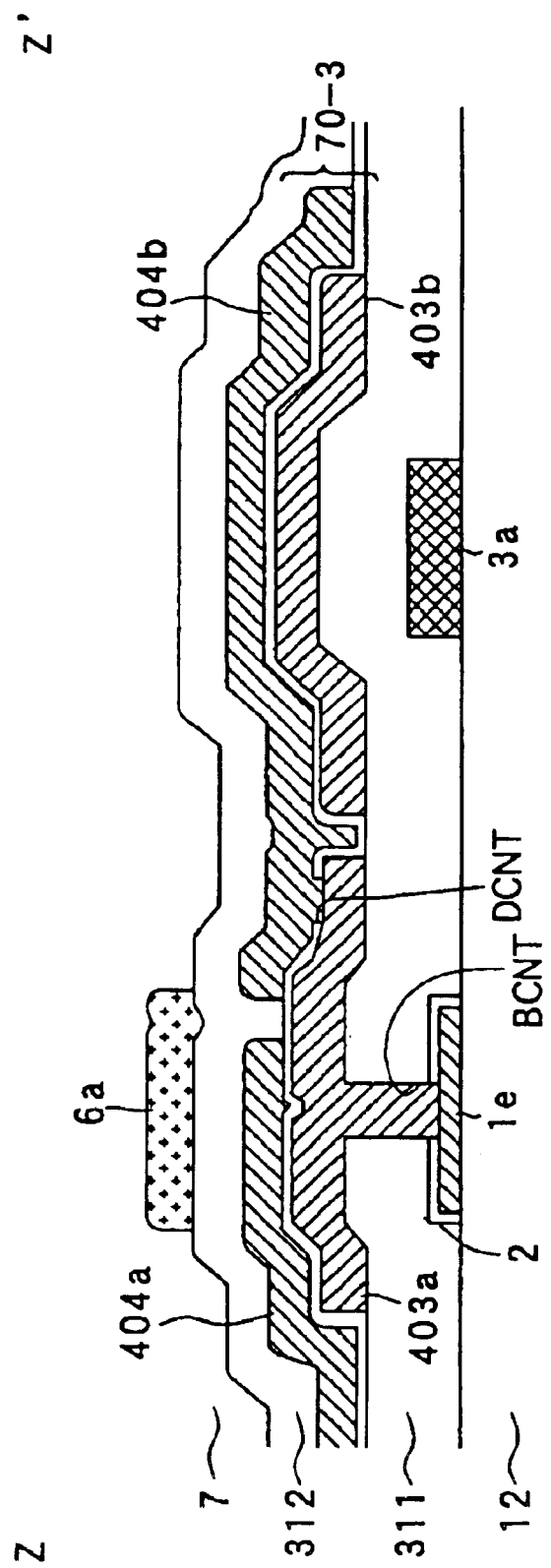
FIG. 10 is a cross-sectional view of the TFT array taken along line Z–Z' in FIG. 6.

A third embodiment of the present invention is now described referring to FIG. 6 through FIG. 10. FIG. 6 is a plan view showing a pixel in a TFT array substrate having a data line, a scanning line, and a pixel electrode formed thereon in the electro-optical device. FIG. 7 is a cross-sectional view diagrammatically showing a connection of layers through contact holes and a laminate structure forming a storage capacitor in the electro-optical device shown in FIG. 6. FIG. 8 is a cross-sectional view of the TFT array taken along line X–X' in FIG. 6. FIG. 9 is a cross-sectional view of the TFT array taken along line Y–Y' in FIG. 6. FIG. 10 is a cross-sectional view of the TFT array taken along line Z–Z' in FIG. 6. In FIG. 7, the layers and elements are not necessarily drawn to scale and are changed in relative position to show the layers and members in easy-to-identify sizes and to help understand the connection of contact holes, and the laminate structure forming a storage capacitor. In FIG. 8 through FIG. 10, the layers and elements are not necessarily drawn to scale to show the layers and members in easy-to-identify sizes. Referring to FIG. 6 through FIG. 10, elements identical to those described with reference to FIG. 2 and FIG. 3 (showing the first embodiment) are designated with the same reference numerals, and the discussion thereof is omitted.

In the electro-optical device of the third embodiment, a storage capacitor 70-3 includes a portion overlapping the data line 6a and a portion overlapping the scanning line 3a in a plan view. The electro-optical device of the third embodiment further includes a conductive first light shielding film 11a arranged beneath the underlayer insulator 12, and an embedded light shielding film 420 in the interlayer insulator 7 (i.e., between an interlayer insulator 7a and an interlayer insulator 7b).

Laminated on the TFT array substrate 10 as shown in FIG. 7 are the first light shielding film 11a also serving as a capacitive line connected to a predetermined potential in the peripheral area surrounding the image display area, the underlayer insulator 12 and the TFT 30 in that order. Laminated on the TFT 30 are the first interlayer insulator 311, a storage capacitor layer, the second interlayer insulator 312, the data line 6a, the interlayer insulator 7a, the embedded light shielding film 420, the interlayer insulator 7b, and the pixel electrode 9a in that order. The TFT 30 includes, in a channel region 1a' where the scanning line 3a intersects the data line 6a, the heavily doped source region 1d and the heavily doped drain region 1e are formed in a region overlapping the data line 6.

Referring to FIG. 6 and FIG. 7, an island barrier layer 403a extending from an area near the scanning line 3a and covering the formation area of the data line 6a is formed within the formation area of the data line 6a on the first interlayer insulator 311 as an example of the pixel-potential capacitive electrode forming the storage capacitor 70-3. The barrier layer 403a has a portion projecting into the pixel electrode 9a in a plan view. An island barrier layer 403b extending from an area near the data line 6a and covering the scanning line 3a is formed at the same layer as that forming the barrier layer 403a as an example of the fixed-potential capacitive electrode of the storage capacitor 70-3. A dielectric layer 401 is formed on the barrier layer 403a, the barrier layer 403b, and the first interlayer insulator 311. On the dielectric layer 401, an island barrier layer 404a covering the channel region 1a', the barrier layer 403a, and the data line 6a is formed within the formation area of the data line 6a as the fixed-potential capacitive electrode of the storage capacitor 70-3. The barrier layer 404a has a projecting portion overlapping the barrier layer 403b. An island barrier layer 404b covering the barrier layer 403b and the scanning line 3a is formed, on the scanning line 3a, at the same layer as that forming the barrier layer 404a as the pixel-potential capacitive electrode of the storage capacitor 70-3. The barrier layer 404b has a projecting portion that overlaps the projecting portion of the barrier layer 403a.

A contact hole ACNT penetrating the first interlayer insulator 311 and the second interlayer insulator 312 conductively connects the data line 6a to the heavily doped source region 1d.

To connect the heavily doped drain region 1e to the pixel electrode 9a, a contact hole BCNT penetrating the first interlayer insulator 311 conductively connects the heavily doped drain region 1e to the barrier layer 403a. Referring to FIG. 6 and FIG. 10, a contact hole DCNT conductively connects the projecting portion of the barrier layer 403a to the projecting portion of the barrier layer 404b. Referring to FIG. 6 and FIG. 9, a contact hole ICNT penetrating the second interlayer insulator 312 and the interlayer insulator 7 connects the barrier layer 404b to the pixel electrode 9a (represented by dotted line 9a' in FIG. 6).

To form the storage capacitor 70-3, the barrier layer 404a is conductively connected to the first light shielding film 11a as the capacitive line at the predetermined potential through a contact hole SCNT penetrating the first interlayer insulator 311 and the underlayer insulator 12. Referring to FIG. 6 and FIG. 8, a contact hole CCNT conductively connects the projecting portion of the barrier layer 404a to the barrier layer 403b, thereby setting the barrier layer 403b at the predetermined potential. The barrier layer 404b and the barrier layer 403a leading to the pixel electrode 9a are set to the pixel-electrode potential.

In the third embodiment, the storage capacitor 70-3 is partly formed of the barrier layer 403a and the barrier layer 404a with the dielectric layer 401 interposed therebetween, and partly formed of the barrier layer 403b and the barrier layer 404b with the dielectric layer 401 interposed therebetween. The entire storage capacitor 70-3 is thus formed in the formation regions overlapping the scanning line 3a and the data line 6a. The first light shielding film 11a functions as a capacitive line to be fixed to a predetermined potential near the image display area while having the function of preventing the light returning from the TFT array substrate 10 from entering the semiconductor layer 1a of the TFT 30.

Unlike the conventional art, in which the capacitive line runs alongside the scanning line, the third embodiment does not need the expansion of the non-aperture area of each pixel. By laminating the capacitive line and the capacitive electrode on the scanning line and the data line on the TFT array substrate, a larger capacitance of the storage capacitor results. With a sufficiently wide line width employed, the resistance of the scanning line and the capacitive line can be lowered. The electro-optical device thus has a high aperture ratio of the fine-pitched pixel while providing an improved image quality for a presented image free from cross-talk and ghosting.

In accordance with the third embodiment, the conductive electrode forming the pixel-potential capacitive electrode and the conductive layer forming the fixed-potential capacitive electrode are reversed in the region running along the scanning line 3a and in the region running along the data line 6a. Specifically, since the barrier layer 403b at the predetermined potential is laminated between the barrier layer 404b at the pixel-electrode potential and the scanning line 3a within the major portion of the area along the scanning line 3a, the scanning line 3a is free from an adverse effect through capacitive coupling arising from variations in the potential of the barrier layer 404b, and the barrier layer 404b (and the pixel electrode 9a) is free from an adverse effect through capacitive coupling arising from variations in the potential of the scanning line 3a. At the same time, since the barrier layer 404a at the predetermined potential is laminated between the barrier layer 403a at the pixel-electrode potential and the data line 6a within the major portion of the area along the data line 6a, the data line 6a is free from an adverse effect through capacitive coupling arising from variations in the potential of the barrier layer 403a, and the barrier layer 403a (and the pixel electrode 9a) is free from an adverse effect through capacitive coupling arising from variations in the potential of the data line 6a.

In the third embodiment, the capacitive line can be formed of the first light shielding film 11a which runs in a stripe configuration or in a grid configuration on the TFT array substrate 10 and which is respectively fixed to the island barrier layer 403b and the island barrier layer 404a formed for each pixel on the TFT array substrate 10. The capacitive line is thus connected to the predetermined potential through the first light shielding film 11a outside the image display area. Taking advantage of a constant voltage line or a constant voltage power source outside the image display area, the capacitive line wired within the image display area is relatively easily and reliably set to the predetermined potential.

Like the capacitive electrode 302 and the barrier layer 303 in the first embodiment, the barrier layers 403a, 403b, 404a, and 404b, the first light shielding film 11a, and the embedded light shielding film 420 are fabricated of a refractory metal, an alloy, a metal silicide, or a multi-layer containing these elements. The thickness of the first light shielding film 11a falls within a range from 5 to 200 nm. Referring to FIG. 9, a plug 6b may be formed within the contact hole ICNT by using the same layer (Al film) as that forming the data line 6a formed on the second interlayer insulator 312, and a plug 420b may be formed by using the same layer as that forming the embedded light shielding film 420 formed on the interlayer insulator 7a. A plug may be formed in each contact hole by using a conductive layer in each interlayer insulator or each contact hole may be directly connected without a plug.

Figure 11:
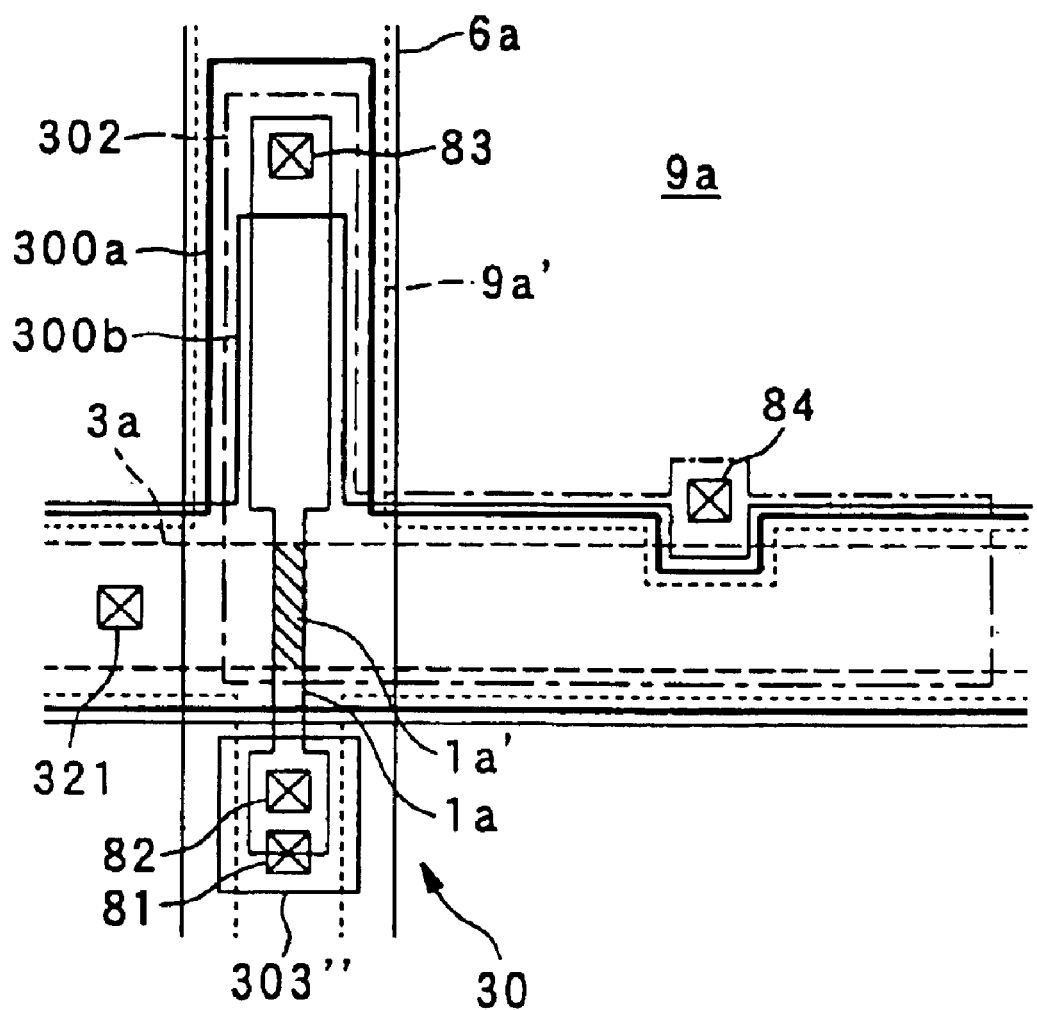
FIG. 11 is a plan view showing a pixel in a TFT array substrate having a data line, a scanning line, and a pixel electrode formed thereon in the electro-optical device of a fourth embodiment.
Figure 12:
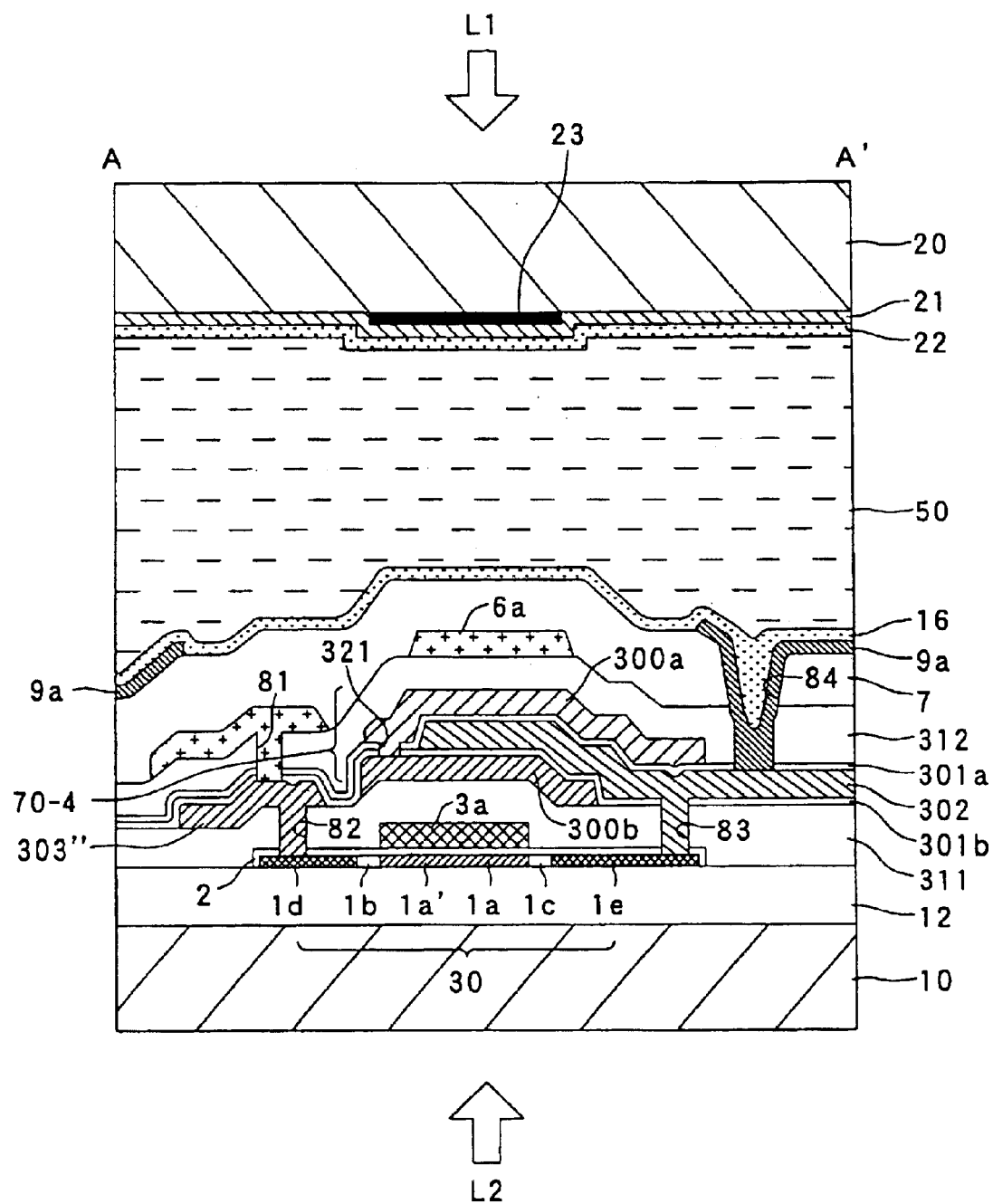
FIG. 12 is a cross-sectional view diagrammatically showing a connection of layers through contact holes and a laminate structure forming a storage capacitor in the electro-optical device of FIG. 11.

A fourth embodiment of the electro-optical device of the present invention is described with reference to FIG. 11 and FIG. 12. FIG. 11 is a plan view showing a pixel in a TFT array substrate having a data line, a scanning line, and a pixel electrode formed thereon in the electro-optical device. FIG. 12 is a cross-sectional view diagrammatically showing a connection of layers through contact holes and a laminate structure forming a storage capacitor in the electro-optical device of FIG. 11. Referring to FIG. 12, the layers and elements are not necessarily drawn to scale and are changed in relative position to show the layers and members in easy-to-identify sizes and to help understand the connection of contact holes, and the laminate structure forming a storage capacitor. In FIG. 11 through FIG. 12, elements identical to those described with reference to FIG. 2 and FIG. 3 (showing the first embodiment) are designated with the same reference numerals and the discussion thereof is omitted.

Referring to FIG. 11 and FIG. 12, the fourth embodiment can include a pair of capacitive lines 300a and 300b that are connected through a contact hole 321, instead of the capacitive line 300 used in the first embodiment. The contact hole 321 is opened in dielectric layers 301a and 301b near the center of the scanning line 3a out of the formation area of the data line 6a in a plan view. The capacitive lines 300a and 300b sandwich the capacitive electrode 302, thereby forming a storage capacitor 70-4 as another example of the storage capacitor 70 (see FIG. 1). The capacitive lines 300a and 300b run, covering the scanning line 3a, and has a projecting portion upwardly extending in a comb-like configuration from the intersection thereof with the data line 6a as shown in FIG. 11. The projecting portion of the capacitive line 300b extends near the contact hole 83 which connects the heavily doped drain region 1e to the capacitive electrode 302 while the projecting portion of the capacitive line 300b extends beyond the contact hole 83. The capacitive L-shaped electrode 302 is opposed to each of the capacitive lines 300a and 300b with the dielectric layers 301a and 301b interposed therebetween, thereby forming the storage capacitor 70-4. The barrier layer 303" is formed of the same layer as that forming the capacitive line 300b, for connecting the data line 6a to the heavily doped source region 1d through the contact holes 81 and 82. The rest of the construction of the laminate structure remains unchanged from that of the first embodiment.

Unlike the conventional art, in which the capacitive line runs alongside the scanning line, the fourth embodiment does not need the expansion of the non-aperture area of each pixel. By laminating the capacitive lines 300a and 300b and the capacitive electrode 302 on the scanning line 3a and the data line 6a on the TFT array substrate 10, a larger capacitance of the storage capacitor results.

Since the capacitive electrode 302 at the pixel-electrode potential is sandwiched between the pair of capacitive lines 300a and 300b at the predetermined potential from above and from below in the fourth embodiment, the scanning line 3a and the data line 6a are free from an adverse effect through capacitive coupling arising from variations in the potential of the capacitive electrode 302, and the capacitive electrode 302 (and the pixel electrode 9a) is free from an adverse effect through capacitive coupling arising from variations in the potential of the scanning line 3a and the data line 6a. This arrangement eliminates the need for thickening the first interlayer insulator 311 and the second interlayer insulator 312 in an attempt to reduce capacitive coupling.

Figure 13:
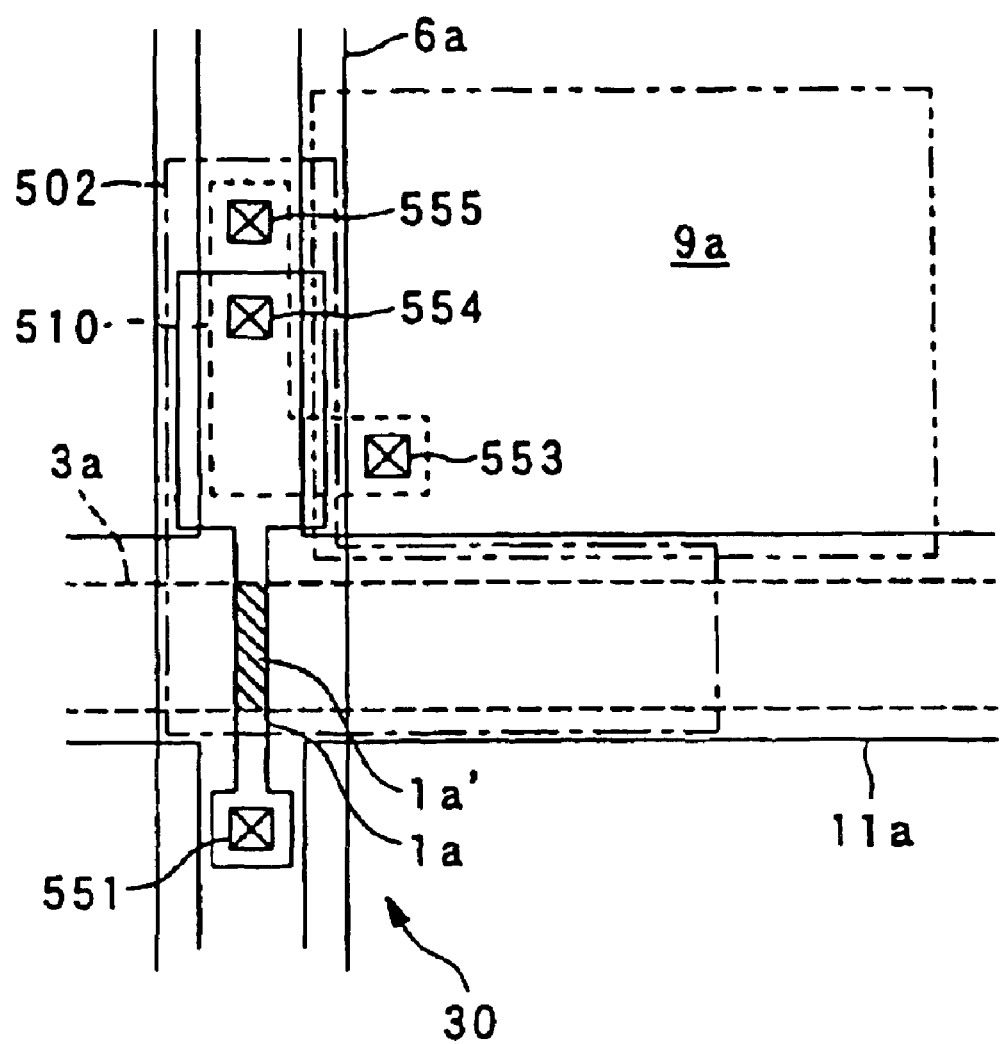
FIG. 13 is a plan view showing a pixel in a TFT array substrate having a data line, a scanning line, and a pixel electrode formed thereon in the electro-optical device of a fifth embodiment.
Figure 14:
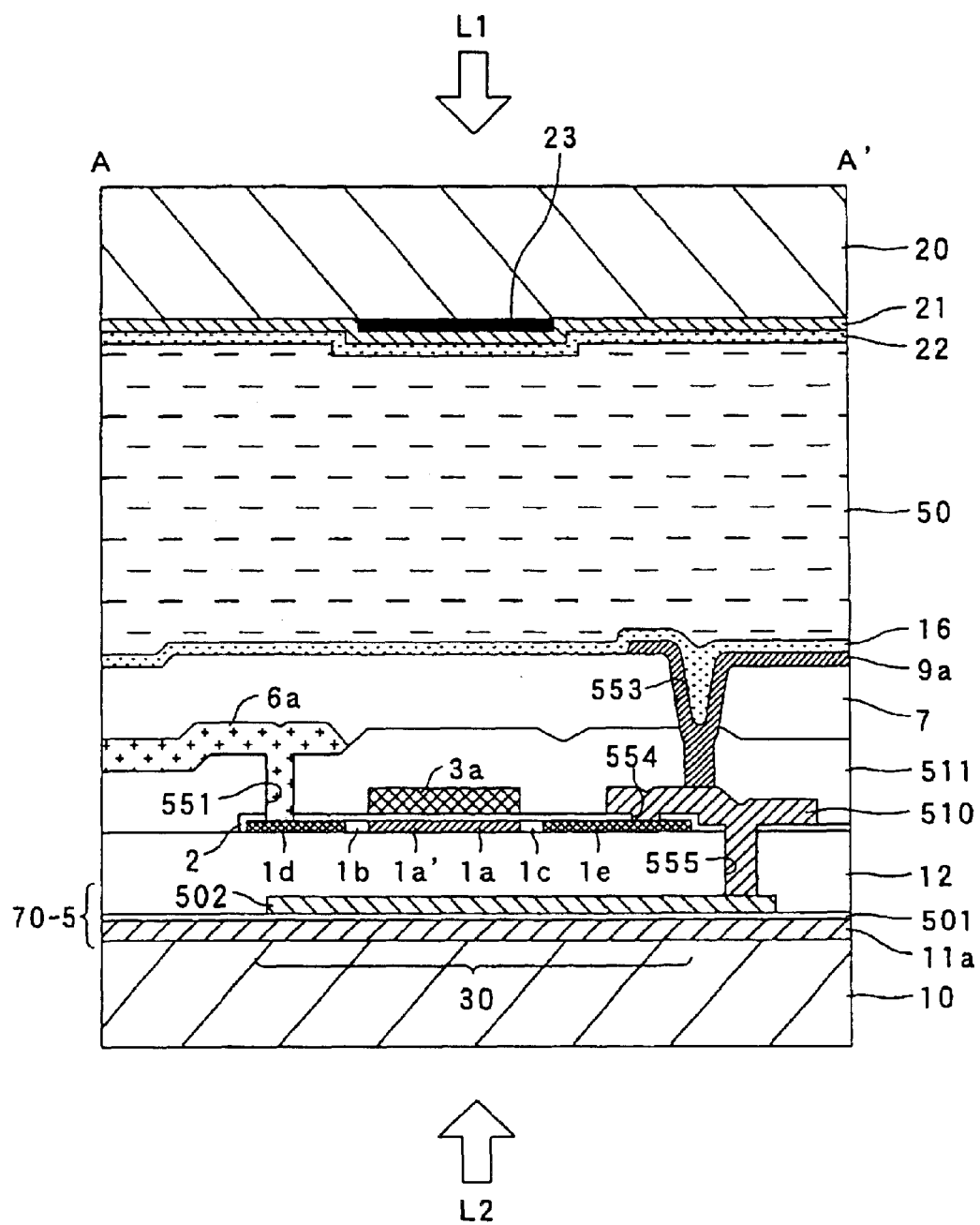
FIG. 14 is a cross-sectional view diagrammatically showing a connection of layers through contact holes and a laminate structure forming a storage capacitor in the electro-optical device of FIG. 13.

Referring to FIG. 13 and FIG. 14, a fifth embodiment of the present invention will now be described. FIG. 13 is a plan view showing a pixel in a TFT array substrate having a data line, a scanning line, and a pixel electrode formed thereon in the electro-optical device. FIG. 14 is a cross-sectional view diagrammatically showing a connection of layers through contact holes and a laminate structure forming a storage capacitor in the electro-optical device of FIG. 13. Referring to FIG. 14, the layers and elements are not necessarily drawn to scale and are changed in relative position to show the layers and members in easy-to-identify sizes and to help understand the connection of contact holes, and the laminate structure forming a storage capacitor. In FIG. 13 and FIG. 14, elements identical to those described with reference to FIGS. 2 and 3 (showing the first embodiment) and FIGS. 6 through 10 (showing the third embodiment) are designated with the same reference numerals and the discussion thereof is omitted.

In the electro-optical device of the fifth embodiment, the first light shielding film 1a on the TFT array substrate 10 is used not only as a light shielding film but also as a fixed-potential capacitive electrode. A capacitive electrode 502, which is added as a pixel-potential capacitive electrode, is opposed to the first light shielding film 11a with a dielectric layer 501 interposed, as shown in FIG. 13 and FIG. 14, thereby forming a storage capacitor.

Specifically, referring to FIG. 14, the first light shielding film 11a also serves as a capacitive line that is connected to the predetermined potential in the peripheral area surrounding the image display area, and the dielectric layer 501 and the capacitive electrode 502 are laminated on the TFT array substrate 10 in that order. The underlayer insulator 12 and the TFT 30 are laminated on the capacitive electrode 502. A barrier layer 510 is formed at the same layer level as that for the scanning line 3a. Laminated on the TFT 30 and the barrier layer 510 are a first interlayer insulator 511, the data line 6a, the interlayer insulator 7, and the pixel electrode 9a in that order.

The TFT 30 includes the heavily doped source region 1d and the heavily doped drain region 1e in an area overlapping the data line 6a in the channel region 1a' at the intersection of the scanning line 3a and the data line 6a.

The barrier layer 510 can be formed in an island within the area of the data line 6a adjacent to the intersection of the scanning line 3a and the data line 6a. The barrier layer 510 has a portion projecting into the area of the pixel electrode 9a in a plan view.

A contact hole 551 penetrating the first interlayer insulator 511 connects the heavily doped source region 1d to the data line 6a.

To connect the heavily doped drain region 1e to the pixel electrode 9a, first, a contact hole 554 conductively connects the heavily doped drain region 1e to the barrier layer 510. Then, a contact hole 553 penetrating the first interlayer insulator 511 and the interlayer insulator 7 conductively connects the projecting portion of the barrier layer 510 to the pixel electrode 9a.

To form a storage capacitor 70-5, the first light shielding film 11a extends along the scanning line 3a and the data line 6a in a matrix, and is connected to the predetermined potential. The capacitive electrode 502 is an L-shaped island capacitive electrode with one segment thereof extending from the intersection of the scanning line 3a and the data line 6a along the first light shielding film 11a within the formation area of the data line 6a and with the other segment thereof extending along the first light shielding film 11a within the formation area of the scanning line 3a. The capacitive electrode 502 is conductively connected to the barrier layer 510 through a contact hole 555 penetrating the underlayer insulator 12, and is thus connected to the pixel-electrode potential. In this way, the first light shielding film 11a is opposed to the L-shaped capacitive electrode 502 with the dielectric layer 501 interposed therebetween, thereby forming the storage capacitor 70-5.

Unlike the conventional art, in which the capacitive line runs alongside the scanning line, the fifth embodiment does not need the expansion of the non-aperture area of each pixel. By laminating the capacitive line (the first light shielding film 11a) and the capacitive electrode 502 on the scanning line 3a and the data line 6a on the TFT array substrate 10, a larger capacitance of the storage capacitor results.

Like the capacitive electrode 302 and the barrier layer 303 in the first embodiment, the first light shielding film 11a is fabricated of a refractory metal, an alloy, a metal silicide, or a multilayer containing these elements, and the thickness of the first light shielding film 11a falls within a range from 5 to 200 nm. The capacitive electrode 502 is fabricated of a conductive polysilicon layer or is a layer of the same material as that forming the first light shielding film 11a, and the thickness of the capacitive electrode 502 falls within a range from 50 to 100 nm. The dielectric layer 501 is a relatively thin silicon oxide layer of HTO or LTO, or a silicon nitride film, each having a thickness falling within a range from 5 to 200 nm. To reduce capacitive coupling between the capacitive electrode 502 at the pixel-electrode potential and the semiconductor layer 1a, the thickness of the underlayer insulator 12 preferably falls within a range from 200 to 2000 nm, being relatively thick in this embodiment.

Figure 15:
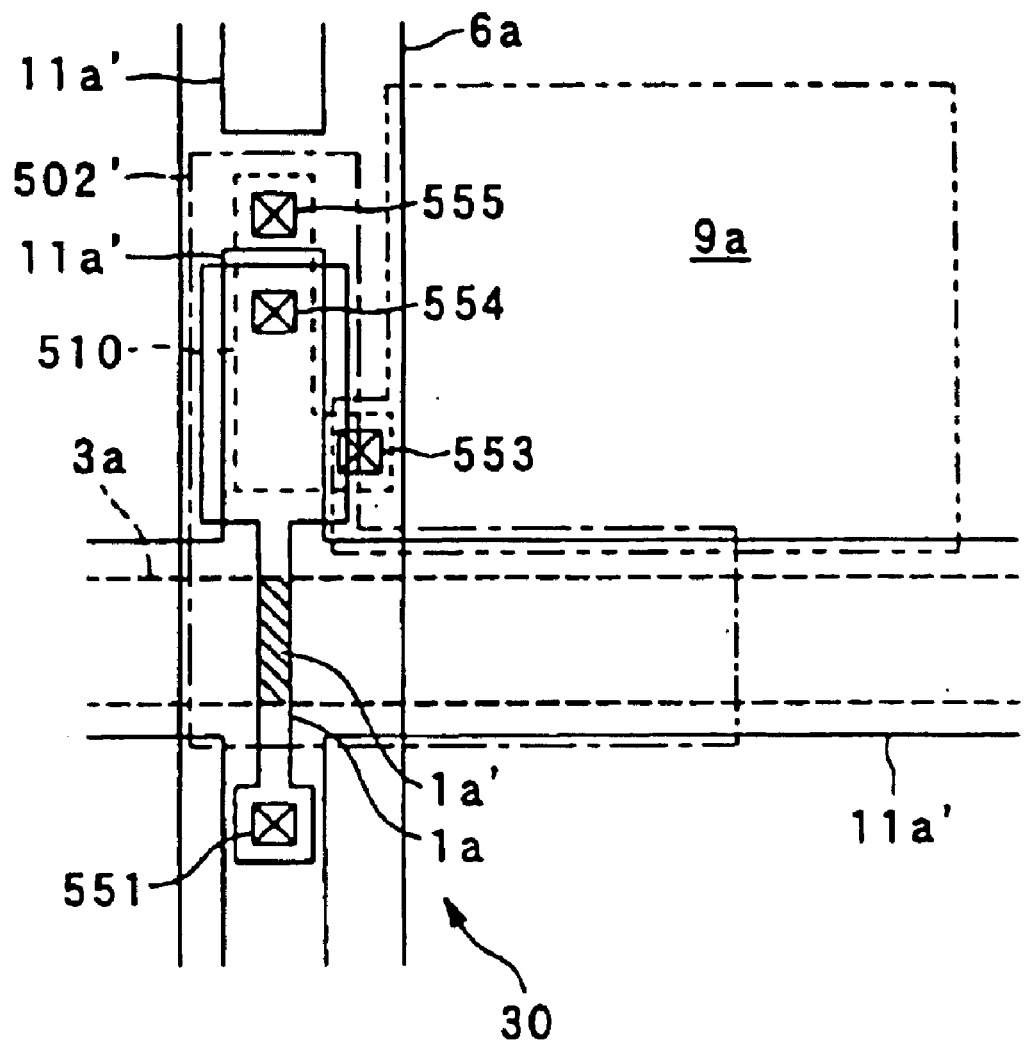
FIG. 15 is a plan view showing a pixel in a TFT array substrate having a data line, a scanning line, and a pixel electrode formed thereon in the electro-optical device of a sixth embodiment.
Figure 16:
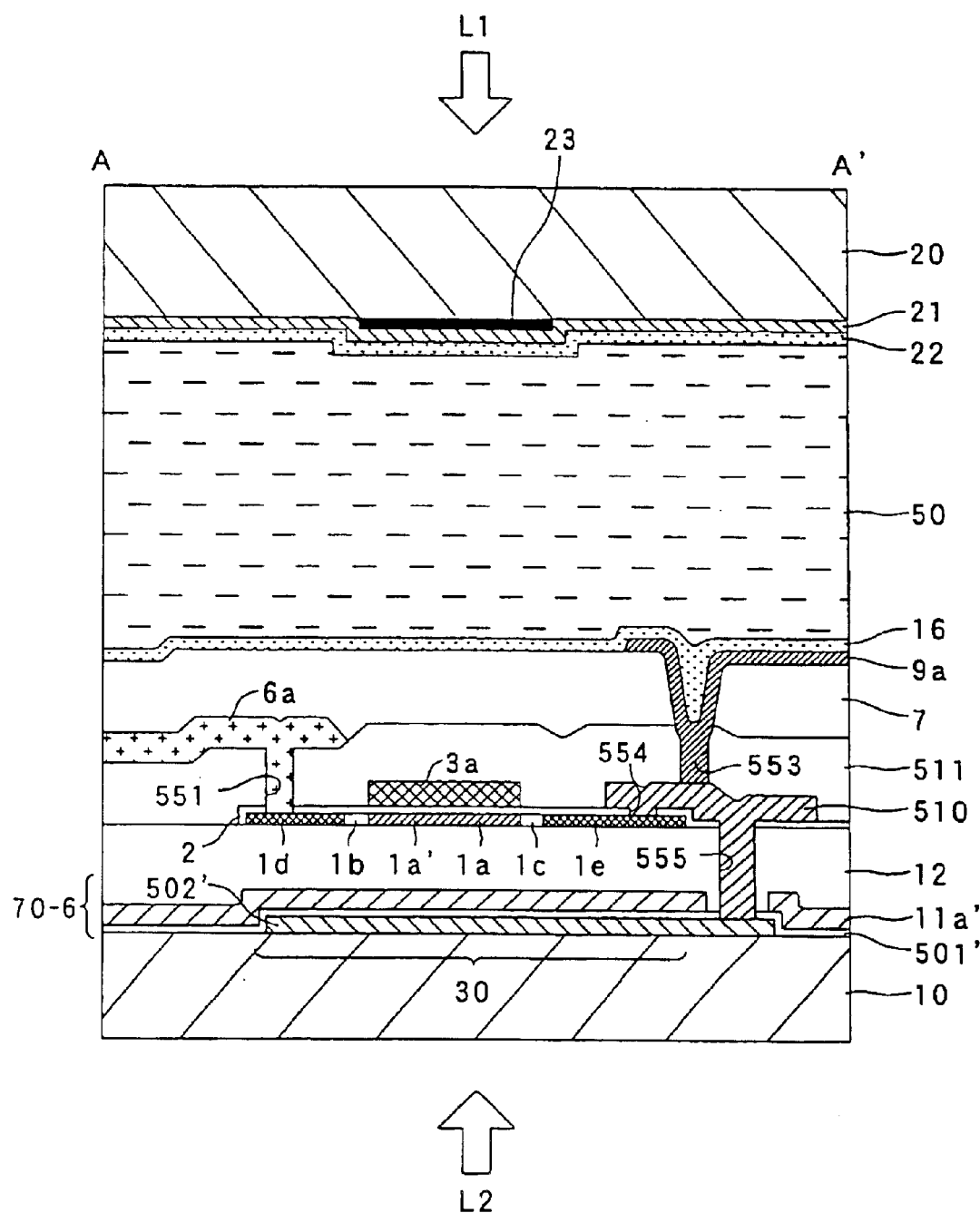
FIG. 16 is a cross-sectional view diagrammatically showing a connection of layers through contact holes and a laminate structure forming a storage capacitor in the electro-optical device of FIG. 15.

A sixth embodiment of the electro-optical device of the present invention will now be described with reference to FIG. 15 and FIG. 16. FIG. 15 is a plan view showing a pixel in a TFT array substrate having a data line, a scanning line, and a pixel electrode formed thereon in the electro-optical device. FIG. 16 is a cross-sectional view diagrammatically showing a connection of layers through contact holes and a laminate structure forming a storage capacitor in the electro-optical device of FIG. 15. Referring to FIG. 16, the layers and elements are not necessarily drawn to scale and are changed in relative position to show the layers and members in easy-to-identify sizes and to help understand the connection of contact holes, and the laminate structure forming a storage capacitor. In FIG. 15 and FIG. 16, elements identical to those described with reference to FIGS. 2 and 3 (showing the first embodiment) and FIGS. 13 and 14 (showing the fifth embodiment) are designated with the same reference numerals, and the discussion thereof is omitted.

Referring to FIG. 15 and FIG. 16, the sixth embodiment can include a capacitive electrode 502' beneath a first light shielding film 11a' with a dielectric layer 501' interposed therebetween, instead of the capacitive electrode 502 arranged over the first light shielding film 11a with the dielectric layer 501 interposed therebetween in the fifth embodiment. A storage capacitor 70-6 as one example of the storage capacitor 70 (see FIG. 1) is thus created. The first light shielding film 11a' is disconnected where a contact hole 555 is arranged. The rest of the construction of the laminate structure remains unchanged from that of the fifth embodiment.

Unlike the conventional art, in which the capacitive line runs alongside the scanning line, the sixth embodiment does not need the expansion of the non-aperture area of each pixel. By laminating the capacitive line (the first light shielding film 11a) and the capacitive electrode 502' on the scanning line 3a and the data line 6a on the TFT array substrate 10, a larger capacitance of the storage capacitor results.

In comparison with the fifth embodiment, the sixth embodiment includes the light shielding film 11a' interposed between the capacitive electrode 502' at the pixel-electrode potential and the semiconductor layer 1a. This arrangement eliminates the need for thickening the underlayer insulator 12 in an attempt to reduce capacitive coupling.

Figure 17:
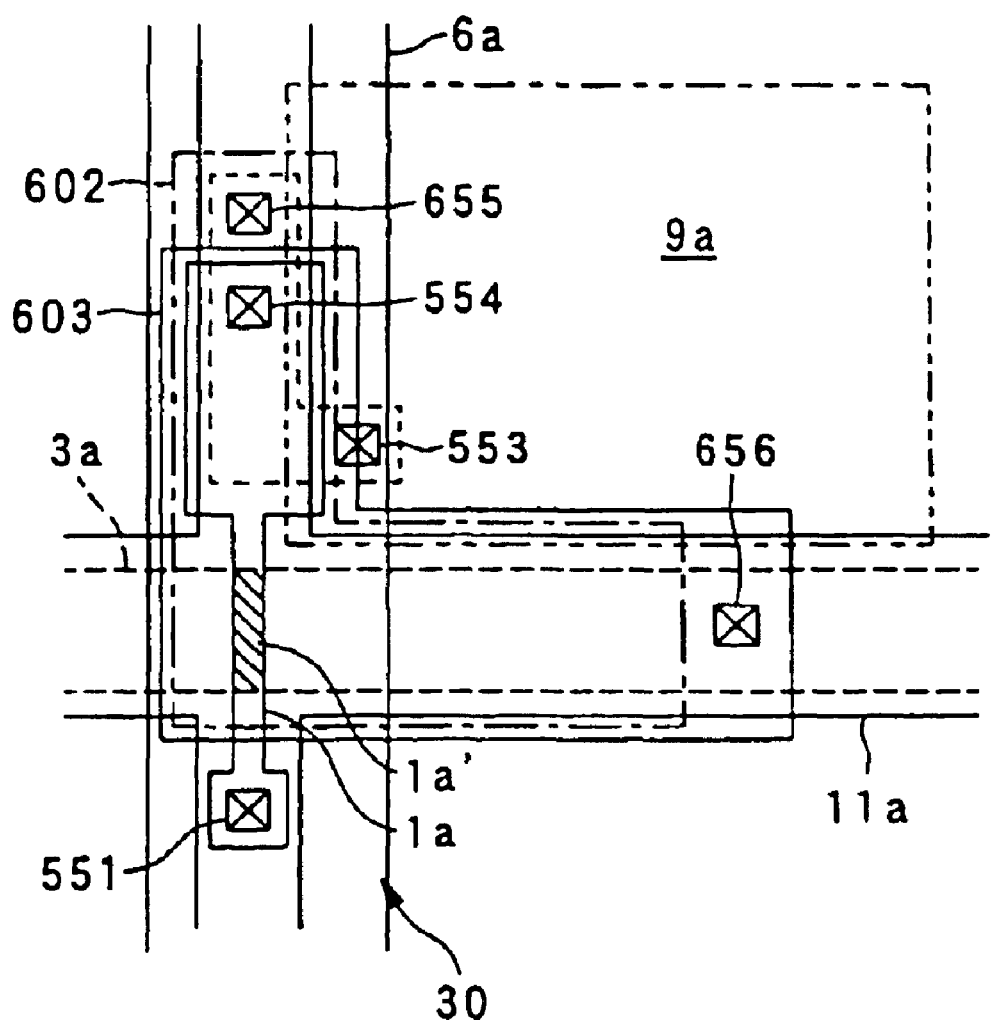
FIG. 17 is a plan view showing a pixel in a TFT array substrate having a data line, a scanning line, and a pixel electrode formed thereon in the electro-optical device of a seventh embodiment.
Figure 18:
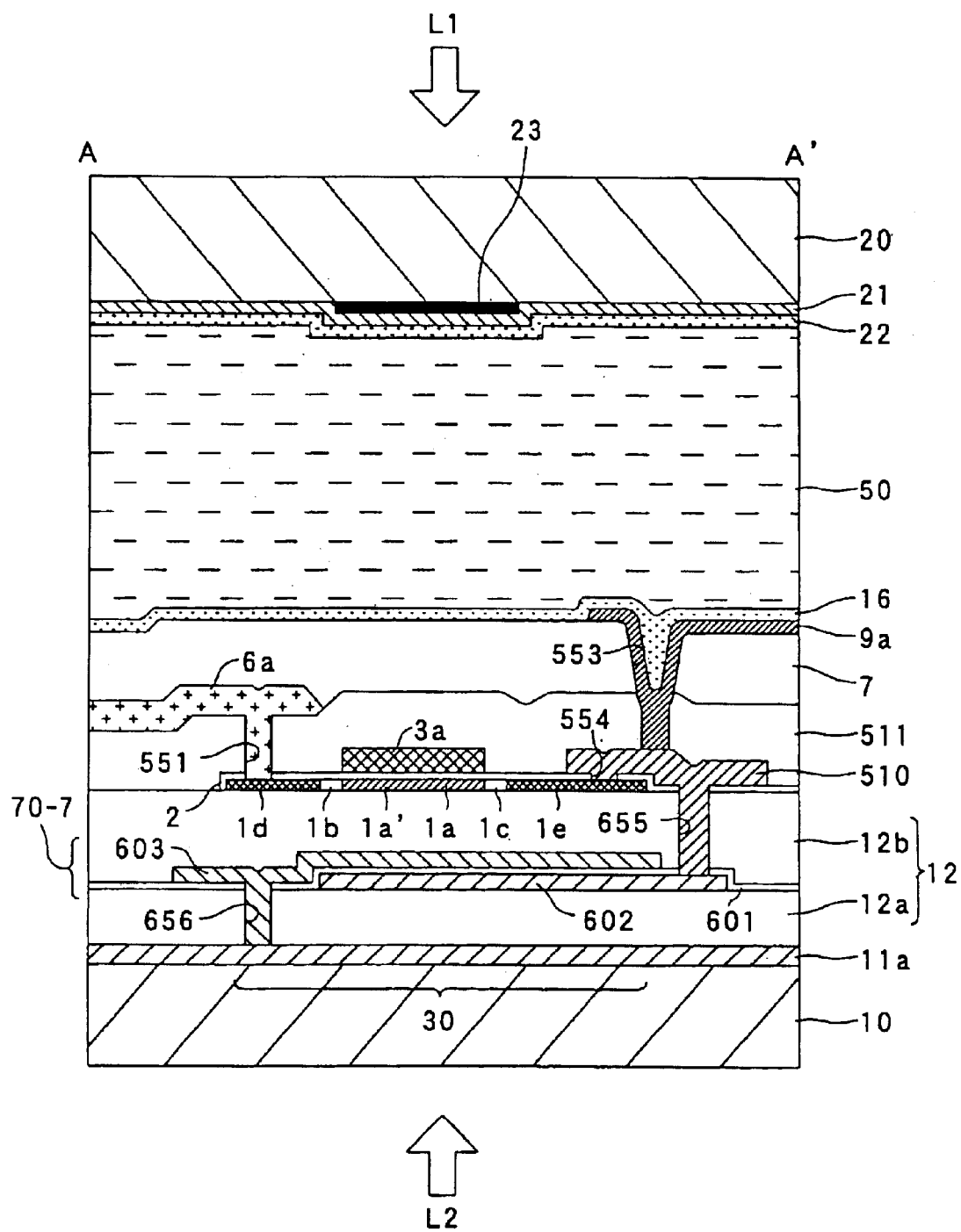
FIG. 18 is a cross-sectional view diagrammatically showing a connection of layers through contact holes and a laminate structure forming a storage capacitor in the electro-optical device of FIG. 17.

A seventh embodiment of the electro-optical device of the present invention will now be described with reference to FIG. 17 and FIG. 18. FIG. 17 is a plan view showing a pixel in a TFT array substrate having a data line, a scanning line, and a pixel electrode formed thereon in the electro-optical device. FIG. 18 is a cross-sectional view diagrammatically showing a connection of layers through contact holes and a laminate structure forming a storage capacitor in the electro-optical device of FIG. 17. Referring to FIG. 18, the layers and elements are not necessarily drawn to scale and are changed in relative position to show the layers and members in easy-to-identify sizes and to help understand the connection of contact holes, and the laminate structure forming a storage capacitor. In FIG. 17 and FIG. 18, elements identical to those described with reference to FIGS. 2 and 3 (showing the first embodiment) and FIGS. 13 and 14 (showing the fifth embodiment) are designated with the same reference numerals, and the discussion thereof is omitted.

Referring to FIG. 17 and FIG. 18, the seventh embodiment can include, within the underlayer insulator 12 (i.e., between a first underlayer insulator 12a and a second underlayer insulator 12b), a capacitive electrode 602 and a conductive layer 603 with a dielectric layer 601 interposed therebetween, instead of the first light shielding film 11a and the capacitive electrode 502 with the dielectric layer 501 interposed therebetween in the fifth embodiment. A storage capacitor 70-7 as one example of the storage capacitor 70 (see FIG. 1) is thus created. The capacitive electrode 602 is connected to the barrier layer 510 via a contact hole 655, and is set to the pixel-electrode potential. On the other hand, the conductive layer 603 is connected to the first light shielding film 11a via a contact hole 656, and is set to the predetermined potential. Each of the pair of the capacitive electrode 602 and the conductive layer 603 has an L-shaped configuration in a plan view with one segment of the L-shaped configuration extending along the scanning line 3a and with the other segment extending along the data line 6a. The segment of the conductive layer 603 extending along the data line 6a runs up to near the contact hole 655 that connects the barrier layer 510 and the capacitive electrode 602, and the segment of the capacitive electrode 602 extending along the data line 6a runs beyond the contact hole 655. On the other hand, the segment of the conductive layer 603 extending along the scanning line 3a runs beyond the contact hole 656 that connects the conductive layer 603 to the first light shielding film 11a, and the segment of the capacitive electrode 602 extending along the scanning line 3a runs up to near the contact hole 656. The rest of the construction of the laminate structure remains unchanged from that of the fifth embodiment.

Unlike the conventional art, in which the capacitive line runs alongside the scanning line, the seventh embodiment does not need the expansion of the non-aperture area of each pixel. By laminating the capacitive line and the capacitive electrode on the scanning line 3a and the data line 6a on the TFT array substrate 10, a larger capacitance of the storage capacitor results.

Although the storage capacitor 70-7 is created between the first light shielding film 11a and the TFT 30 in the seventh embodiment, the storage capacitor 70-7 may be formed between the first light shielding film 11a and the TFT array substrate 10.

When the storage capacitor 70 is formed beneath the semiconductor layer 1a in the fifth embodiment through the seventh embodiment as described above, a portion of the semiconductor layer 1a extending from the semiconductor layer 1e may be used as a capacitive electrode in addition to or instead of the capacitive electrode.

In accordance with the third embodiment, and the fifth embodiment through the seventh embodiment, the first light shielding film 11a arranged beneath the semiconductor layer 1a has the function of the capacitive line in addition to the originally intended light shielding function, and the laminate structure and the manufacturing process thereof are substantially simplified. When the first light shielding film 11a is arranged in this way, the scanning line 3a, the data line 6a, and the TFT 30 are preferably kept to within the formation area of the first light shielding film 1a in a plan view. In this arrangement, no returning light is reflected from the scanning line 3a, the data line 6a and the TFT 30, because no portion of the scanning line 3a, the data line 6a and the TFT 30 projects out of the formation area of the first light shielding film 11a. This arrangement efficiently precludes the generation of internal reflections and multiple reflections of light in the electro-optical device.

Figure 19:
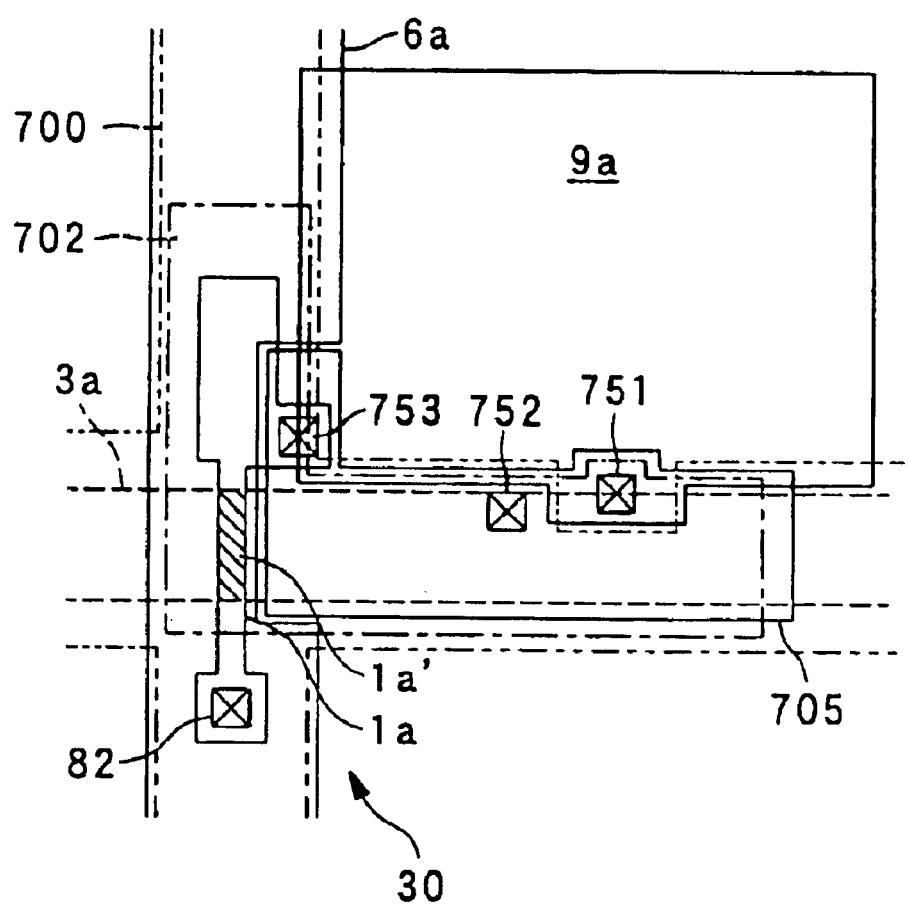
FIG. 19 is a plan view showing a pixel in a TFT array substrate having a data line, a scanning line, and a pixel electrode formed thereon in the electro-optical device of an eighth embodiment.
Figure 20:
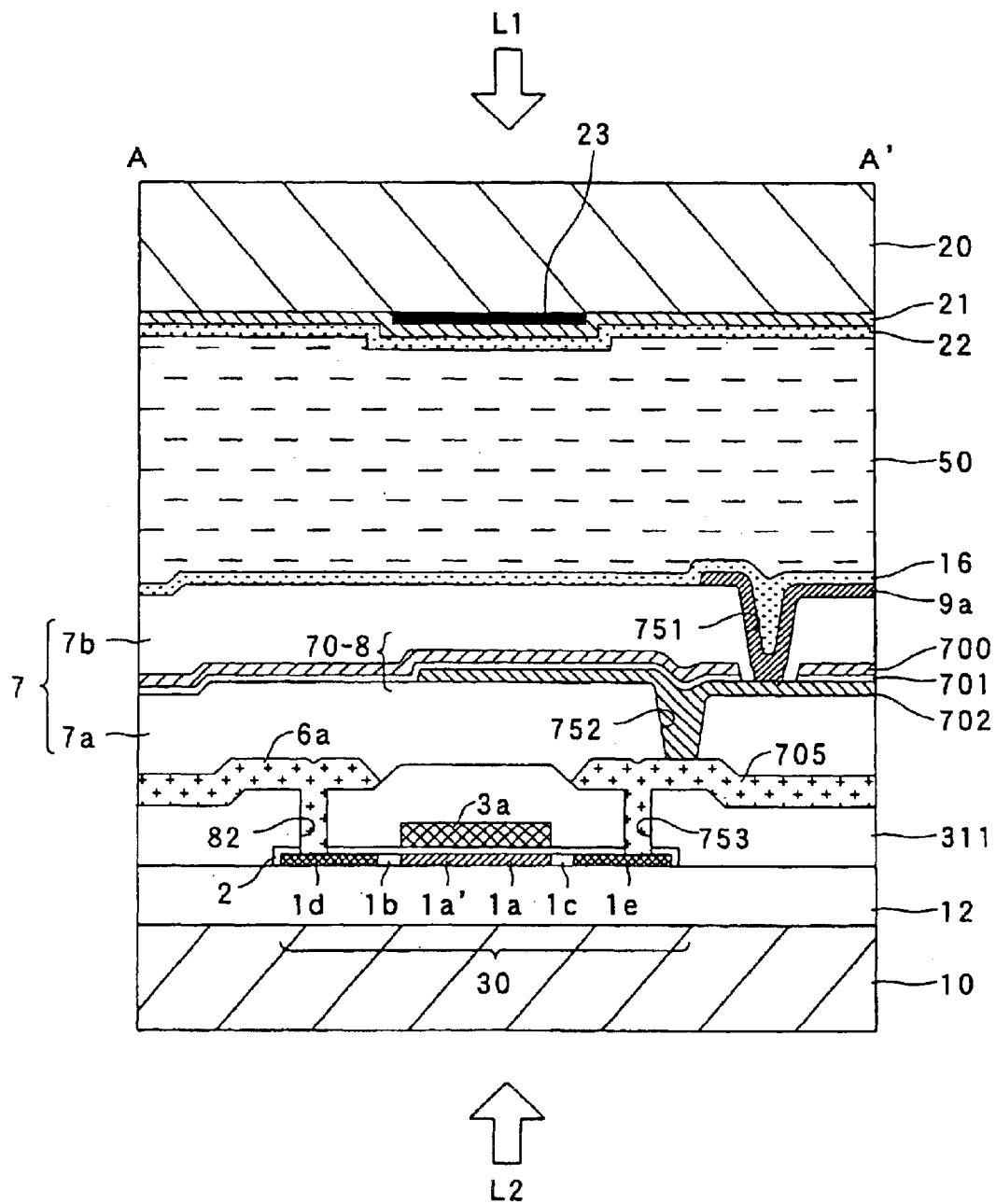
FIG. 20 is a cross-sectional view diagrammatically showing a connection of layers through contact holes and a laminate structure forming a storage capacitor in the electro-optical device of FIG. 19.

An eighth embodiment of the electro-optical device of this invention will now be described with reference to FIG. 19 and FIG. 20. FIG. 19 is a plan view showing a pixel in a TFT array substrate having a data line, a scanning line, and a pixel electrode formed thereon in the electro-optical device. FIG. 20 is a cross-sectional view diagrammatically showing a connection of layers through contact holes and a laminate structure forming a storage capacitor in the electro-optical device of FIG. 19. Referring to FIG. 20, the layers and elements are not necessarily drawn to scale and are changed in relative position to show the layers and members in easy-to-identify sizes and to help understand the connection of contact holes, and the laminate structure forming a storage capacitor. In FIG. 19 and FIG. 20, elements identical to those described with reference to FIGS. 2 and 3 (showing the first embodiment) are designated with the same reference numerals, and the discussion thereof is omitted.

Referring to FIG. 19 and FIG. 20, the eighth embodiment can include a conductive, embedded light shielding film 700 as a capacitive line and a capacitive electrode 702 with a dielectric layer 701 interposed therebetween, within the interlayer insulator 7 (i.e., between an interlayer insulator 7a and an interlayer insulator 7b), instead of the capacitive line 300 and the capacitive electrode 302 with the dielectric layer 301 interposed therebetween in the first embodiment. A storage capacitor 70-8 as an example of the storage capacitor 70 (see FIG. 1) is thus formed. The capacitive electrode 702 is connected to the pixel electrode 9a via a contact hole 751 penetrating the interlayer insulator 7b, and is set to the pixel-electrode potential. The capacitive electrode 702 is connected to the heavily doped drain region 1e through a contact hole 752 penetrating the interlayer insulator 7a and a contact hole 753 penetrating the first interlayer insulator 311 and through a barrier layer 705 which is fabricated of the same layer (Alfilm, for example) as that forming the data line 6a.

The embedded light shielding film 700, defining the aperture area of each pixel and serving as a capacitive line of the storage capacitor 70-8, extends in a grid configuration surrounding the image display area, and is set to the predetermined potential. The embedded light shielding film 700 has a neck portion having a cutout in alignment with the contact hole 751 to allow the contact hole 751 to be opened there. The capacitive electrode 702 is L-shaped in a plan view with one segment thereof extending along the scanning line 3*a* and the other segment thereof extending along the data line 6*a*. The one segment of the capacitive electrode 702 has a wider portion around the contact hole 751 to establish connection with the pixel electrode 9*a* through the contact hole 751. The barrier layer 705 has a wider portion around the area of the contact hole 753 to be connected to the heavily doped drain region 1*e* via the contact hole 753. The barrier layer 705 is L-shaped in a plan view to cover the opening positions of the contact hole 752 and the contact hole 753. The data line 6*a* fabricated of the same layer as that forming the barrier layer 705 has a neck portion to be clear of the barrier layer 705 in the area of the contact hole 753. The rest of the construction of the laminate structure remains unchanged from that of the first embodiment.

Unlike the conventional art, in which the capacitive line runs alongside the scanning line, the eighth embodiment does not need the expansion of the non-aperture area of each pixel. By laminating the capacitive line and the capacitive electrode on the scanning line 3*a* and the data line 6*a* on the TFT array substrate 10, a larger capacitance of the storage capacitor results.

The embedded light shielding film 700 and the capacitive electrode 702 may be fabricated of a refractory metal, an alloy, or a metal silicide or may be a multilayer made of these materials, or may be fabricated of the same material as that forming the data line 6*a*, for example, of Al film.

Figure 21:
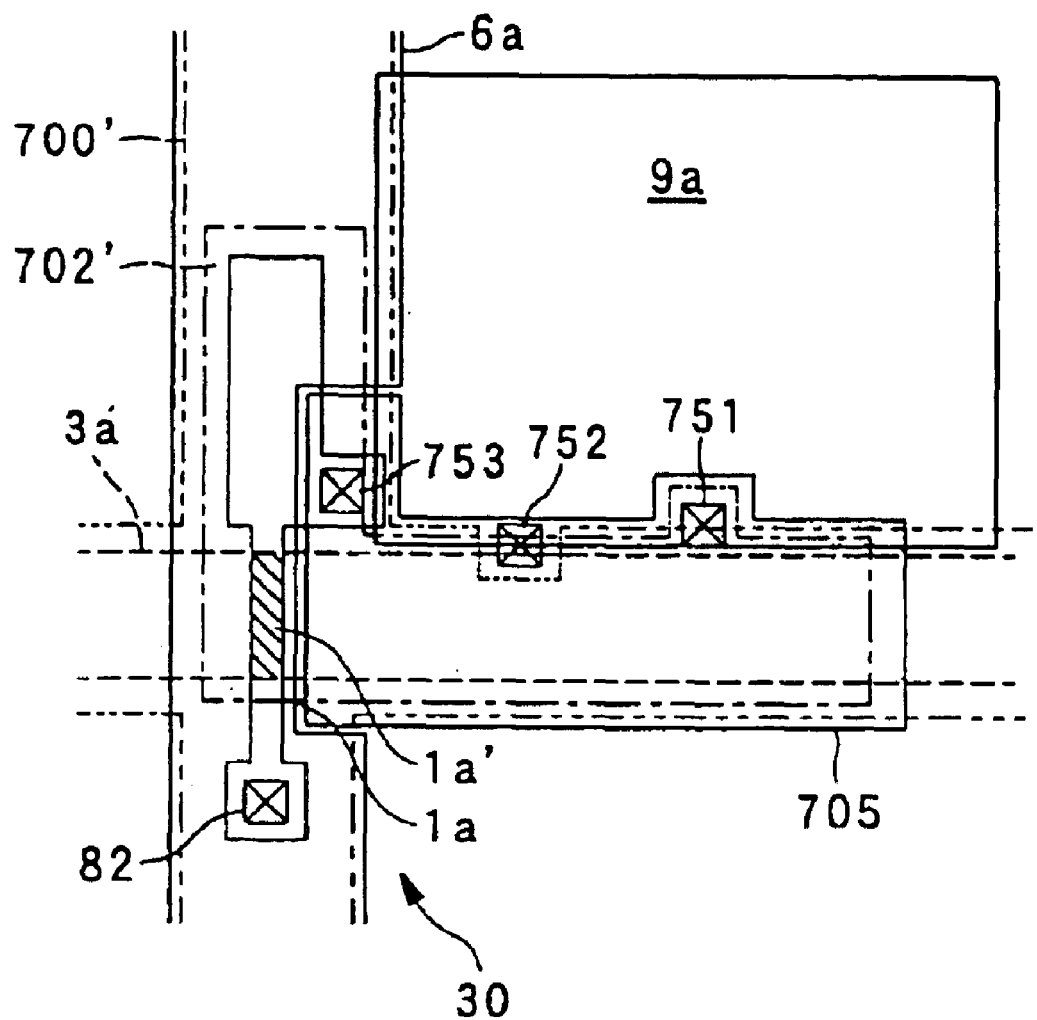
FIG. 21 is a plan view showing a pixel in a TFT array substrate having a data line, a scanning line, and a pixel electrode formed thereon in the electro-optical device of an ninth embodiment.
Figure 22:
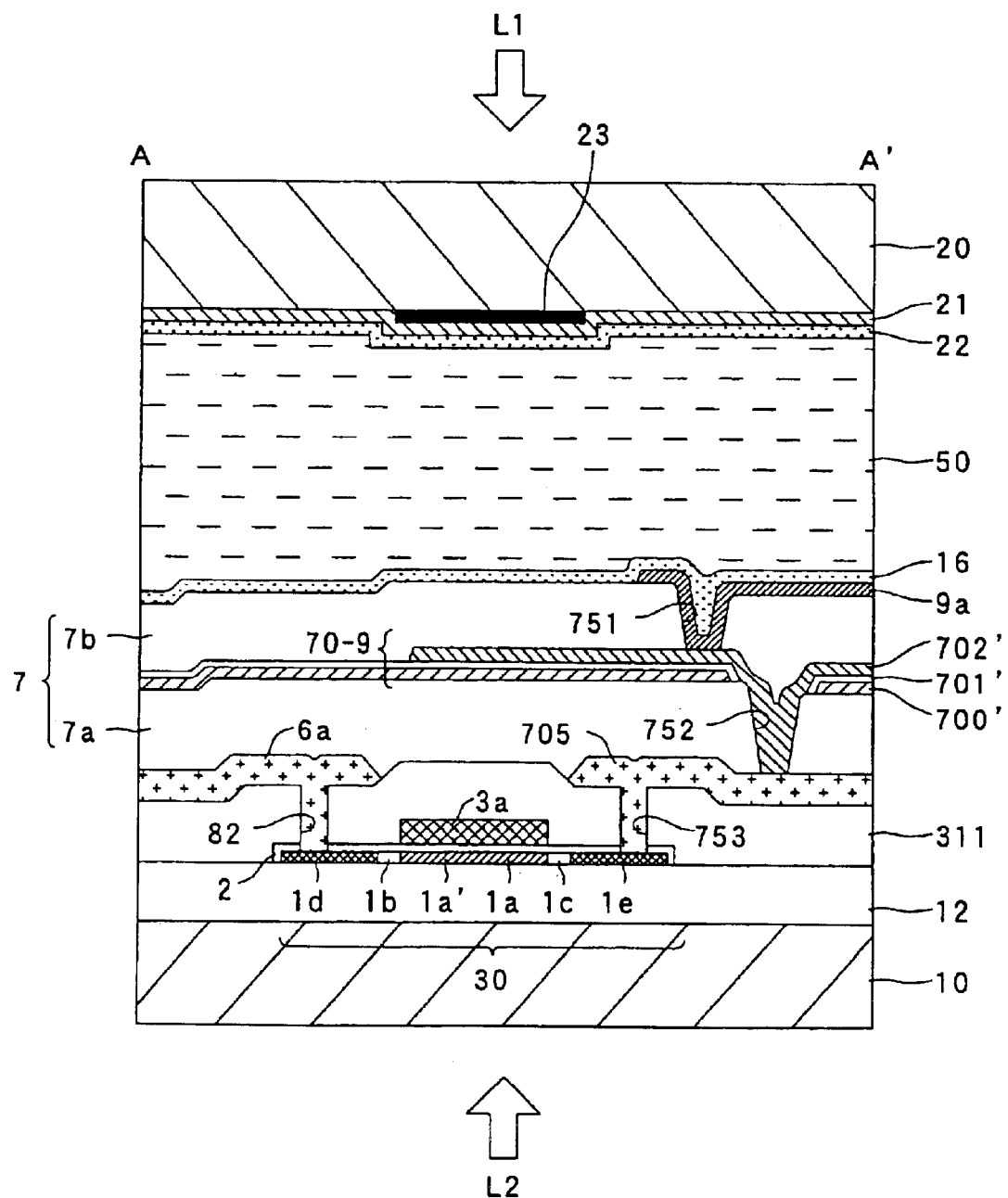
FIG. 22 is a cross-sectional view diagrammatically showing a connection of layers through contact holes and a laminate structure forming a storage capacitor in the electro-optical device of FIG. 21.

A ninth embodiment of the electro-optical device of the present invention will now be described with reference to FIG. 21 and FIG. 22. FIG. 21 is a plan view showing a pixel in a TFT array substrate having a data line, a scanning line, and a pixel electrode formed thereon in the electro-optical device. FIG. 22 is a cross-sectional view diagrammatically showing a connection of layers through contact holes and a laminate structure forming a storage capacitor in the electro-optical device of FIG. 21. Referring to FIG. 22, the layers and elements are not necessarily drawn to scale and are changed in relative position to show the layers and members in easy-to-identify sizes and to help understand the connection of contact holes, and the laminate structure forming a storage capacitor. In FIG. 21 and FIG. 22, elements identical to those described with reference to FIGS. 2 and 3 (showing the first embodiment) and FIGS. 19 and 20 (showing the eighth embodiment) are designated with the same reference numerals, and the discussion thereof is omitted.

Referring to FIG. 21 and FIG. 22, in the ninth embodiment, the positional relationship of an embedded light shielding film 700' as a capacitive line, and a capacitive electrode 702' with respect to a dielectric layer 701' is inverted from the positional relationship of the counterparts in the eighth embodiment. A storage capacitor 70-9 as another example of the storage capacitor 70 (see FIG. 1) is thus created. The grid-like embedded light shielding film 700' has a neck portion having a cutout in alignment with the contact hole 752 to allow the contact hole 752 to be opened there in each pixel. The capacitive electrode 702' is L-shaped in a plan view with one segment thereof extending along the scanning line 3*a* and the other segment thereof extending along the data line 6*a*. The capacitive electrode 702' has a wider portion around the contact hole 751 to establish electrically sound connection with the pixel electrode 9*a* via the contact hole 751. The rest of the construction of the laminate structure remains unchanged from that of the eighth embodiment.

Unlike the conventional art, in which the capacitive line runs alongside the scanning line, the ninth embodiment does not need the expansion of the non-aperture area of each pixel. By laminating the capacitive line and the capacitive electrode on the scanning line 3*a* and the data line 6*a* on the TFT array substrate 10, a larger capacitance of the storage capacitor results.

When the storage capacitor 70 is formed within the interlayer insulator 7 closer to the pixel electrode 9*a* as in the eighth embodiment and the ninth embodiment described above, the extension of the pixel electrode 9*a* may be used as a capacitive electrode in addition to or instead of the capacitive electrode.

Figure 23:
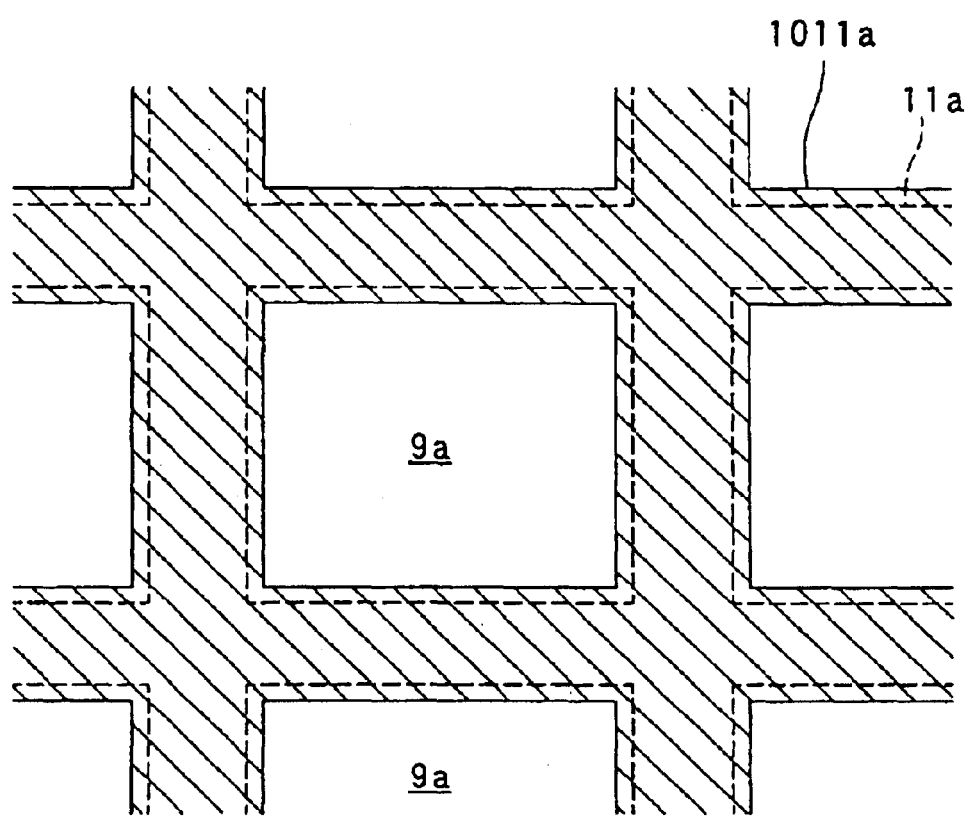
FIG. 23 is a plan view of a pixel of a TFT array substrate particularly showing an embedded light shielding film and a first light shielding film in the electro-optical device of a tenth embodiment.

A tenth embodiment of the electro-optical device of the present invention will now be described with reference to FIG. 23. The tenth embodiment relates to the electro-optical device which includes an embedded light shielding film 1011*a* formed over the data line 6*a* as in one of the eighth embodiment and the ninth embodiment, a first light shielding film 11*a* beneath the TFT 30 as in one of the third embodiment, and the fifth embodiment through the seventh embodiment, and the TFT 30 and the storage capacitor 70 formed between the two light shielding films. FIG. 23 is a plan view showing the embedded light shielding film 1011*a* and the first light shielding film 11*a* in the pixels of the TFT array substrate.

In the tenth embodiment as shown in FIG. 23, the embedded light shielding film 1011*a* and the first light shielding film 11*a* are formed in a grid configuration. The first light shielding film 11*a* is kept to be within the formation area of the embedded light shielding film 1011*a* in a plan view (in other words, the first light shielding film 11*a* is formed to be smaller than the embedded light shielding film 1011*a* by one notch). The aperture area of each pixel is defined by the embedded light shielding film 1011*a*. The scanning line, the data line, and the TFT, not shown in the drawing, interposed between the two light shielding films are kept to within the formation area of the first light shielding film 11*a* in a plan view.

In accordance with the tenth embodiment, no incident light from the counter substrate 20 is reflected from the first light shielding film 11*a*, because no portion of the first light shielding film 11*a* (and, the scanning line and the data line) projects out of the formation area of the embedded light shielding film 1011*a*. This arrangement efficiently precludes the generation of internal reflections and multiple reflections of light in the electro-optical device. Light returning from the TFT array substrate 10 may be reflected from the embedded light shielding film 1011*a* projecting out of the formation area of the first light shielding film 11*a*, thereby causing a slight degree of internal reflections and multiple reflections of light. The returning light is far weaker than the incident light in strength, and internal reflections and multiple reflections of the returning light are thus marginal compared with those of the incident light. The arrangement of this embodiment is thus advantageous.

The first through tenth embodiments use a top gate TFT as a pixel switching TFT, in which the gate electrode (the scanning line) is arranged over the channel region of the semiconductor layer. In an eleventh embodiment through an eighteenth embodiment, a bottom gate TFT having the gate electrode (the scanning line) thereof beneath the channel region of the semiconductor layer is used as a pixel switching TFT.

Figure 24:
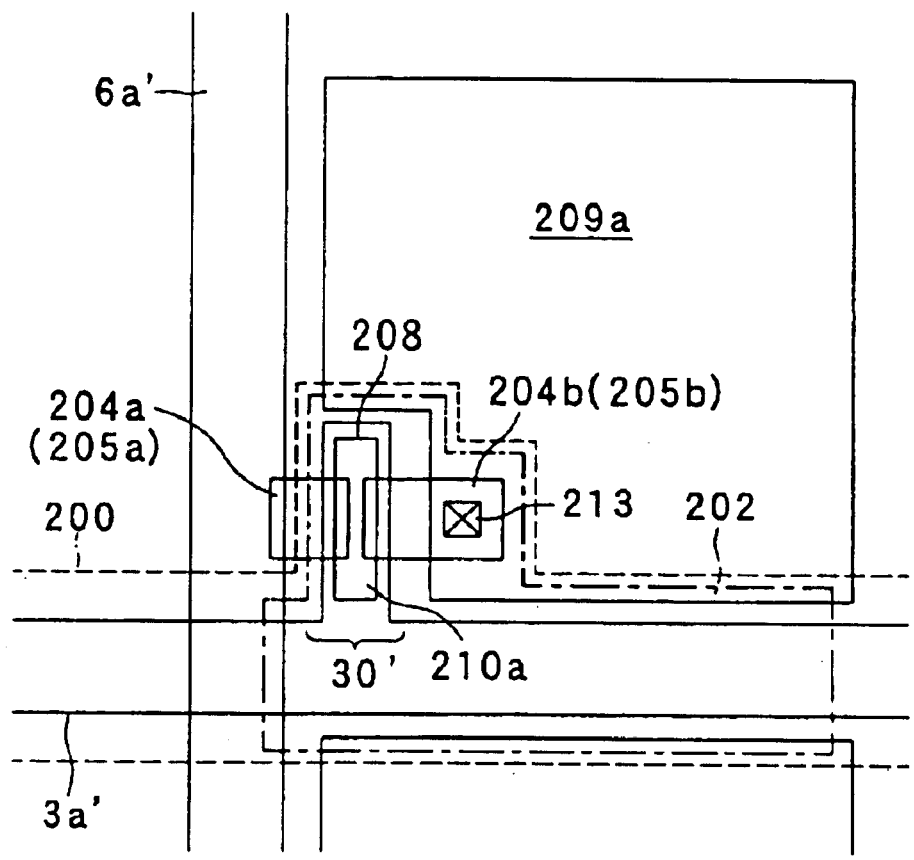
FIG. 24 is a plan view showing a pixel in a TFT array substrate having a data line, a scanning line, and a pixel electrode formed thereon in the electro-optical device of an eleventh embodiment.
Figure 25:
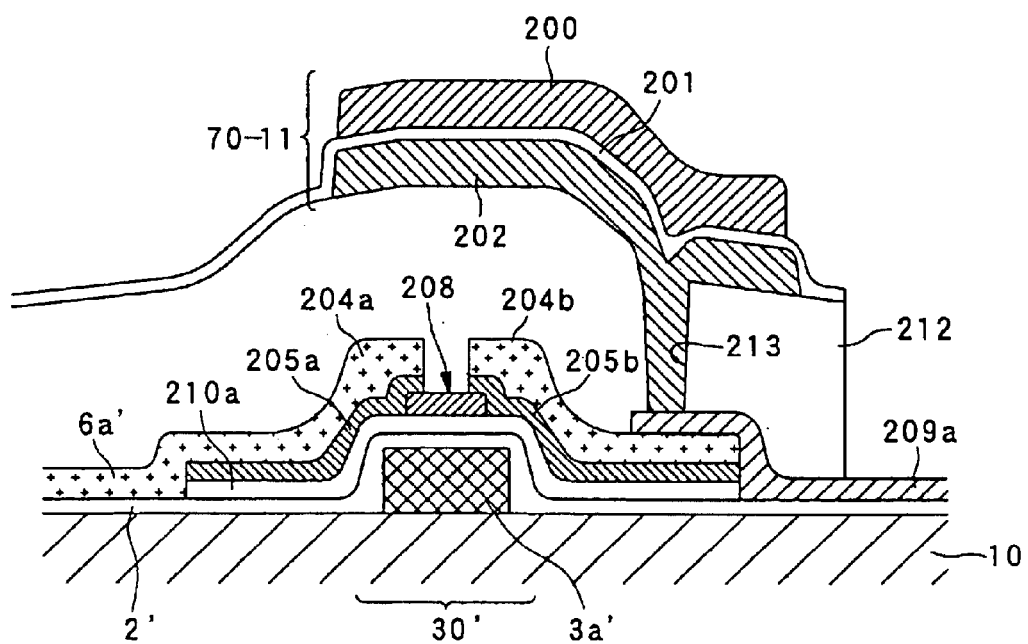
FIG. 25 is a cross-sectional view diagrammatically showing a connection of layers through contact holes and a laminate structure forming a storage capacitor in the electro-optical device of FIG. 24.

The eleventh embodiment of the electro-optical device of the present invention will now be discussed, referring to FIG. 24 and FIG. 25. FIG. 24 is a plan view showing a pixel in a TFT array substrate having a data line, a scanning line, and a pixel electrode formed thereon in the electro-optical device. FIG. 25 is a cross-sectional view diagrammatically showing a connection of layers through contact holes and a laminate structure forming a storage capacitor in the electro-optical device of FIG. 24. Referring to FIG. 25, the layers and elements are not necessarily drawn to scale and are changed in relative position to show the layers and members in easy-to-identify sizes and to help understand the connection of contact holes, and the laminate structure forming a storage capacitor. In FIG. 24 and FIG. 25, elements identical to those described with reference to FIGS. 2 and 3 (showing the first embodiment) are designated with the same reference numerals, and the discussion thereof is omitted.

Referring to FIG. 24 and FIG. 25, the eleventh embodiment forms a storage capacitor 70-11 as another example of the storage capacitor 70 (see FIG. 1) over a bottom-gate type pixel switching TFT 30'. Specifically, a semiconductor layer 210a is formed on a gate insulator 2' over a gate electrode that projects upward along the data line 6a' from the scanning line 3a' on the TFT array substrate 10 in a tooth-like configuration as shown in FIG. 24. A portion of the semiconductor layer 210a facing the gate electrode is called a channel region. Arranged on the semiconductor layer 210a are a source electrode 204a and a drain electrode 204b, each fabricated of the same layer as that forming the data line 6a' (fabricated of Al film, for example). Junction layers 205a and 205b of n+type a-Si (amorphous silicon) for establishing ohmic contact are respectively laminated between the semiconductor layer 210a and the source electrode 204a as well as the drain electrode 204b. An insulating etch stop layer 208 for protecting the channel is formed on the semiconductor layer 210a in the center of the channel region. One end of a pixel electrode 209a is connected to the drain electrode 204b. An island capacitive electrode 202 is laminated on an interlayer insulator 212 formed on the end of the pixel electrode 209a.

A capacitive line 200 can be formed on a dielectric layer 201 laminated on the capacitive electrode 202. The capacitive line 200 extends in a stripe configuration along and beyond the image display area and is set to the predetermined potential. As shown in FIG. 24, the capacitive line 200 can include a wider portion upward projecting in each pixel, covering the source electrode 204a, the gate electrode projecting from the scanning line 3a', and the drain electrode 204b in a plan view (in other words, the capacitive line 200 extends in a stripe configuration along the scanning line while having a toothed portion projecting upward in a plan view as shown in FIG. 24). On the other hand, the capacitive electrode 202 is connected to the end of the pixel electrode 209a through a contact hole 213 formed in the interlayer insulator 212 and is set to the pixel-electrode potential. The island capacitive electrode 202 extends along the scanning line 3a' in a plan view as shown in FIG. 24, while having a wider portion in alignment with the wider portion of the capacitive line 200 in each pixel. In this way, the eleventh embodiment includes the island capacitive electrode 202 at the pixel-electrode potential and the capacitive line 200 at the predetermined potential with the dielectric layer 201 interposed therebetween, thereby forming a storage capacitor 70-11 over the TFT 30'.

Unlike the conventional art, in which the capacitive line runs alongside the scanning line, the eleventh embodiment does not need the expansion of the non-aperture area of each pixel. By laminating the capacitive line and the capacitive electrode on the scanning line 3a' and the data line 6a' on the TFT array substrate 10, a larger capacitance of the storage capacitor results.

In this embodiment, at least one of the capacitive line 200 and the capacitive electrode 202 is fabricated of a conductive, light shielding film, and functions as an embedded light shielding film defining the aperture area of each pixel. At least one of the capacitive line 200 and the capacitive electrode 202 is fabricated of a conductive, transparent layer, and an embedded light shielding film defining the aperture area of each pixel may be separately formed.

Figure 26:
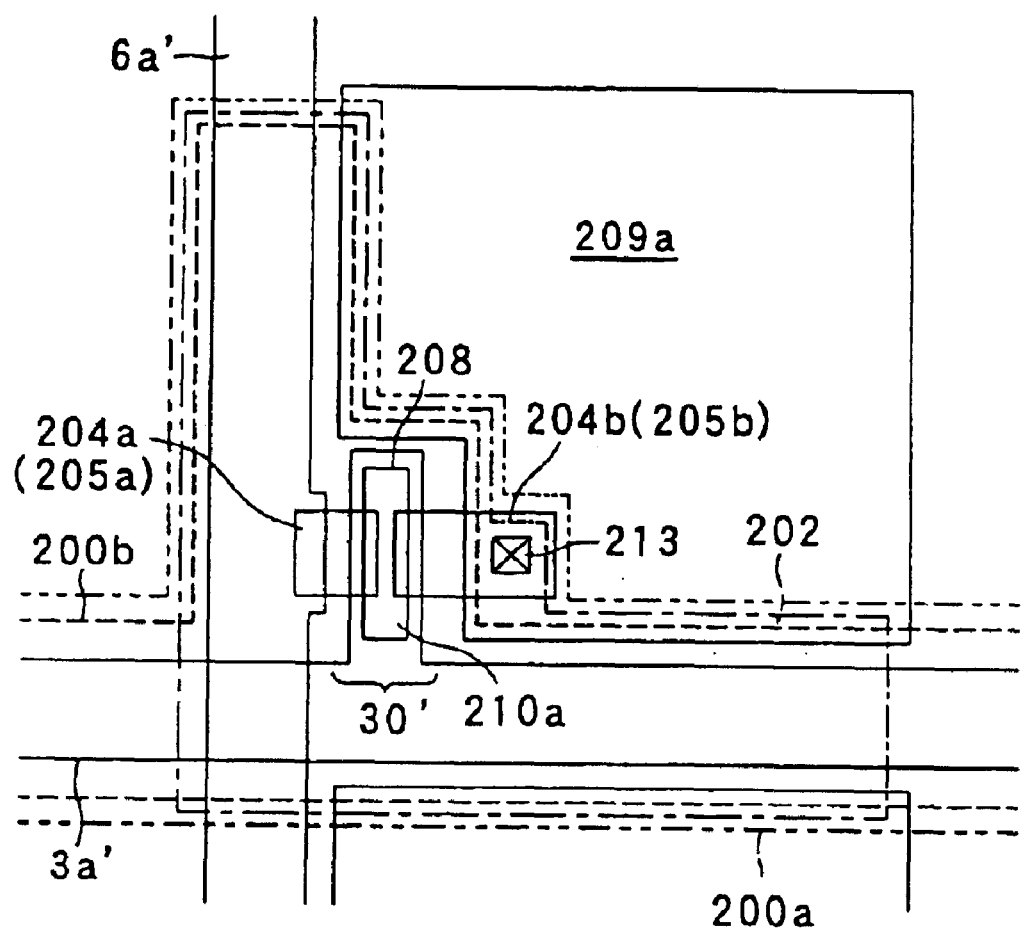
FIG. 26 is a plan view showing a pixel in a TFT array substrate having a data line, a scanning line, and a pixel electrode formed thereon in the electro-optical device of a twelfth embodiment.
Figure 27:
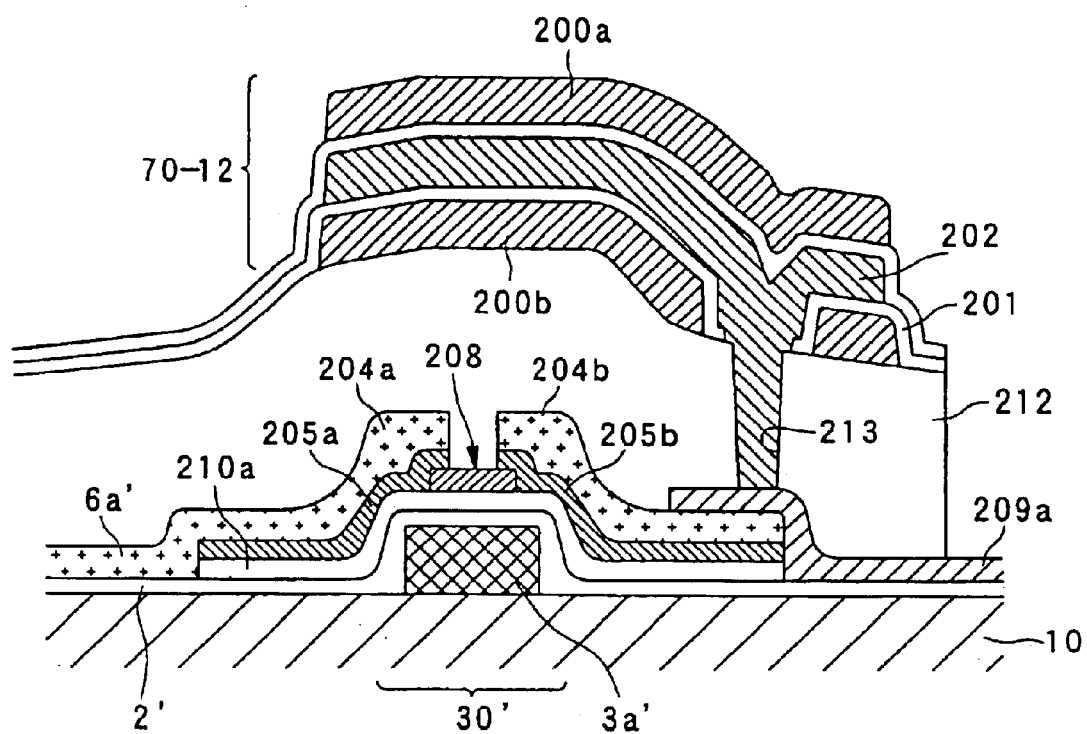
FIG. 27 is a cross-sectional view diagrammatically showing a connection of layers through contact holes and a laminate structure forming a storage capacitor in the electro-optical device of FIG. 26.

A twelfth embodiment of the electro-optical device of the present invention will now be described with reference to FIG. 26 and FIG. 27. FIG. 26 is a plan view showing a pixel in a TFT array substrate having a data line, a scanning line, and a pixel electrode formed thereon in the electro-optical device. FIG. 27 is a cross-sectional view diagrammatically showing a connection of layers through contact holes and a laminate structure forming a storage capacitor in the electro-optical device of FIG. 26. Referring to FIG. 27, the layers and elements are not necessarily drawn to scale and are changed in relative position to show the layers and members in easy-to-identify sizes and to help understand the connection of contact holes, and the laminate structure forming a storage capacitor. In FIG. 26 and FIG. 27, elements identical to those described with reference to FIGS. 24 and 25 (showing the eleventh embodiment) are designated with the same reference numerals and the discussion thereof is omitted.

Referring to FIG. 26 and FIG. 27, the twelfth embodiment can include a pair of capacitive lines 200a and 200b with the capacitive electrode 202 interposed therebetween, instead of a single capacitive line 200 used in the eleventh embodiment. A storage capacitor 70-12 as another example of the storage capacitor 70 (see FIG. 1) is thus formed. In a plan view in FIG. 26, each of the capacitive lines 200a and 200b has a wider portion or a projecting portion in each pixel in an upward direction in FIG. 26, covering not only the source electrode 204b, the gate electrode projecting from the scanning line 3a', and the drain electrode 204b but also the data line 6a' (in other words, each of the capacitive lines 200a and 200b extends in a stripe configuration having a large tooth projecting upward). On the other hand, the island capacitive electrode 202 has a wider portion upward projecting in FIG. 26 (namely, has an L-shaped configuration with the inner corner thereof stepwise expanding). The pair of the capacitive lines 200a and 200b at the predetermined potential may be connected to each other through contact holes on a per pixel or per group, or may be independently routed in a stripe configuration up to the outside of the image display area and connected to separate constant voltage power sources. The rest of the construction of the laminate structure remains unchanged from that of the eleventh embodiment.

Unlike the conventional art, in which the capacitive line runs alongside the scanning line, the twelfth embodiment does not need the expansion of the non-aperture area of each pixel. By laminating the capacitive lines 200a and 200b, and the capacitive electrode 202 on the scanning line 3a' and the data line 6a' on the TFT array substrate 10, a larger capacitance of the storage capacitor results.

In accordance with the twelfth embodiment, the capacitive electrode 202 at the pixel-electrode potential is sandwiched between the pair of capacitive lines 200a and 200b at the predetermined potential from above and below. The scanning line 3a' and the data line 6a' are free from an adverse effect through capacitive coupling arising from variations in the potential of the capacitive electrode 202, and the capacitive electrode 202 (and the pixel electrode 209a) is free from an adverse effect through capacitive coupling arising from variations in the potential of the scanning line 3a' and the data line 6a'. This arrangement eliminates the need for thickening the first interlayer insulator 212 in an attempt to reduce capacitive coupling.

Figure 28:
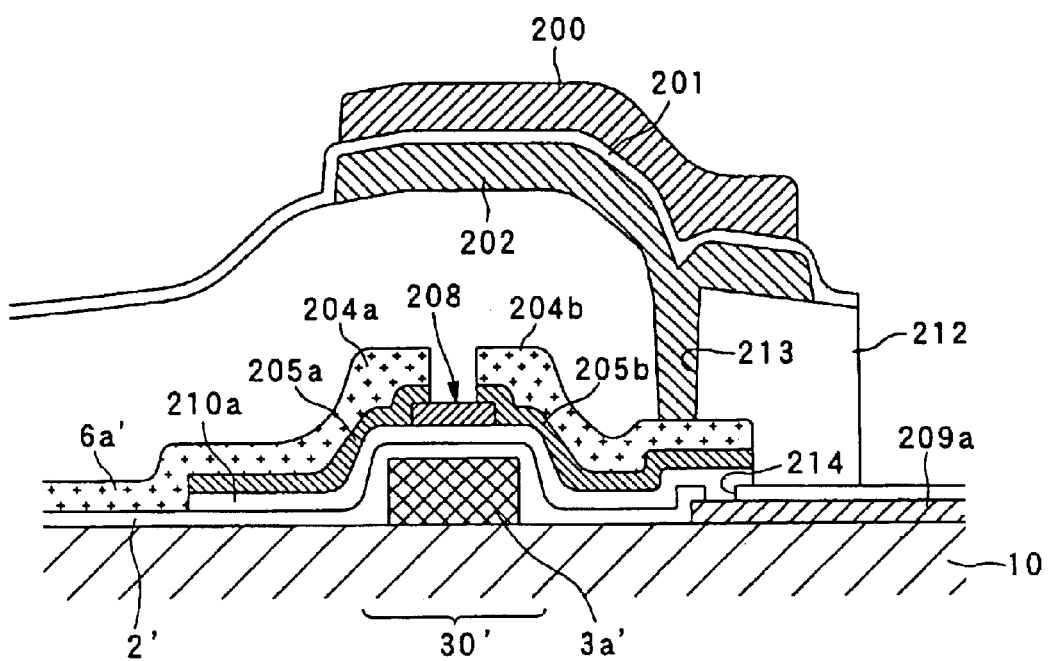
FIG. 28 is a cross-sectional view showing a modification of the eleventh embodiment and the twelfth embodiment.

The end of the pixel electrode 209a is positioned over the semiconductor layer 210a in each of the eleventh embodiment and the twelfth embodiment, the pixel electrode 209a may be positioned beneath the semiconductor layer 210a as shown in FIG. 28. In this case, the semiconductor layer 210a is connected to the pixel electrode 209a by a contact hole 214 drilled in the gate insulator 2'.

Figure 29:
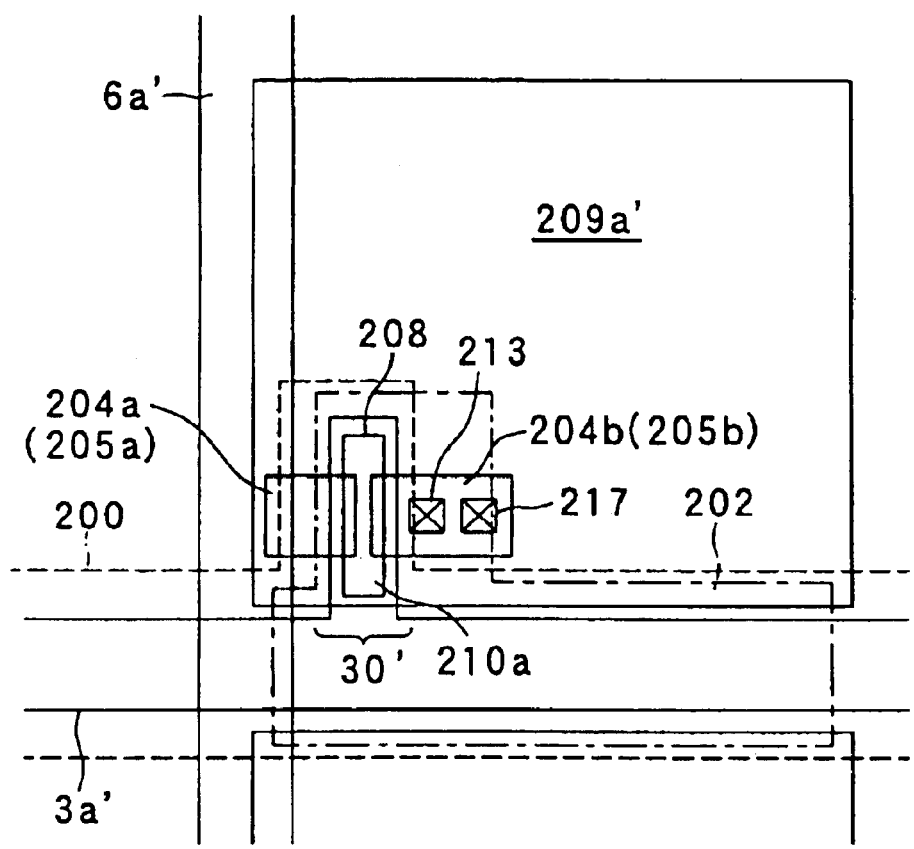
FIG. 29 is a plan view showing a pixel in a TFT array substrate having a data line, a scanning line, and a pixel electrode formed thereon in the electro-optical device of a thirteenth embodiment.
Figure 30:
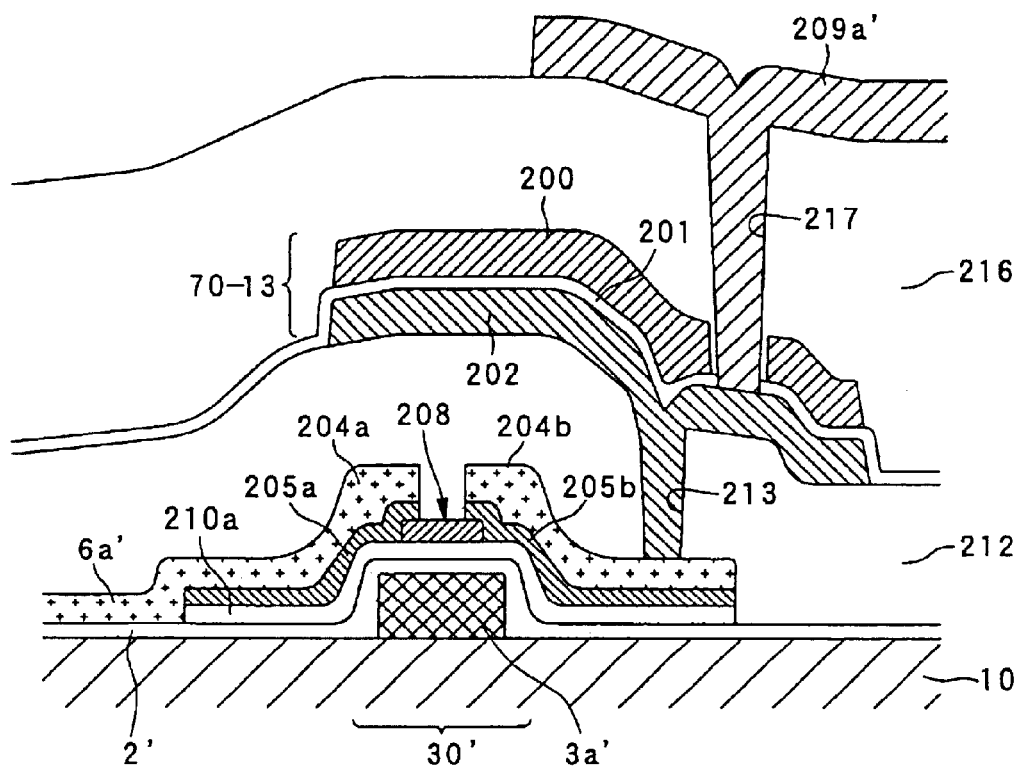
FIG. 30 is a cross-sectional view diagrammatically showing a connection of layers through contact holes and a laminate structure forming a storage capacitor in the electro-optical device of FIG. 29.

A thirteenth embodiment of the electro-optical device of the present invention will now be described with reference to FIG. 29 and FIG. 30. FIG. 29 is a plan view showing a pixel in a TFT array substrate having a data line, a scanning line, and a pixel electrode formed thereon in the electro-optical device. FIG. 30 is a cross-sectional view diagrammatically showing a connection of layers through contact holes and a laminate structure forming a storage capacitor in the electro-optical device of FIG. 29. Referring to FIG. 30, the layers and elements are not necessarily drawn to scale and are changed in relative position to show the layers and members in easy-to-identify sizes and to help understand the connection of contact holes, and the laminate structure forming a storage capacitor. In FIG. 29 and FIG. 30, elements identical to those described with reference to FIGS. 24 and 25 (showing the eleventh embodiment) are designated with the same reference numerals, and the discussion thereof is omitted.

Referring to FIG. 29 and FIG. 30, in comparison with the eleventh embodiment, the thirteenth embodiment includes a pixel electrode 209a' above a storage capacitor 70-13 as another example of the storage capacitor 70 (see FIG. 1), and an interlayer insulator 216 laminated between the capacitive line 200 and the pixel electrode 209a'. The pixel electrode 209a' is connected to the capacitive electrode 202 through a contact hole 217 drilled in the interlayer insulator 216, and the capacitive electrode 202 is thus set to the pixel-electrode potential. The capacitive line 200 runs in a stripe configuration and has a wide portion in each pixel (i.e., a toothed portion extending upwardly in FIG. 29). In a plan view in FIG. 29, the capacitive line 200 has one portion that the wide portion is made relatively smaller to be clear of the contact hole 217. The island capacitive electrode 202 becomes slightly wider in width than the capacitive line 200 in the area of the contact hole 217 to be connected to the contact hole 217. The rest of the construction of the laminate structure remains unchanged from that of the eleventh embodiment.

Unlike the conventional art, in which the capacitive line runs alongside the scanning line, the thirteenth embodiment does not need the expansion of the non-aperture area of each pixel. By laminating the capacitive lines 200 and the capacitive electrode 202 on the scanning line 3a' and the data line 6a' on the TFT array substrate 10, a larger capacitance of the storage capacitor results.

Figure 31:
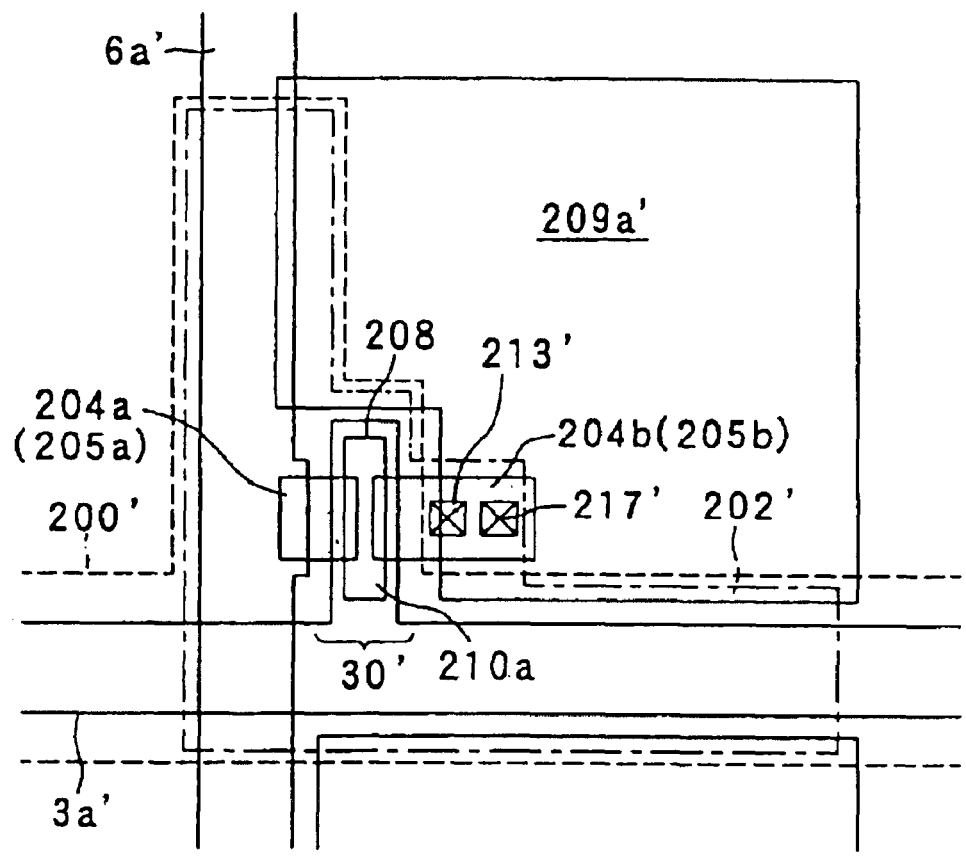
FIG. 31 is a plan view showing a pixel in a TFT array substrate having a data line, a scanning line, and a pixel electrode formed thereon in the electro-optical device of a fourteenth embodiment.
Figure 32:
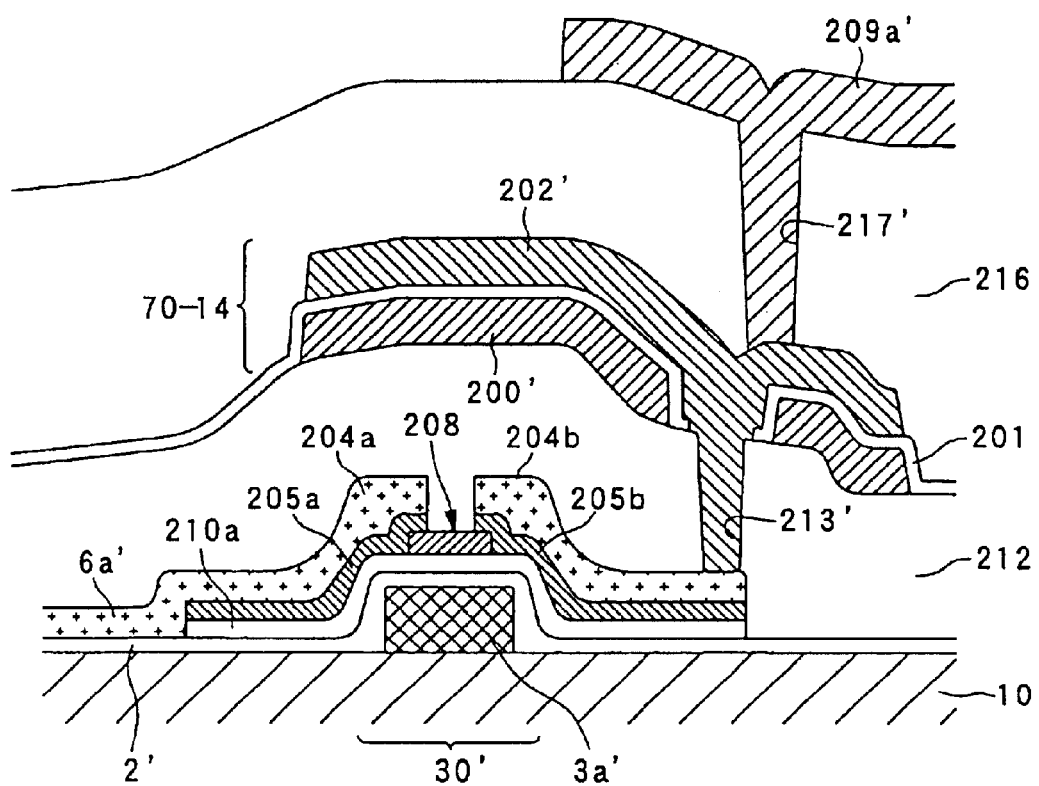
FIG. 32 is a cross-sectional view diagrammatically showing a connection of layers through contact holes and a laminate structure forming a storage capacitor in the electro-optical device of FIG. 31.

A fourteenth embodiment of the electro-optical device of the present invention will now be described with reference to FIG. 31 and FIG. 32. FIG. 31 is a plan view showing a pixel in a TFT array substrate having a data line, a scanning line, and a pixel electrode formed thereon in the electro-optical device. FIG. 32 is a cross-sectional view diagrammatically showing a connection of layers through contact holes and a laminate structure forming a storage capacitor in the electro-optical device of FIG. 31. Referring to FIG. 32, the layers and elements are not necessarily drawn to scale and are changed in relative position to show the layers and members in easy-to-identify sizes and to help understand the connection of contact holes, and the laminate structure forming a storage capacitor. In FIG. 31 and FIG. 32, elements identical to those described with reference to FIGS. 24 and 25 (showing the eleventh embodiment) and FIGS. 29 and 30 (showing the thirteenth embodiment) are designated with the same reference numerals, and the discussion thereof is omitted.

In comparison with the thirteenth embodiment, the fourteenth embodiment includes, as another example of the storage capacitor 70 (see FIG. 1), a storage capacitor 70-14 which is formed of an island capacitive electrode 202' fabricated of an upper conductive layer and a striped capacitive line 200' fabricated of a lower conductive layer as shown in FIG. 31 and FIG. 32. The pixel electrode 209' is connected to the capacitive electrode 202' via a contact hole 217' penetrating the interlayer insulator 216, and the capacitive electrode 202' is set to the pixel-electrode potential. The capacitive electrode 202' is also connected to the drain electrode 204b of the TFT 30' through a contact hole 213' penetrating the interlayer insulator 212. As shown in FIG. 31, the striped capacitive line 200' has, in each pixel, a wide portion or an upwardly projecting portion (i.e., an upwardly projecting toothed portion in a stripe configuration) covering not only the source electrode 204b, the gate electrode projecting from the scanning line 3a', and the drain electrode 204b but also the data line 6a'. In alignment, the island capacitive electrode 202' has a wide portion or an upward projecting portion (namely, has an L-shaped configuration with the inner corner thereof stepwise expanding) as shown in FIG. 31. The rest of the construction of the laminate structure remains unchanged from that of the thirteenth embodiment.

Unlike the conventional art, in which the capacitive line runs alongside the scanning line, the fourteenth embodiment does not need the expansion of the non-aperture area of each pixel. By laminating the capacitive lines 200', and the capacitive electrode 202' on the scanning line 3a' and the data line 6a' on the TFT array substrate 10, a larger capacitance of the storage capacitor results.

In accordance with the fourteenth embodiment, the capacitive electrode 200' at the predetermined potential is sandwiched between the TFT 30', the scanning line 3a' and the data line 6a', and the capacitive electrode 202' at the pixel-electrode potential. The TFT 30', the scanning line 3a' and the data line 6a' are free from an adverse effect through capacitive coupling arising from variations in the potential of the capacitive electrode 202', and the capacitive electrode 202' (and the pixel electrode 209a') is free from an adverse effect through capacitive coupling arising from variations in the potential of the scanning line 3a' and the data line 6a'. This arrangement eliminates the need for thickening the first interlayer insulator 212 in an attempt to reduce capacitive coupling.

When the storage capacitor 70 is embedded beneath the pixel electrode 209' as in the thirteenth and fourteenth embodiments, at least one of the capacitive line and the capacitive electrode is formed of a conductive, light shielding film, and functions as an embedded light shielding film defining the aperture area of each pixel. Alternatively, at least one of the capacitive line and the capacitive electrode is formed of a conductive, transparent layer, and an embedded light shielding film defining the aperture area of each pixel may separately be arranged. When the storage capacitor 70 is embedded beneath the pixel electrode 209a' as in the thirteenth and fourteenth embodiments, a capacitive electrode may be sandwiched between a pair of capacitive lines as in the twelfth embodiment. The capacitive line 200' may be formed in a matrix covering the data line and the scanning line.

Figure 33:
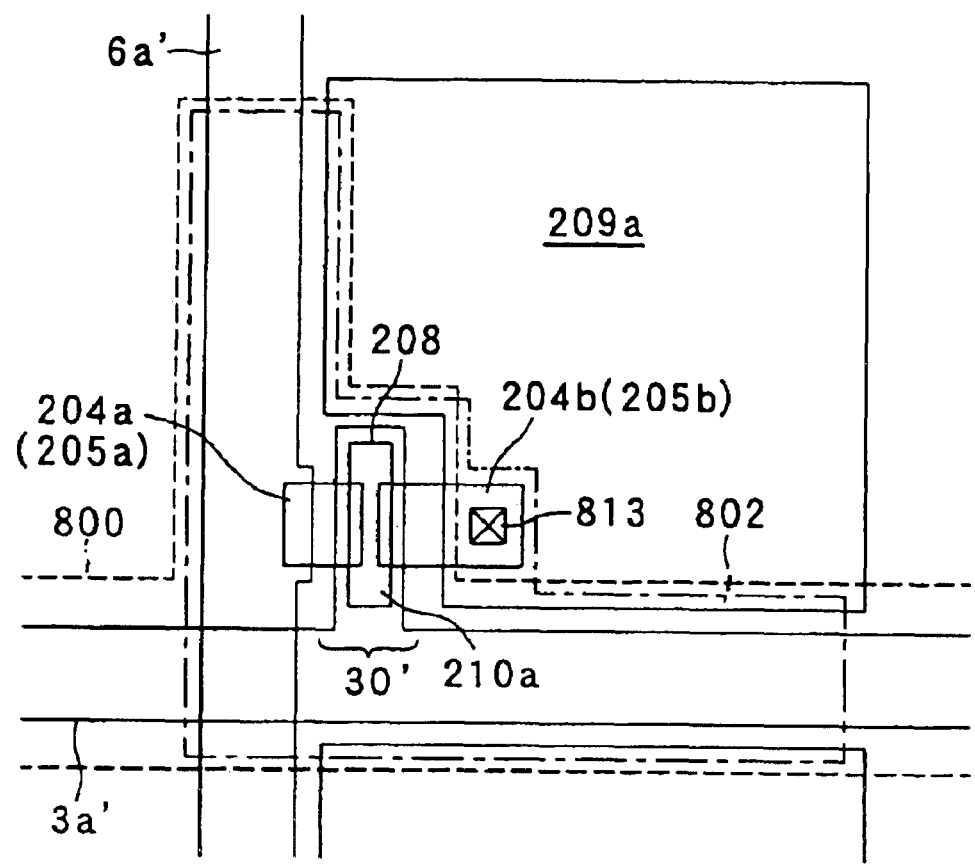
FIG. 33 is a plan view showing a pixel in a TFT array substrate having a data line, a scanning line, and a pixel electrode formed thereon in the electro-optical device of a fifteenth embodiment.
Figure 34:
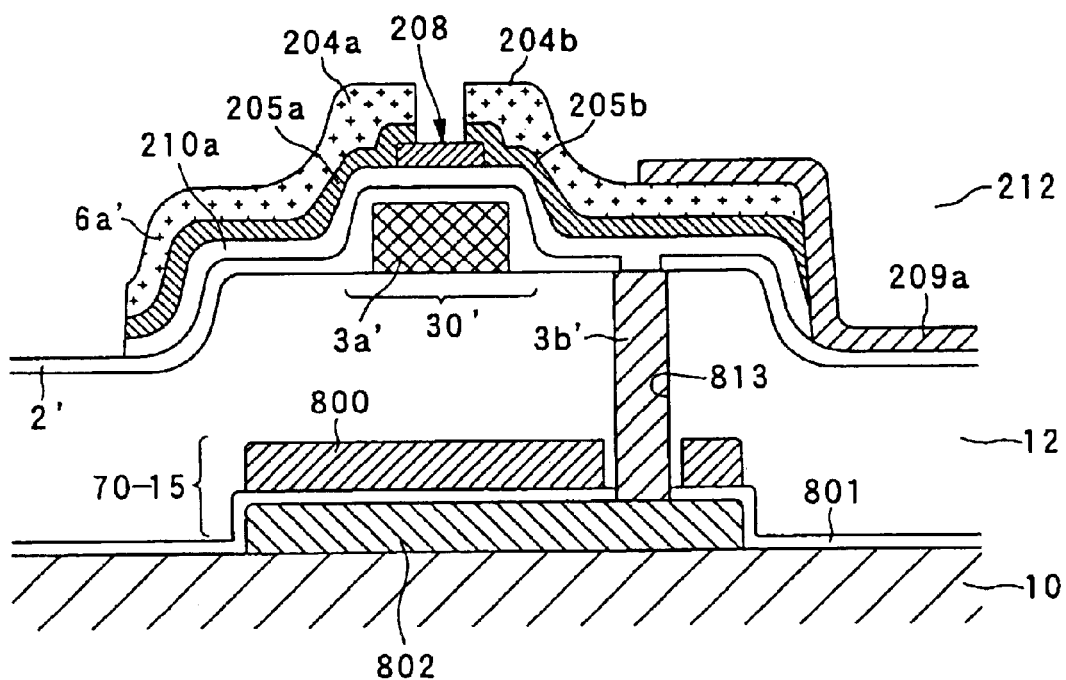
FIG. 34 is a cross-sectional view diagrammatically showing a connection of layers through contact holes and a laminate structure forming a storage capacitor in the electro-optical device of FIG. 33.

A fifteenth embodiment of the electro-optical device of this invention will now be described with reference to FIG. 33 and FIG. 34. FIG. 33 is a plan view showing a pixel in a TFT array substrate having a data line, a scanning line, and a pixel electrode formed thereon in the electro-optical device. FIG. 34 is a cross-sectional view diagrammatically showing a connection of layers through contact holes and a laminate structure forming a storage capacitor in the electro-optical device of FIG. 33. Referring to FIG. 34, the layers and elements are not necessarily drawn to scale and are changed in relative position to show the layers and members in easy-to-identify sizes and to help understand the connection of contact holes, and the laminate structure forming a storage capacitor. In FIG. 33 and FIG. 34, elements identical to those described with reference to FIGS. 24 and 25 (showing the eleventh embodiment) are designated with the same reference numerals, and the discussion thereof is omitted.

In comparison with the eleventh embodiment, the fifteenth embodiment includes a storage capacitor 70-15 as another example of the storage capacitor 70 (see FIG. 1) below the bottom-gate type TFT 30' on the TFT array substrate 10 as shown in FIG. 33 and FIG. 34. Specifically, an island capacitive electrode 802 is formed on the TFT array substrate 10, and a capacitive line 800 is opposed to the island capacitive electrode 802 with a dielectric layer 801 interposed therebetween. The scanning line 3a is laminated on the underlayer insulator 12 arranged on the capacitive line 800. The capacitive line 800 is striped and extends outside the image display area, and is set to the predetermined potential. The island capacitive electrode 802 is connected to the drain region of the semiconductor layer 210a through a contact hole 813 penetrating the underlayer insulator 12 and the dielectric layer 801, and is set to the pixel-electrode potential. A plug 3b', fabricated of the same conductive material (a conductive polysilicon, for example) as that forming the scanning line 3a, is formed within the contact hole 813. In a plan view in FIG. 33, the capacitive line 800 has, in each pixel, a wide portion or an upwardly projecting portion as in FIG. 33(i.e., an upwardly projecting toothed portion in a stripe configuration) covering not only the source electrode 204a, the gate electrode projecting from the scanning line 3a', and the drain electrode 204b but also the data line 6a'. On the other hand, the island capacitive electrode 802 has a wide portion (namely, has an L-shaped configuration with the inner corner thereof stepwise expanding) as shown in FIG. 33. The rest of the construction of the laminate structure remains unchanged from that of the eleventh embodiment.

Unlike the conventional art, in which the capacitive line runs alongside the scanning line, the fifteenth embodiment does not need the expansion of the non-aperture area of each pixel. By laminating the capacitive lines 800, and the capacitive electrode 802 on the scanning line 3a' and the data line 6a' on the TFT array substrate 10, a larger capacitance of the storage capacitor results.

In accordance with the fifteenth embodiment, the capacitive line 800 at the predetermined potential is sandwiched between the TFT 30', the scanning line 3a' and the data line 6a', and the capacitive electrode 802 at the pixel-electrode potential. The TFT 30', the scanning line 3a' and the data line 6a' are free from an adverse effect through capacitive coupling arising from variations in the potential of the capacitive electrode 802, and the capacitive electrode 802 (and the pixel electrode 209a) is free from an adverse effect through capacitive coupling arising from variations in the potential of the scanning line 3a' and the data line 6a'. This arrangement eliminates the need for thickening the underlayer insulator 12 in an attempt to reduce capacitive coupling.

Figure 35:
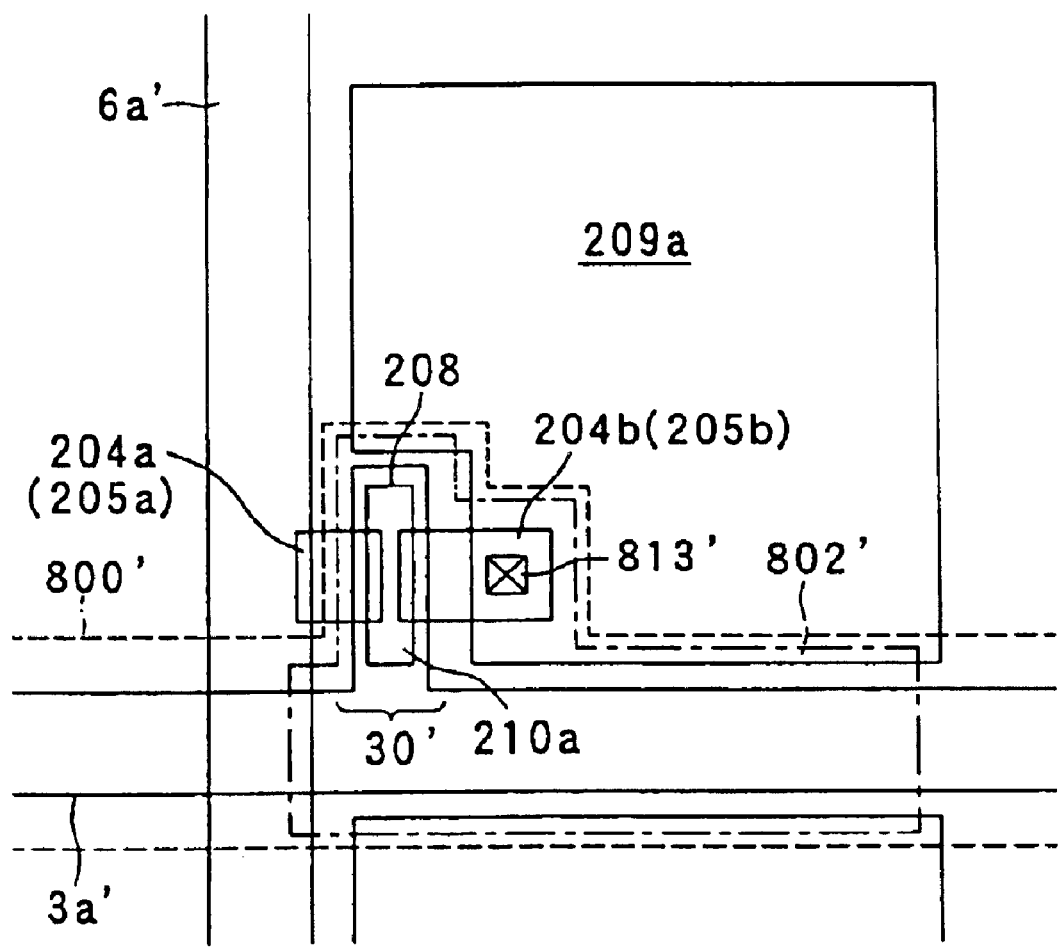
FIG. 35 is a plan view showing a pixel in a TFT array substrate having a data line, a scanning line, and a pixel electrode formed thereon in the electro-optical device of a sixteenth embodiment.
Figure 36:
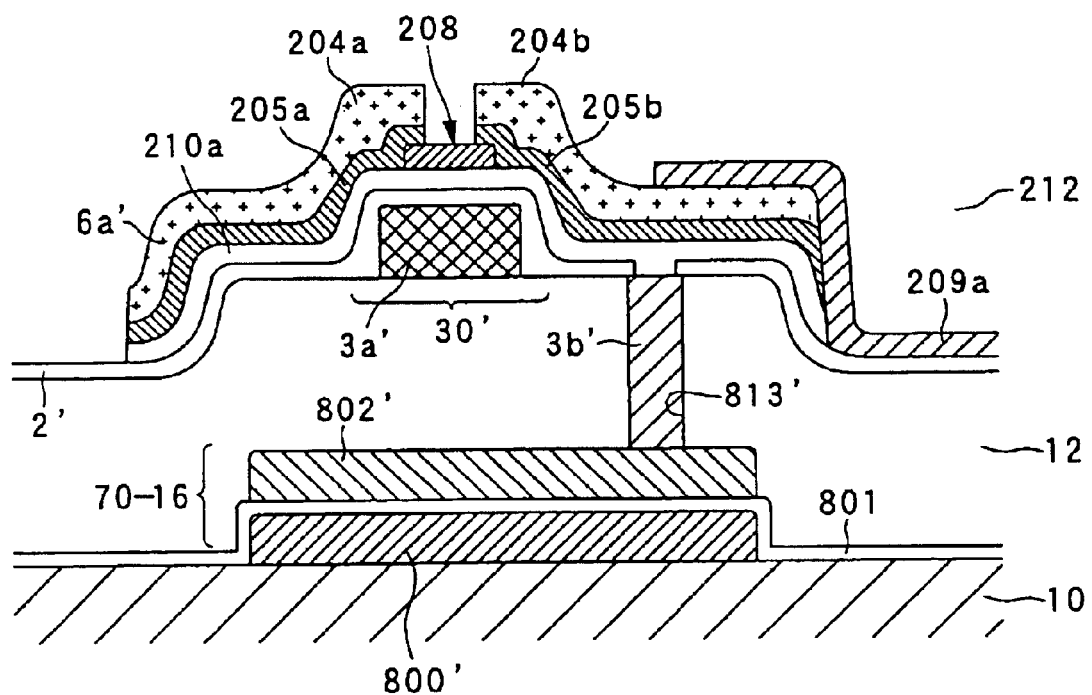
FIG. 36 is a cross-sectional view diagrammatically showing a connection of layers through contact holes and a laminate structure forming a storage capacitor in the electro-optical device of FIG. 35.

A sixteenth embodiment of the electro-optical device of the present invention will now be described with reference to FIG. 35 and FIG. 36. FIG. 35 is a plan view showing a pixel in a TFT array substrate having a data line, a scanning line, and a pixel electrode formed thereon in the electro-optical device. FIG. 36 is a cross-sectional view diagrammatically showing a connection of layers through contact holes and a laminate structure forming a storage capacitor in the electro-optical device of FIG. 35. Referring to FIG. 36, the layers and elements are not necessarily drawn to scale and are changed in relative position to show the layers and members in an easy-to-identify sizes and to help understand the connection of contact holes, and the laminate structure forming a storage capacitor. In FIG. 35 and FIG. 36, elements identical to those described with reference to FIGS. 24 and 25 (showing the eleventh embodiment) and FIGS. 33 and 34 (showing the fifteenth embodiment) are designated with the same reference numerals, and the discussion thereof is omitted.

In comparison with the fifteenth embodiment, the sixteenth embodiment includes a storage capacitor 70-16 as another example of the storage capacitor 70 (see FIG. 1) formed of a conductive, upper island capacitive electrode 802' and a conductive, lower striped capacitive line 800' as shown in FIG. 35 and FIG. 36. The capacitive electrode 802' is connected to the drain region of the TFT 30' through a contact hole 813' penetrating the underlayer insulator 12 and is connected to the pixel-electrode potential. In a plan view in FIG. 35, the capacitive line 800' has a modestly wide portion projecting upwardly in each pixel in a plan view in FIG. 35, covering the source electrode 204a, the gate electrode projecting from the scanning line 3a', and the drain electrode 204b (i.e., the capacitive line 800' does not project upward in a wide area, thereby not covering the data line 6a' in FIG. 35). Accordingly, the island capacitive electrode 802 has a modestly wide area expanding upwardly as shown in FIG. 35. The rest of the construction of the laminate structure remains unchanged from that of the fifteenth embodiment.

Unlike the conventional art, in which the capacitive line runs alongside the scanning line, the sixteenth embodiment does not need the expansion of the non-aperture area of each pixel. By laminating the capacitive lines 800', and the capacitive electrode 802' on the scanning line 3a' and the data line 6a' on the TFT array substrate 10, a larger capacitance of the storage capacitor results.

When the storage capacitor 70 is embedded beneath the scanning line 3a' as in the fifteenth and sixteenth embodiments, at least one of the capacitive line and the capacitive electrode is formed of a conductive, light shielding film, and thus functions as an embedded light shielding film defining the aperture area of each pixel and as a first light shielding film for blocking returning light to the TFT 30'. Alternatively, at least one of the capacitive line and the capacitive electrode is formed of a conductive, transparent layer, and the first light shielding film blocking light to the embedded light shielding film defining the aperture area of each pixel and the first light shielding film for blocking light to TFT 30' may be separately arranged. When the storage capacitor 70 is embedded beneath the scanning line 3a' as in the fifteenth and sixteenth embodiments, a capacitive electrode may be sandwiched between a pair of capacitive lines as in the twelfth embodiment.

Figure 37:
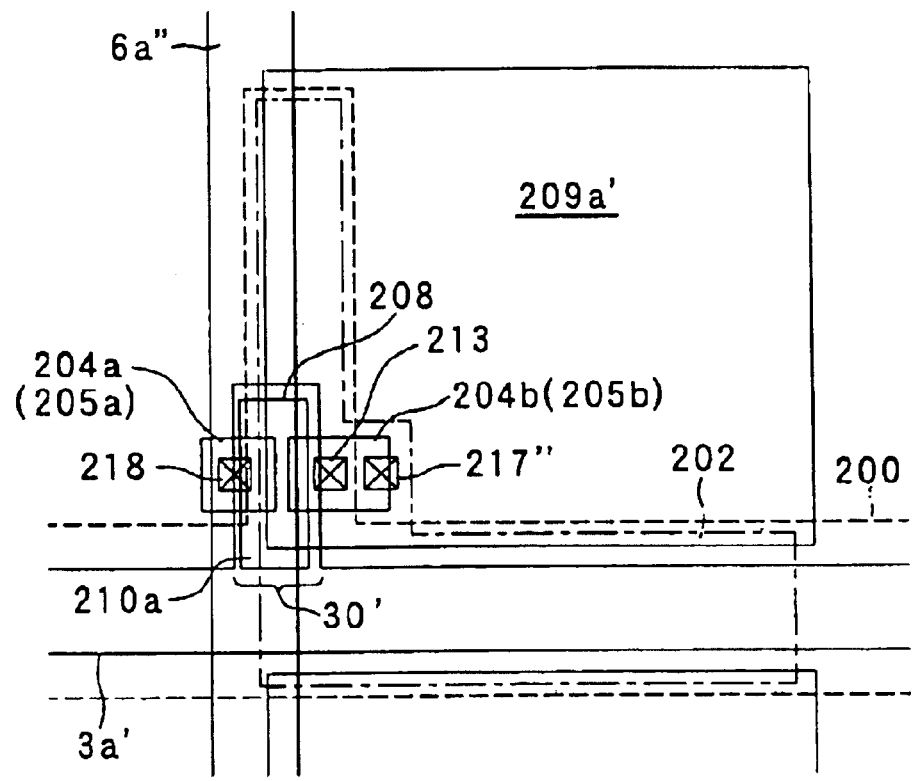
FIG. 37 is a plan view showing a pixel in a TFT array substrate having a data line, a scanning line, and a pixel electrode formed thereon in the electro-optical device of a seventeenth embodiment.
Figure 38:
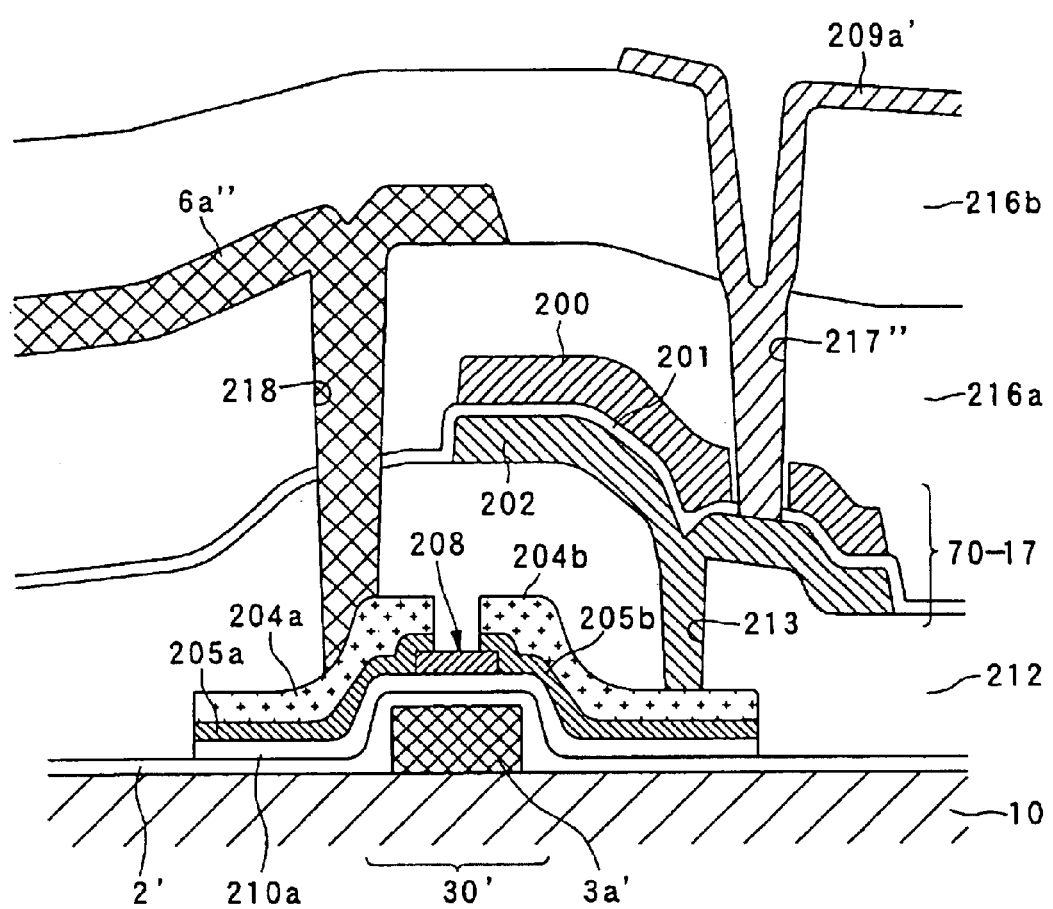
FIG. 38 is a cross-sectional view diagrammatically showing a connection of layers through contact holes and a laminate structure forming a storage capacitor in the electro-optical device of FIG. 37.

A seventeenth embodiment of the electro-optical device of the present invention will now be described with reference to FIG. 37 and FIG. 38. FIG. 37 is a plan view showing a pixel in a TFT array substrate having a data line, a scanning line, and a pixel electrode formed thereon in the electro-optical device. FIG. 38 is a cross-sectional view diagrammatically showing a connection of layers through contact holes and a laminate structure forming a storage capacitor in the electro-optical device of FIG. 37. Referring to FIG. 38, the layers and elements are not necessarily drawn to scale and are changed in relative position to show the layers and members in easy-to-identify sizes and to help understand the connection of contact holes, and the laminate structure forming a storage capacitor. In FIG. 37 and FIG. 38, elements identical to those described with reference to FIGS. 24 and 25 (showing the eleventh embodiment) and FIGS. 29 and 30 (showing the thirteenth embodiment) are designated with the same reference numerals, and the discussion thereof is omitted.

In comparison with the thirteenth embodiment, the seventeenth embodiment includes a data line 6a" between interlayer insulators 216a and 216b over a storage capacitor 70-17 as another example of the storage capacitor 70 (see FIG. 1) as shown in FIG. 37 and FIG. 38. The data line 6a" is connected to the source region of the TFT 30' through a contact hole 218 penetrating the interlayer insulator 216a and the interlayer insulator 212, and is formed to partly cover the gate electrode of the TFT 30' from above in a plan view. The capacitive electrode 202 is connected to the pixel electrode 209a' through a contact hole 217" penetrating the interlayer insulators 216a and 216b, and is set to the pixel-electrode potential. In a plan view in FIG. 37, the capacitive line 200 upwardly expands in a large area in each pixel (i.e., an upwardly projecting toothed portion in a stripe configuration) covering not only the source electrode 204a, the gate electrode projecting from the scanning line 3a', and the drain electrode 204b but also the data line 6a" and a portion of the pixel electrode 9a adjacent to the data line 6a". On the other hand, the island capacitive electrode 202 has a wide portion expanding greatly upwardly in FIG. 37 (namely, has an L-shaped configuration with the inner corner thereof stepwise expanding). The rest of the construction of the laminate structure remains unchanged from that of the thirteenth embodiment.

Unlike the conventional art, in which the capacitive line runs alongside the scanning line, the seventeenth embodiment does not expand the non-aperture area of each pixel. By laminating the capacitive lines 200, and the capacitive electrode 202 on the scanning line 3a' and the data line 6a" on the TFT array substrate 10, a larger capacitance of the storage capacitor results.

Figure 39:
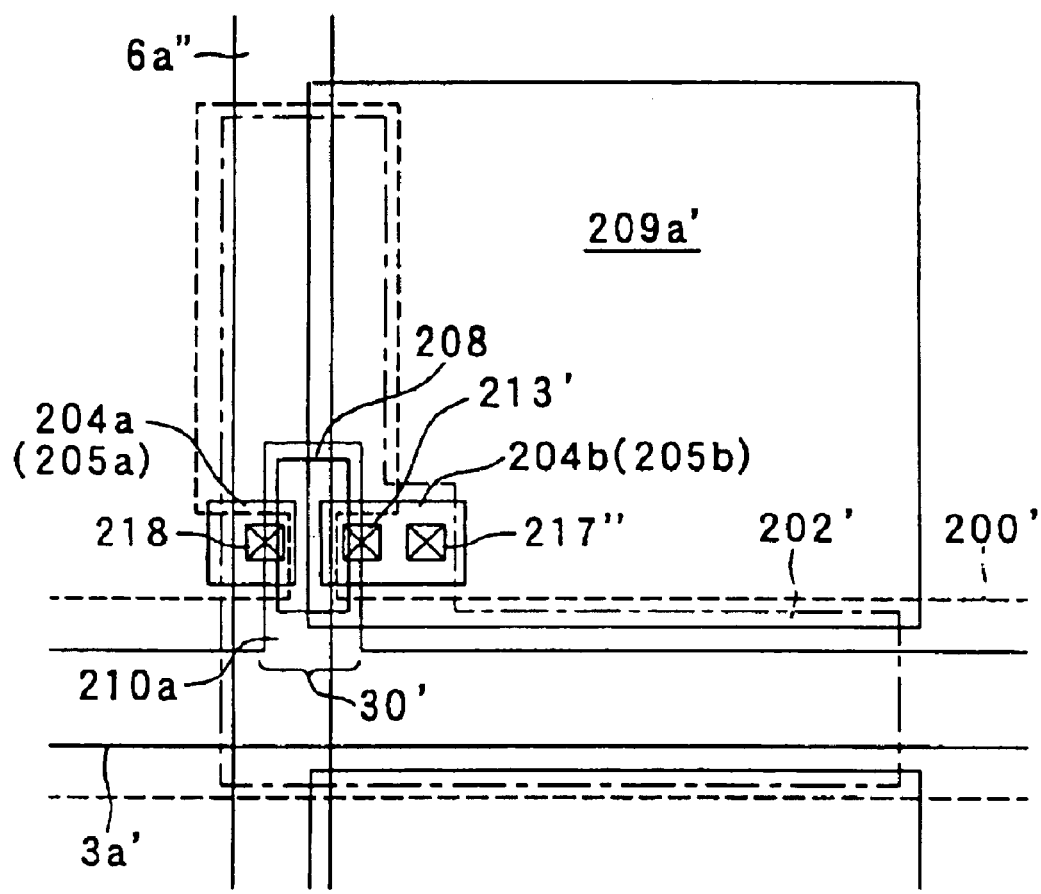
FIG. 39 is a plan view showing a pixel in a TFT array substrate having a data line, a scanning line, and a pixel electrode formed thereon in the electro-optical device of an eighteenth embodiment.
Figure 40:
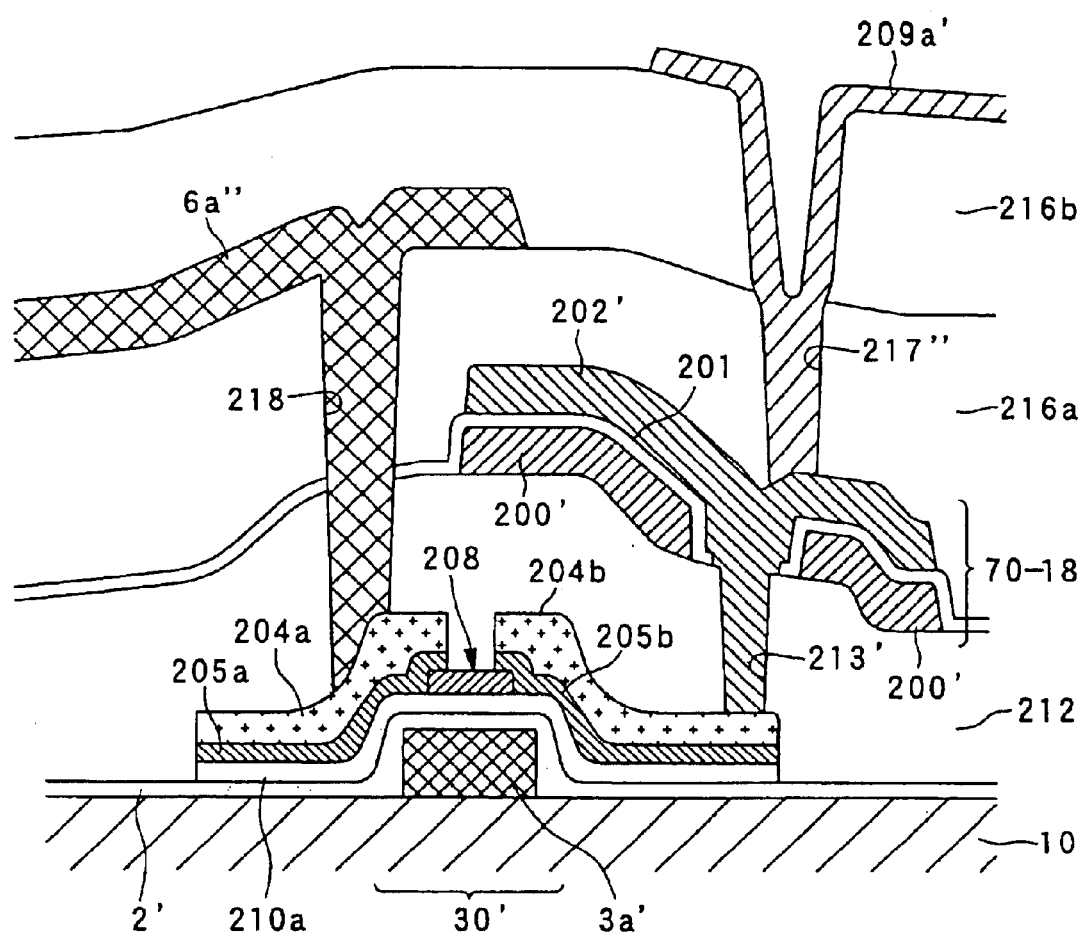
FIG. 40 is a cross-sectional view diagrammatically showing a connection of layers through contact holes and a laminate structure forming a storage capacitor in the electro-optical device of FIG. 39.

An eighteenth embodiment of the electro-optical device of the present invention will now be described with reference to FIG. 39 and FIG. 40. FIG. 39 is a plan view showing a pixel in a TFT array substrate having a data line, a scanning line, and a pixel electrode formed thereon in the electro-optical device. FIG. 40 is a cross-sectional view diagrammatically showing a connection of layers through contact holes and a laminate structure forming a storage capacitor in the electro-optical device of FIG. 39. Referring to FIG. 40, the layers and elements are not necessarily drawn to scale and are changed in relative position to show the layers and members in easy-to-identify sizes and to help understand the connection of contact holes, and the laminate structure forming a storage capacitor. In FIG. 39 and FIG. 40, elements identical to those described with reference to FIGS. 24 and 25 (showing the eleventh embodiment) and FIGS. 37 and 38 (showing the seventeenth embodiment) are designated with the same reference numerals, and the discussion thereof is omitted.

In comparison with the seventeenth embodiment, the eighteenth embodiment can include an island capacitive electrode 202' formed of a conductive, upper layer and a striped capacitive line 200' formed of a conductive lower layer, as shown in FIG. 39 and FIG. 40. The pixel electrode 209a' is connected to the capacitive electrode 202' via a contact hole 217" penetrating the interlayer insulators 216a and 216b, and the capacitive electrode 202' is set to the pixel-electrode potential. The capacitive electrode 202' is connected to the drain electrode 204b of the TFT 30' via a contact hole 213' penetrating the interlayer insulator 212, thereby forming a storage capacitor 70-18 as another example of the storage capacitor 70 (see FIG. 1). In a plan view in FIG. 39, the capacitive line 200' upwardly projects in a large width in each pixel (i.e., has an upwardly projecting toothed portion in a stripe configuration) covering not only the source electrode 204b, the gate electrode projecting from the scanning line 3a', and the drain electrode 204b but also a major portion of the data line 6a" and a portion of the pixel electrode 9a adjacent to the data line 6a". The capacitive line 200' also has a neck portion at the bottom of the largely projecting toothed portion between a contact hole 213' and a contact hole 218, thereby being clear of the contact holes 213', 217, and 218. The island capacitive electrode 202' has an upwardly extending wide portion as in FIG. 39(namely, has an L-shaped configuration with the inner corner thereof stepwise expanding). The rest of the construction of the laminate structure remains unchanged from that of the seventeenth embodiment.

Unlike the conventional art, in which the capacitive line runs alongside the scanning line, the eighteenth embodiment does not need the expansion of the non-aperture area of each pixel. By laminating the capacitive lines 200', and the capacitive electrode 202' on the scanning line 3a' and the data line 6a" on the TFT array substrate 10, a larger capacitance of the storage capacitor results.

When the storage capacitor 70 is embedded between the scanning line 3a' and the data line 6a' as in the seventeenth and eighteenth embodiments, at least one of the capacitive line and the capacitive electrode is formed of a conductive, light shielding film, and thus functions as an embedded light shielding film defining the aperture area of each pixel. Alternatively, at least one of the capacitive line and the capacitive electrode is formed of a conductive, transparent layer, and the embedded light shielding film defining the aperture area of each pixel may separately be arranged. When the storage capacitor 70 is embedded between the scanning line 3a' and the data line 6a' as in the seventeenth and eighteenth embodiments, a capacitive electrode may be sandwiched between a pair of capacitive lines as in the twelfth embodiment.

When the bottom-gate type TFT is employed as a pixel switching TFT as in the eleventh embodiment through the eighteenth embodiment, the pixel electrode and the data line may be formed of the same conductive layer. In this case as well, a variety of storage capacitors may be formed between the pixel electrode and the TFT, and the positional relationship between the capacitive line and the capacitive electrode may be inverted upside down. A capacitive electrode may be sandwiched between a pair of capacitive lines.

Figure 41:
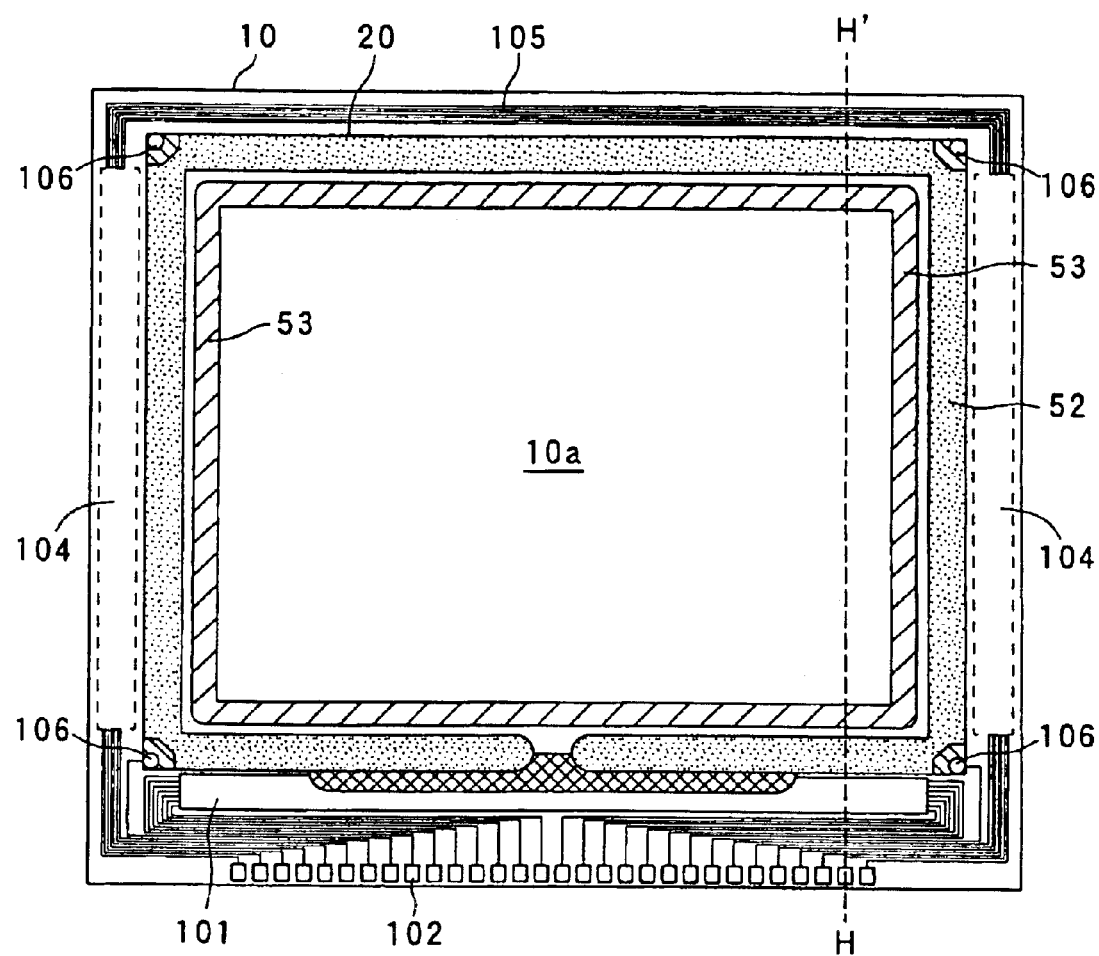
FIG. 41 is a plan view showing of the TFT array substrate in the electro-optical device of each embodiment with the elements formed thereon, viewed from a counter substrate.
Figure 42:
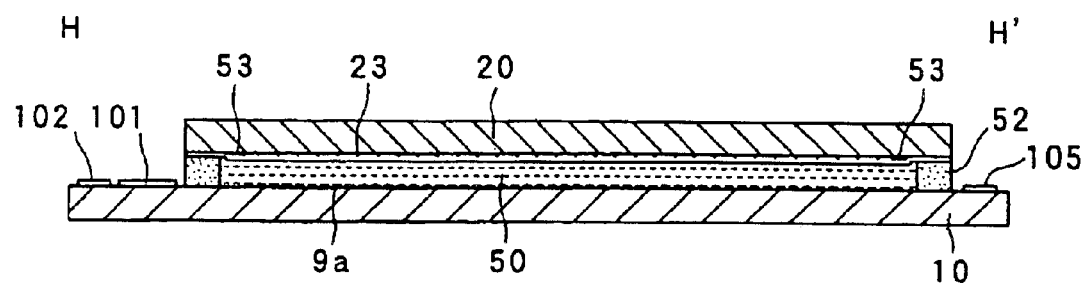
FIG. 42 is a cross-sectional view of the TFT array substrate taken along line H–H' shown in FIG. 41.

The general construction of the electro-optical device in each of the above embodiments will now be described with reference to FIG. 41 and FIG. 42. FIG. 41 is a plan view showing of the TFT array substrate in the electro-optical device of each embodiment with the elements formed thereon, viewed from a counter substrate 20. FIG. 42 is a cross-sectional view of the TFT array substrate taken along line H–H' shown in FIG. 41.

Referring to FIG. 42, the TFT array substrate 10 can be provided with a sealing material 52 along the edge thereof, and a third light shielding film 53 as an outline defining the periphery of an image display area 10a, fabricated of the same material as that of the light shielding film 23, or fabricated of a different material, extends along the internal edge of the sealing material 52. A data line driving circuit 101 for driving the data line 6a by supplying thereto an image signal at a predetermined timing, and external-circuit interconnect terminals 102 are arranged on one side of the TFT array substrate 10, external to the area of the sealing material 52, and scanning line driving circuits 104 for driving the scanning line 3a by supplying thereto a scanning signal at a predetermined timing are arranged on two sides of the first side of the TFT array substrate 10. If a delay in the scanning signal supplied to the scanning line 3a presents no problem, the scanning line driving circuit 104 may be mounted on one side only. Data line driving circuits 101 may be arranged on both sides of the image display area 10a. Arranged on the remaining one side of the image display area 10a of the TFT array substrate 10 is a plurality of wires 105 for connecting the scanning line driving circuits 104 mounted on both sides of the image display area 10a. A conductive material 106 for electrically connecting the TFT array substrate 10 to the counter substrate 20 is mounted at least one corner of the counter substrate 20. Referring to FIG. 42, the counter substrate 20 having almost the same outline as that of the sealing material 52 shown in FIG. 42 is bonded to the TFT array substrate 10 through the sealing material 52.

Besides the data line driving circuits 101 and the scanning line driving circuit 104, the TFT array substrate 10 may be provided with a sampling circuit for applying the image signal to the plurality of the data lines 6a at a predetermined timing, a precharge circuit for supplying a precharge signal at a predetermined voltage level to the plurality of the data lines 6a prior to the application of the image signal, and a test circuit for checking the quality and defects of the electrooptic device in the middle of the production or at the shipment thereof.

In each of the embodiment described with reference to FIG. 1 through FIG. 42, the data line driving circuit 101 and the scanning line driving circuit 104 may be electrically and mechanically connected to a driver LSI mounted on a TAB (Tape Automated Bonding board), through an anisotropically conductive film arranged about the TFT array substrate 10, instead of mounting the data line driving circuit 101 and the scanning line driving circuit 104 on the TFT array substrate 10. Arranged on the light incident side of the counter substrate 20 and the light exit side of the TFT array substrate 10 are respectively polarizer films, retardation films, and polarizer means in predetermined directions to work with operation modes, such as a TN (twisted nematic) mode, a VA (Vertically Aligned) mode, a PDLC (Polymer Dispersed Liquid Crystal) mode, or normally white mode/ normally black mode.

When the electro-optical device of each of the above embodiments is incorporated in a projector, three panels of the electrooptic devices are used as RGB light valves, and each light valve receives the respective color light separated through RGB color separating dichroic mirrors. In each of the above embodiments, the counter substrate 20 is equipped with no color filter. Optionally, an RGB color filter may be arranged in a predetermined area facing the pixel electrode 9a having no second light shielding film 23, on the counter substrate 20 along with a protective film. In this way, the electro-optical device of each embodiment is applicable in a direct viewing or reflective type colorelectro-optical device, besides the projector. Microlenses may be arranged on the counter substrate 20 on a one microlens to one pixel basis. A color filter layer may be formed of a color resist beneath the pixel electrodes 9a facing the RGB on the TFT array substrate 10. In this way, condensation efficiency of the incident light is increased, and an electro-optical device providing a bright image results. By laminating interference layers having different refractive indexes on the counter substrate 20 and taking advantage of interference of light, a dichroic filter for creating the RGB colors is formed. The counter substrate with such a dichroic filter equipped makes an even brighter electro-optical device.

It is to be understood that the present invention is not limited to the above-referenced embodiments, and various modifications are possible within the scope and spirit of the present invention. Further, it should be understood that electro-optical devices with such modifications fall within the scope of the present invention.

An electro-optical device of the present invention heightens the aperture ratio of pixels while increasing the capacitance of a storage capacitor. The electro-optical device presents a high-quality image free from cross-talk and ghosting, and may be used as a display device for a diversity of apparatuses. The electro-optical device may be used as a display device forming a display unit of a liquid crystal display television, a viewfinder type or direct monitoring type video cassette recorder, a car navigation system, an electronic pocketbook, an electronic tabletop calculator, a word processor, a workstation, a mobile telephone, a video phone, a POS terminal, an apparatus having a touch panel and the like.

What is claimed is:

1. An electro-optical device, comprising, above a substrate:
    scanning lines and data lines that intersect with each other to form a grid like pattern;
    thin-film transistors, each of the thin film transistors being disposed in correspondence with intersections of one of the scanning lines and one of the data lines;
    pixel electrodes respectively being disposed in correspondence with the thin-film transistors;
    a first light shielding film laminated between the data line and the pixel electrode; and
    a storage capacitor including the first light shielding film and a capacitive electrode of pixel-electrode potential, laminated between the data line and the pixel electrode.

2. The electro-optical device according to claim 1, the thin-film transistor having a channel region which is formed in an intersection portion of the scanning line and the data line.

3. The electro-optical device according to claim 1, the capacitive electrode being electrically connected to a semiconductor layer of the thin film transistor via a barrier layer formed of the same film as the data line.

4. The electro-optical device according to claim 3, the barrier layer being formed along the data line and the scanning line.

5. An electronic apparatus comprising an electro-optical device according to claim 1.

6. An electro-optical device, comprising, above a substrate:

scanning lines and data lines that intersect with each other to form a grid-like pattern;

thin-film transistors, each of the thin-film transistors being disposed in correspondence with intersections of one of the scanning lines and one of the data lines;

pixel electrodes respectively being disposed in correspondence with the thin-film transistors;

a first light shielding film laminated between the data line and the pixel electrode, the first light shielding film being formed alone the data line and the scanning line; and a storage capacitor including the first light shielding film, laminated between the data line and the pixel electrode.

7. The electro-optical device according to claim 6, the first light shielding film being formed in a grid configuration.

* * * * *